United States Patent
Kopel

(10) Patent No.: US 10,482,558 B2
(45) Date of Patent: Nov. 19, 2019

(54) INTERACTIVE IMAGE-BASED COMMUNICATION USING IMAGE CODING

(71) Applicant: Waltz, Inc., New York, NY (US)

(72) Inventor: Matthew Kopel, Rumson, NJ (US)

(73) Assignee: Waltz, Inc., New York, NY (US)

( * ) Notice: Subject to any disclaimer, the term of this patent is extended or adjusted under 35 U.S.C. 154(b) by 557 days.

(21) Appl. No.: 14/819,351

(22) Filed: Aug. 5, 2015

(65) Prior Publication Data

US 2016/0042485 A1 Feb. 11, 2016

Related U.S. Application Data

(60) Provisional application No. 62/035,971, filed on Aug. 11, 2014, provisional application No. 62/061,057, (Continued)

(51) Int. Cl.
*G06Q 50/30* (2012.01)
*G07B 15/04* (2006.01)
(Continued)

(52) U.S. Cl.
CPC ......... *G06Q 50/30* (2013.01); *G06Q 20/3276* (2013.01); *G06Q 30/0241* (2013.01); *G07B 15/04* (2013.01); *G07C 9/00023* (2013.01)

(58) Field of Classification Search
CPC ..... G06Q 50/30; G06Q 20/2376; G07B 15/04
(Continued)

(56) References Cited

U.S. PATENT DOCUMENTS 5,440,635 A * 8/1995 Bellovin ............... H04L 9/0844
380/285
6,157,723 A * 12/2000 Schultz ................... H04L 9/088
380/249
(Continued)

FOREIGN PATENT DOCUMENTS

| CA | 2805681 | 8/2013 |
| WO | WO-2008/093314 | 8/2006 |
| WO | WO-2011/130422 | 10/2011 |

OTHER PUBLICATIONS

Xie et. al., "CannTalk: A Bidirectional Light Communications Framework for Secure Communications on Snnartphones", SecureComm, LNICST 127, 35-52, 2013 (Year: 2013).*
(Continued)

*Primary Examiner* — Kevin H Flynn
*Assistant Examiner* — Emmett K. Walsh
(74) *Attorney, Agent, or Firm* — Dentons US LLP

(57) ABSTRACT

Embodiments of a system and method for interactive barcode communication are described. In one embodiment, a mobile device presents a barcode to an information or transaction receptacle associated with the point of entry device. One embodiment provides for a method of transmitting data from an unconnected point of access device using an interactive barcode communication system on a mobile device, where the method comprises accessing a set of data on a point of access device, wherein the point of access device is unconnected from a data network with access to a central system database; dividing the set of data into multiple sections; incorporating the multiple sections into scan images for display during per-user transactions at the point of access device; and displaying the point of access data along with per-user transaction data during an interactive barcode communication transaction.

26 Claims, 46 Drawing Sheets

Related U.S. Application Data filed on Oct. 7, 2014, provisional application No. 62/194,697, filed on Jul. 20, 2015.

(51) Int. Cl.
*G06Q 20/32* (2012.01)
*G06Q 30/02* (2012.01)
*G07C 9/00* (2006.01)

(58) Field of Classification Search
USPC .......................................................... 705/13
See application file for complete search history.

(56) References Cited

U.S. PATENT DOCUMENTS

| | | | | |
|---|---|---|---|---|
| 2010/0082491 | A1* | 4/2010 | Rosenblatt | G06Q 10/02 |
| | | | | 705/65 |
| 2011/0166936 | A1* | 7/2011 | Dixon | G06Q 10/04 |
| | | | | 705/14.58 |
| 2012/0091202 | A1* | 4/2012 | Cohen | G06F 21/33 |
| | | | | 235/382 |
| 2013/0318358 | A1* | 11/2013 | Wang | G06F 21/31 |
| | | | | 713/182 |
| 2014/0006190 | A1 | 1/2014 | Loomis, III et al. | |
| 2014/0054367 | A1 | 2/2014 | Alexeev | |
| 2014/0117073 | A1 | 5/2014 | Bell | |

OTHER PUBLICATIONS

Zhang Bingsheng et al., "SBVLC: Secure Barcode-Based Visible Light Communication for Smartphones", 978-1-4799-3360-0/14/ $31.00 © 2014 IEEE, 9 Pages.

Xie, Mengjun et al., "Camtalk: A Bidirectional Light Communications Framework for Secure Communications on Smartphones", © Institute for Computer Sciences, Social Informatics and Telecommunications Engineering 2013, 18 pages.

PCT/US2015/044509, "International Search Report" dated Aug. 10, 2015, pp. 4.

A 2D barcode-based mobile payment system. In Multimedia and Ubiquitous Engineerig, 2009. MUE'09. Third International Conference on (pp. 320-329) IEEE.

* cited by examiner

SCAN 1
Phone displays barcode to be scanned by information receptacle.

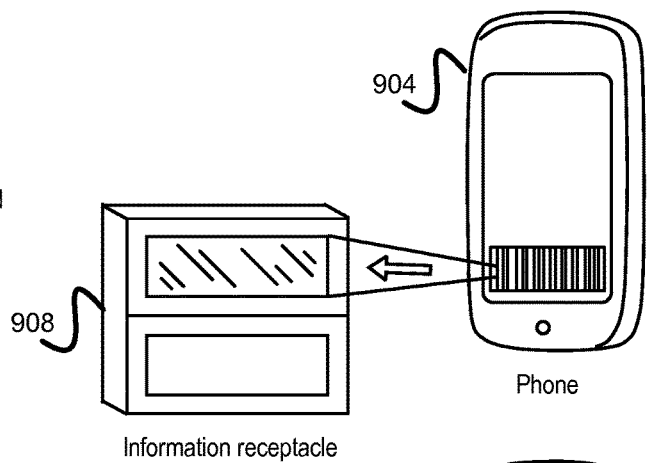

SCAN 2
Information receptacle displays barcode to be scanned by front camera of phone. Barcode displays unique information and confirms receipt of Scan 1.

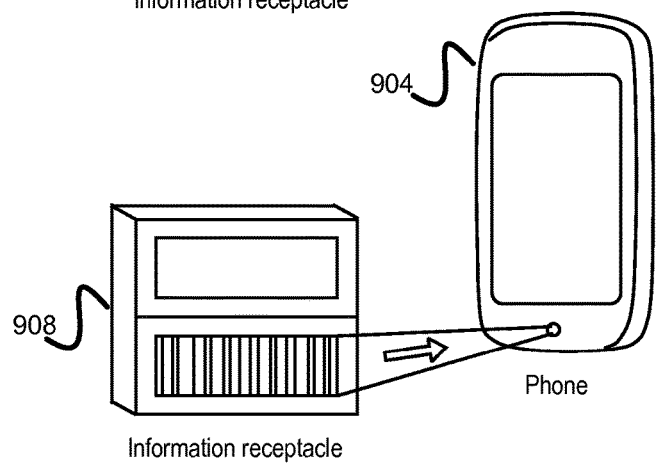

SCAN 3
Phone displays barcode to be scanned by information receptacle. Barcode displays unique information and confirms receipt of Scan 2.

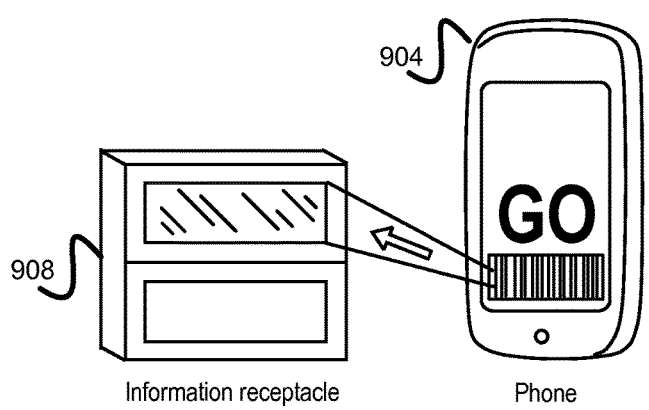

INTERACTIVE BARCODE COMMUNICATION

FIG. 9

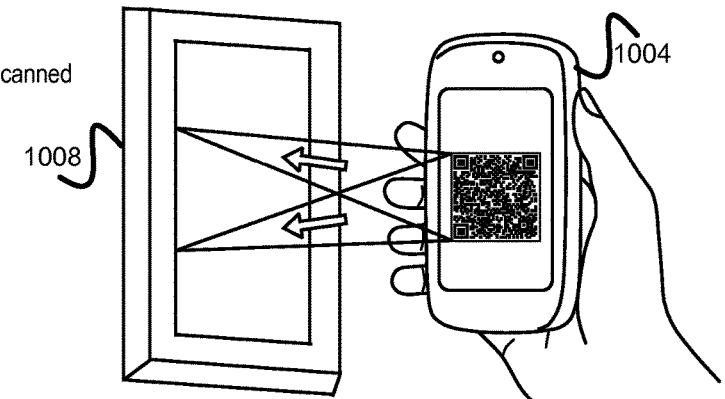
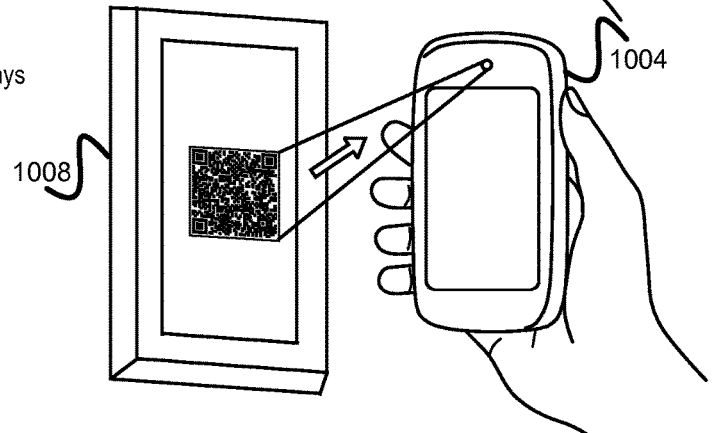
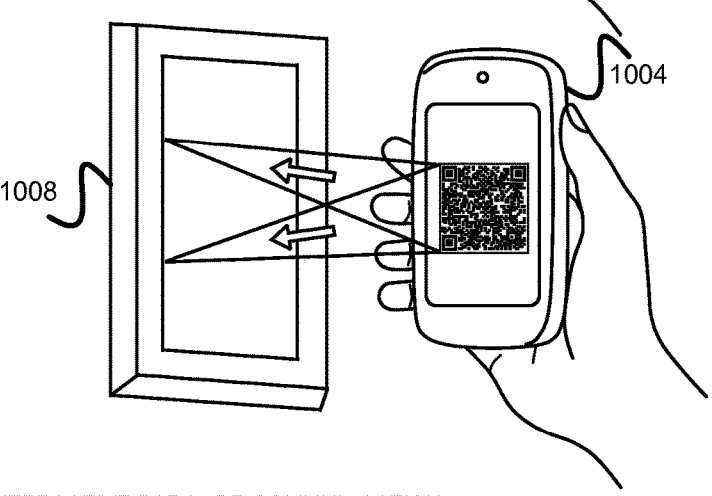
INTERACTIVE BARCODE COMMUNICATION
FIG. 10

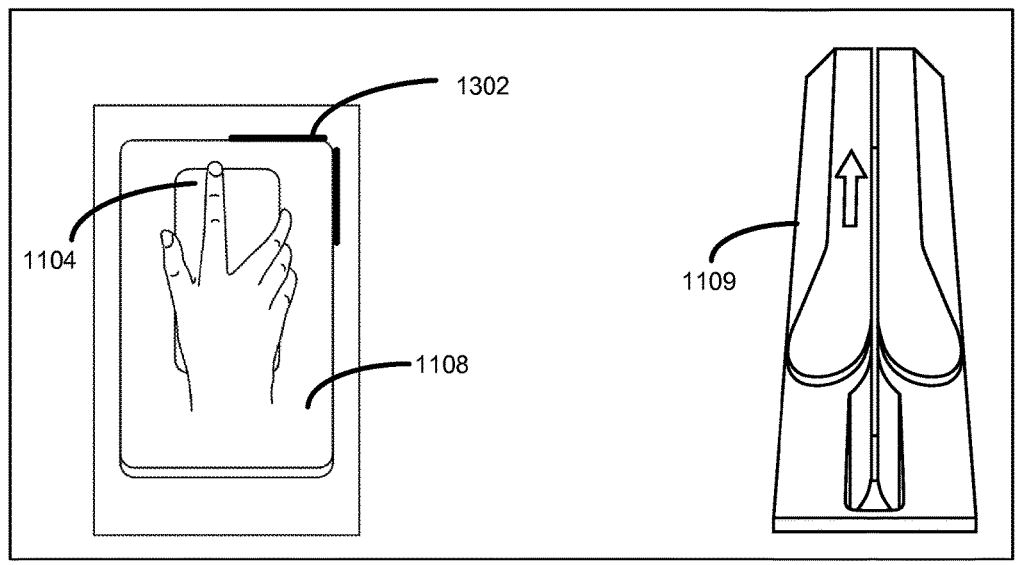
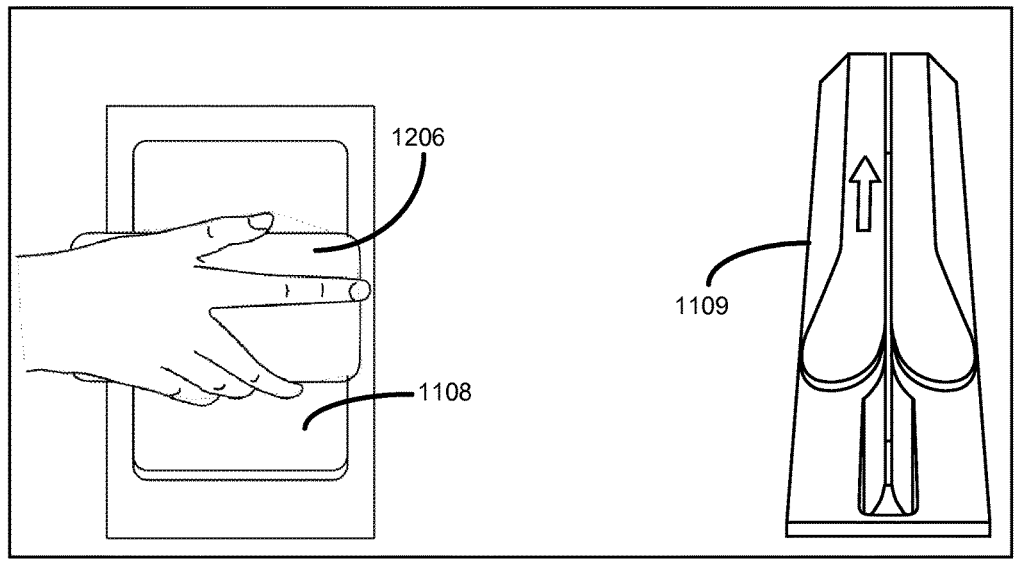
IBC TURNSTILE INTEGRATION CLOSE-UP
FIG. 13

IBC SMARTPHONE TURNSTILE INTEGRATION

IBC SMARTPHONE TURNSTILE INTEGRATION CLOSE-UP

IBC POINT OF SALE DEVICE

IBC POINT OF SALE DEVICE

Process H:
Denial of Verification by
Point of Sale Device

Process K:
Conductor Ticket Verification Process  2600

Process L:
Passenger Changing Seats
Mid Journey

Process P:
Reconstruction of POA Data

Horizontally Repeating Distribution of Visual Elements - 3700

Display and Scanning Device - 4300

INTERACTIVE IMAGE-BASED COMMUNICATION USING IMAGE CODING

CROSS-REFERENCE

The present application claims the benefit of provisional application Ser. No. 62/035,971 filed on Aug. 11, 2014, which is hereby incorporated by reference. The present application also claims benefit of provisional application Ser. No. 62/061,057 filed on Oct. 7, 2014, which is hereby incorporated by reference. The present application also claims benefit of provisional application Ser. No. 62/194,697 filed on Jul. 20, 2015, which is hereby incorporated by reference.

BACKGROUND OF THE INVENTION

Technologies such as cellular (e.g., GSM, CDMA, LTE), Wi-Fi, radio frequency identification (RFID), and near field communication (NFC) each allow wireless communication between electronic devices. However, radio frequency wireless communication technologies each have drawbacks. Coverage area wireless technologies such as cellular or Wi-Fi can suffer in areas of poor signal penetration or without a nearby access point, such as in remote areas, within buildings, or underground. Short-range wireless technologies such as NFC require hardware that may not be supported by all devices. Additionally, data transactions over radio frequency networks may be subject to eavesdropping or interception by third parties.

Therefore, what is desired is a system, method and device for performing wireless data transactions using mobile devices that avoids the drawbacks inherent in RF wireless technology.

SUMMARY OF THE DESCRIPTION

An interactive image-based communication system is described using embodiments, techniques, and disclosures where the system comprises displaying a first image code on a mobile device, where the first image code comprises first information, capturing a second first image code from an information receptacle, where the second barcode comprises second information, and decoding the second information from second barcode. The system then processes the second information and displays a third image code comprising third information to complete the process. In one embodiment, the interactive image code communication system is implemented at a train station (e.g., subway station), where the communication between devices of the system grants a user access to the train system. In one embodiment, the system is implemented at a turnstile device of a train station. In one embodiment, the first, second, and third information comprise different information. In one embodiment, the first information comprises at least one of a unique account number of a subscriber, a time-specific code, or a unique session key. In yet another embodiment, the second information comprises a standard acceptance code or a standard rejection code, and after processing the second information, the third information is displayed if the second information is a standard acceptance code.

In one embodiment, the third information comprises a standard confirmation code, and responsive to the third information, a message of success is displayed on the mobile device or otherwise indicated by the mobile device (e.g., by vibration, or sound). In one embodiment, if the second information includes the standard rejection code, then instead of the third information, a message of failure is displayed on the mobile device or otherwise indicated by the mobile device. In another embodiment, the information receptacle is coupled to a point of entry device, and on displaying the message of success, access across the point of entry device is granted. The point of entry device can be any device that blocks access to a path until access right across the point of entry device is granted. In another embodiment, the system can be configured to display a targeted message on the mobile device, wherein the targeted message is related to the location and/or time of the point of entry device, and may be a targeted advertisement. In another embodiment, the targeted message is a notification of insufficient balance.

In one embodiment, the second information includes a unique turnstile identification code. In another embodiment, the second information includes a unique station identification code. In another embodiment, the second information includes a session key for the interactive barcode communication session. Further, in one embodiment, the point of entry device is a turnstile device blocking access to a train station platform. In one embodiment, the second and third information are encrypted.

One embodiment provides for a method of using an interactive image-based communication system on a mobile device, the method comprising displaying a first image code on the mobile device, the first image code comprising first information, capturing a second image code from an information receptacle, the second image code comprising second information, decoding the second information from second image code, processing the second information, and after processing the second information, displaying a third image code comprising third information to the information receptacle, wherein the first, second, and third information are different.

One embodiment provides for a method of using a barcode communication system on a mobile device to enable self-authentication of a passenger on a commuter mass-transit system via a passenger account, where the method comprises capturing a first barcode on the mobile device, wherein the first barcode comprises first information and the mobile device includes a storage medium having second information encoded thereon, the second information associated with the passenger account; decoding the first information from the first barcode; processing the first information; accessing the second information on the storage medium of the mobile device; and exporting the first information and the second information to a central information system to authenticate a commuter pass associated with the passenger account and to pair the passenger account with a location associated with the first barcode.

Further embodiments provide for of a system and method for interactive barcode communication. In one embodiment, a mobile device presents a barcode to an information or transaction receptacle associated with the point of entry device. One embodiment provides for a method of transmitting data from an unconnected point of access device using an interactive barcode communication system on a mobile device, where the method comprises accessing a set of data on a point of access device, wherein the point of access device is unconnected from a data network with access to a central system database, dividing the set of data into multiple sections; incorporating the multiple sections into scan images for display during per-user transactions at the point of access device, and displaying the point of access data along with per-user transaction data during an interactive barcode communication transaction.

Other methods and apparatuses are also described.

BRIEF DESCRIPTION OF THE DRAWINGS

The following description includes discussion of figure having illustrations given by way of example of implementations of the various embodiments. The figures should be understood by way of example and not by way of limitation. In the figures of the accompanying drawings, like references indicate similar elements.

FIG. 9 illustrates the interaction between a mobile device and a transaction or information receptacle using the interactive barcode communication system, according to an embodiment.

FIG. 10 illustrates an additional embodiment in which the interactive communication system is implemented using an image code.

FIG. 13 illustrates a close up of information receptacle associated with a point of entry device, as used in the interactive barcode communication system.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order or may be optional under the circumstances and conditions described. Moreover, some operations can be performed in parallel rather than sequentially.

System Overview

An interactive barcode communication system on a mobile device is described herein. A barcode is displayed on a mobile device. In one embodiment, the barcode can include information related to the user of the device (e.g. account information). The displayed barcode is scanned by a barcode reader and is processed by a computing device. In response, the computing device can cause a second barcode to be displayed on a barcode presenter, which is subsequently captured by the mobile device. The mobile device can process the information in the second barcode and display a third barcode to the barcode reader. After processing the information of the third barcode, the computing device can conclude the operation. In one embodiment, the barcode reader and barcode presenting display device can be a part of a single interface referred to as an information receptacle, herein. In one embodiment, the information receptacle can have an integrated computing system to process and decode barcode information.

Figure 1:
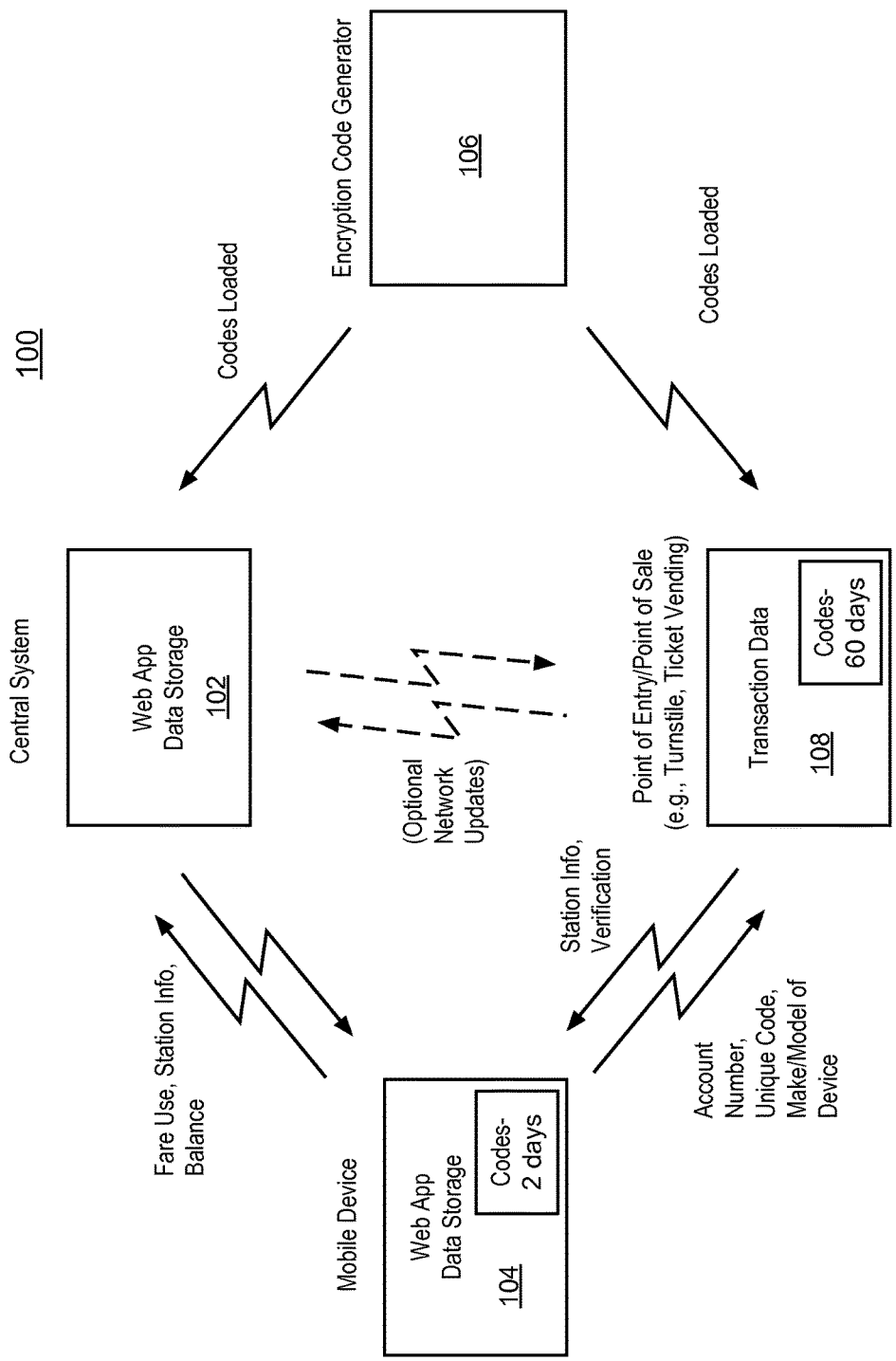
FIG. 1 is a block diagram of an embodiment of an interactive barcode communication system.

FIG. 1 illustrates an embodiment of an interactive barcode communication system 100. System 100 comprises a central system 102, at least one mobile device 104, and an encryption code generator 106. Central system 102 can be any computing device capable of receiving and transmitting data, either over a connected network or off-network. In another embodiment, encryption code generator 106 can be a part of the central system 102. Encryption code generator 106 can transmit unique codes to central system 102, which mobile device 104 can use to generate barcodes used in the operations described herein. In one embodiment, central system 102 can be a computing device that can send and receive information to and from other devices connected through a private or public network. In one embodiment, computing system 102 can be connected with various devices using separate networks. For example, computing device 102 can be connected to encryption code generator 106 via a separate network and can be connected to mobile device 104 using another network. Mobile device 104 can be, but not limited to, a cellular telephone, a tablet, a laptop, a touch screen display, a PDA, or any portable computing device.

In one embodiment, system 100 also includes at least one point of entry device 108. Point of entry device 108 can be any device that usually prevents access across a path. The point of entry device 108 can be configured to permit access only after access information is received from mobile device 104. In one embodiment, point of entry device is associated with a computing device. In yet another embodiment, the computing device associated with the point of entry device 108 can be connected to central system 102 via an optional communication network. In one embodiment point of entry device 108 is a turnstile device (e.g., used at train stations, courthouses, concerts halls, stadiums, etc.). In another embodiment, point of entry device 108 can be a door. In yet another embodiment, point of entry device 108 can be a virtual entry point (e.g., a visual signal indicating a red light to stop and green light to proceed). In one embodiment, point of entry device 108 is coupled to a barcode reader. In another embodiment, the point of entry device 108 is coupled to a bar code generator. In another embodiment, point of entry device 108 is coupled to an information receptacle. The barcode reader can be used to read/scan a barcode presented by mobile device 104. In another embodiment, the barcode generator coupled to the point of entry device 108 can display a barcode to be scanned by mobile device 104. In another embodiment, the barcode generator and barcode reader are presented using a single (combined) interface capable of both reading and scanning barcodes (e.g., information receptacle as described herein).

In one embodiment, central system 102 includes information about a user's account information. Account information can include any of an account number, an account balance, an expiration date, etc. pertaining to the user. Central system 102 also transmits encryption codes, received from encryption code generator 106, to mobile device 104. Mobile device 104 can use the received encryption codes to generate a bar code that can be presented to point of entry device 108. In another embodiment, central system 102 transmits multiple encryption codes along with time period information (code-time data), instructing mobile device 104 to use a certain encryption code during a specified time period. In one embodiment, using an encryption code during a specified time period, mobile device 104 can generate a unique barcode that can be scanned at an interface of a point of entry device 108.

In one embodiment, the code-time data can be loaded to a computing device coupled with point of entry device 108. Using the code-time data, point of entry device 108 can know what code to expect at the associated barcode reader, in order to permit entry when mobile device 104 is scanned. In one embodiment, code-time data can be manually loaded to the coupled computing machine of the point of entry device 108 (e.g., using a USB storage device, compact disk, etc.). In another embodiment, the code-time data is transmitted from central system 102 to point of entry device 108 over a communication network in which both central system 102 and point of entry device 108 are connected.

In one embodiment, encryption code generator 106 generates encryption codes at the request of central system 102. In another embodiment, the codes are generated at specific time intervals and transmitted to central system 102 after generation. Central system 102 can also be configured to periodically generate a set of code-time data and transmit the set of data to mobile device 104. In one embodiment, the set of code-time data is not transmitted to mobile device 104 unless an indication is received (either manually or programmatically) that the code-time data has been associated with the point of entry device 108. In another embodiment, the code-time data, even if transmitted to mobile device 104, are not used unless mobile device 104 receives an indication from central system 102 that the code-time data is now available with the point of entry device 108. Central system 102 can receive information regarding the code-time data associated with point of entry device 108 either though network communication between the device, manually by an operator of the central system 102, or a combination thereof.

A network connection between the point of entry device 108 and the central system 102 is optional, as the interactive barcode communication system may be implemented without a network connection between central system 102 and point of entry device 108. In one embodiment, the encryption codes (optionally in the form of code-time data) are periodically loaded to a computing device associated with point of entry device 108 by service personnel using a portable data storage device (e.g., USB storage device, compact disk, etc.).

Figure 2:
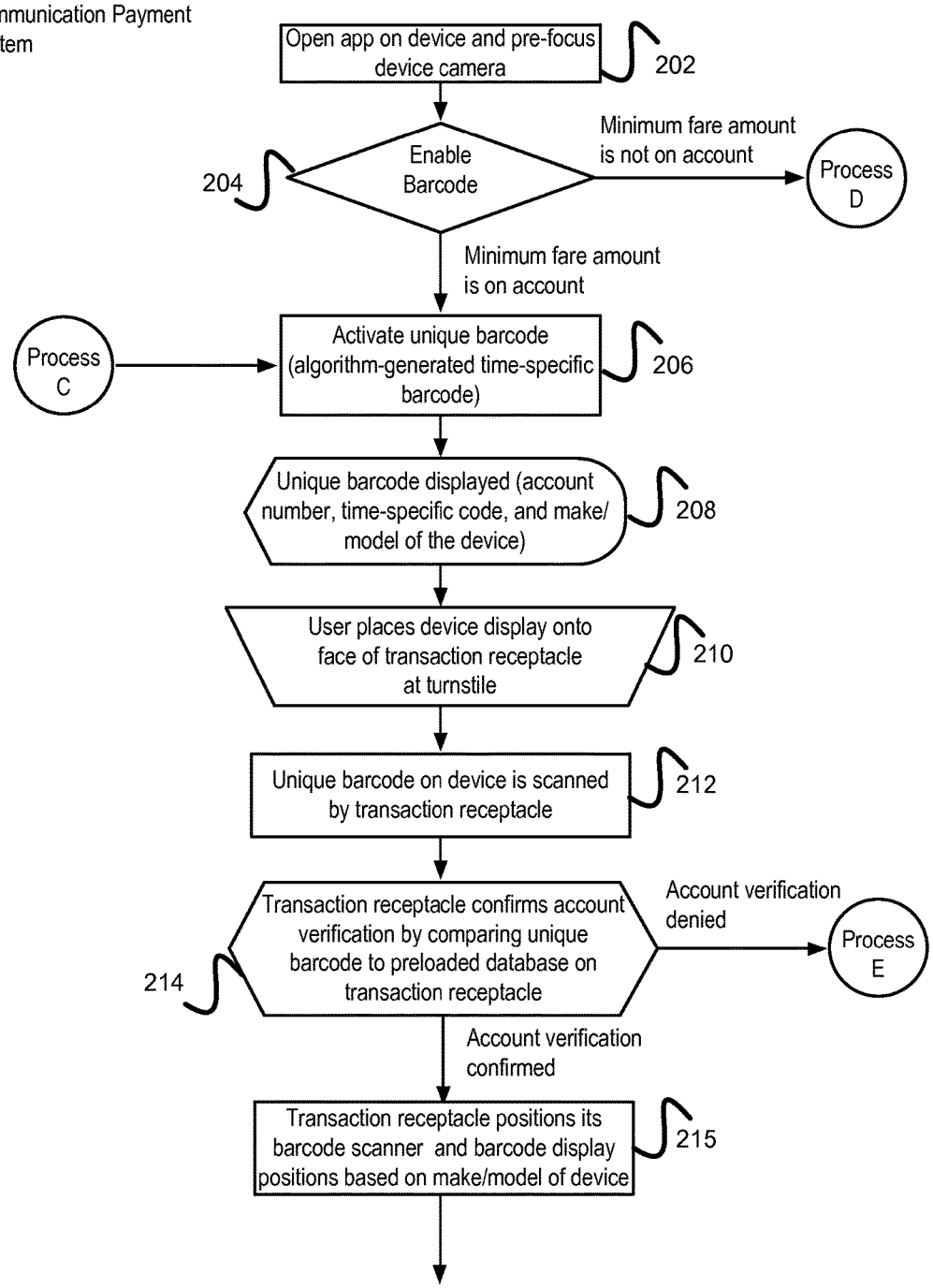
FIG. 2 illustrates a technique of applying the interactive barcode communication system.
Figure 2:
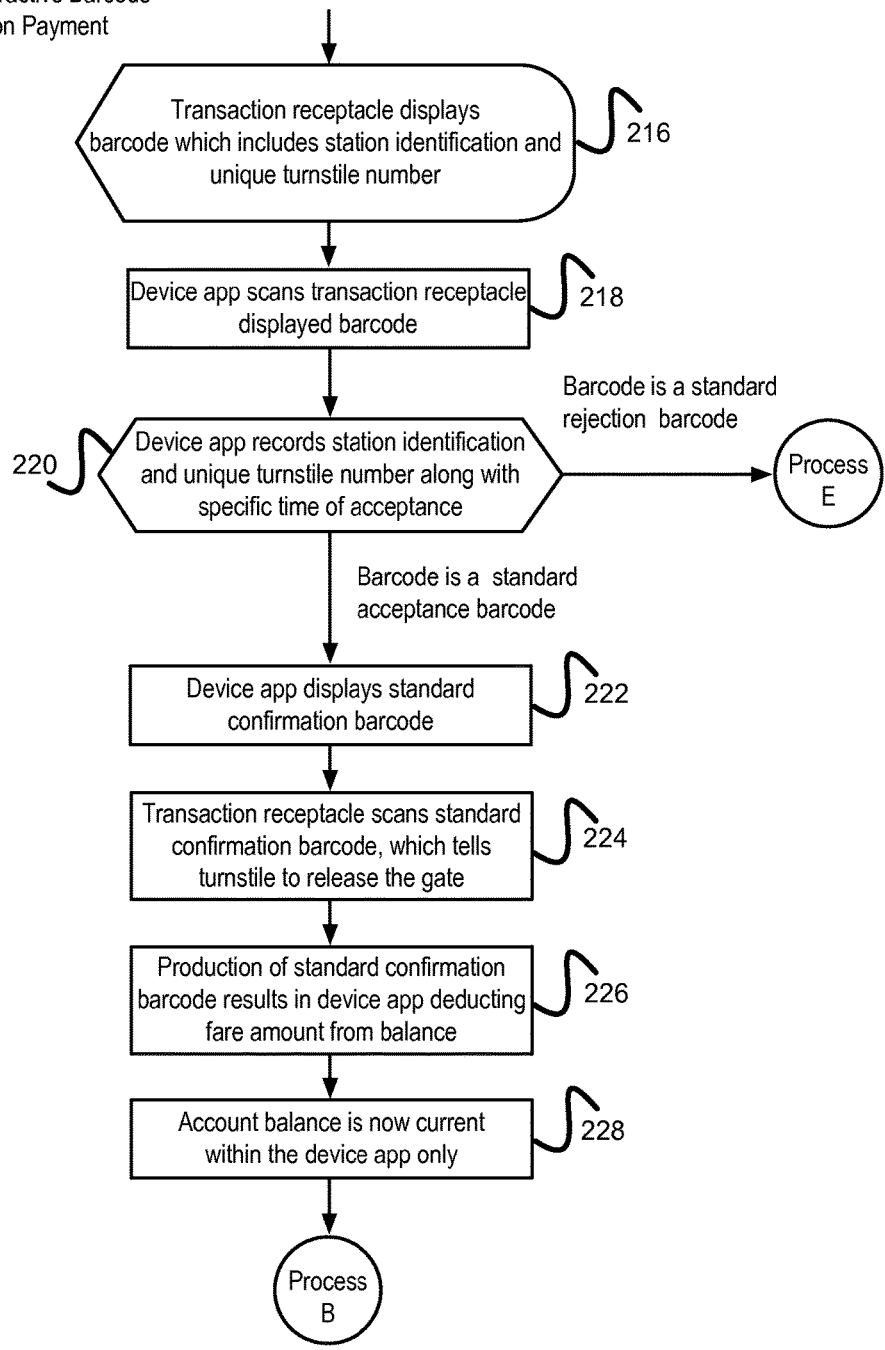

Interactive Barcode Communication System Applied to a Turnstile Device at a Train Station FIG. 2 illustrates a process 200 (Process A) of applying the interactive barcode communication system 100, as applied to a turnstile device operating as the point of entry device 108. In one embodiment, at block 202, a user opens an application at mobile device 104 that enables device 104 as shown at block 204. Optionally, block 202 also pre-focuses the camera of mobile device 104 to initialize the system. Once at block 204, mobile device 104 computes the existing monetary balance in the user's account. In one embodiment, mobile device 104 communicates with central system 102 to enquire the balance in the user's account. In one embodiment, the balance information is stored locally on the mobile device 104 and the mobile device can communicate periodically with the central system to confirm the balance on the mobile device is consistent with the balance on the central system.

If the user's account at least has a minimum balance equivalent to the minimum fare of a train ticket ride or any other preconfigured amount, the operation proceeds. If not, then mobile device 104 presents an insufficient balance message on mobile device, as described in conjunction with FIG. 5. In one embodiment, the user may be given a warning of insufficient balance before entering the station based on data used for advertisement generation, as described in conjunction with FIG. 7.

Assuming the minimum balance condition has been met, at block 206, a unique barcode is displayed on mobile device 104. The unique barcode is generated using the code-time data received from central system 102 and further in conjunction with FIG. 4 below. As shown at block 208, the unique barcode displayed on mobile device 104 comprises the user's account information (e.g., account number, type of ride—adult, student, senior, account balance, etc.). In another embodiment, the unique barcode also comprises information pertaining to the mobile device information (make, model, etc.). In one embodiment, the mobile device information assists in placement of the barcodes on the transaction receptacle relative to placement of the capturing device (e.g., camera) of mobile device 104 so that the interactive barcode communication can undergo between mobile device 104 and transaction receptacle of turnstile device 108.

In one embodiment, the transaction receptacle of turnstile device 108 is an information receptacle (as described herein). At block 210, the user places or positions mobile device 104 onto a face of a transaction receptacle at the turnstile. In another embodiment, the user positions the device so that a barcode reader associated with the turnstile can scan or capture the unique barcode displayed on mobile device 104. As shown at block 212, the transaction receptacle scans the unique barcode. The transaction receptacle processes the information and at block 214 it confirms the account verification by comparing the encryption code embedded in the unique bar code to a preloaded database, which is loaded on a computing device associated with the transaction receptacle of the turnstile. If account verification is unsuccessful, the operation shifts to a denial of payment verification, as further illustrated in FIG. 6.

Figure 6:
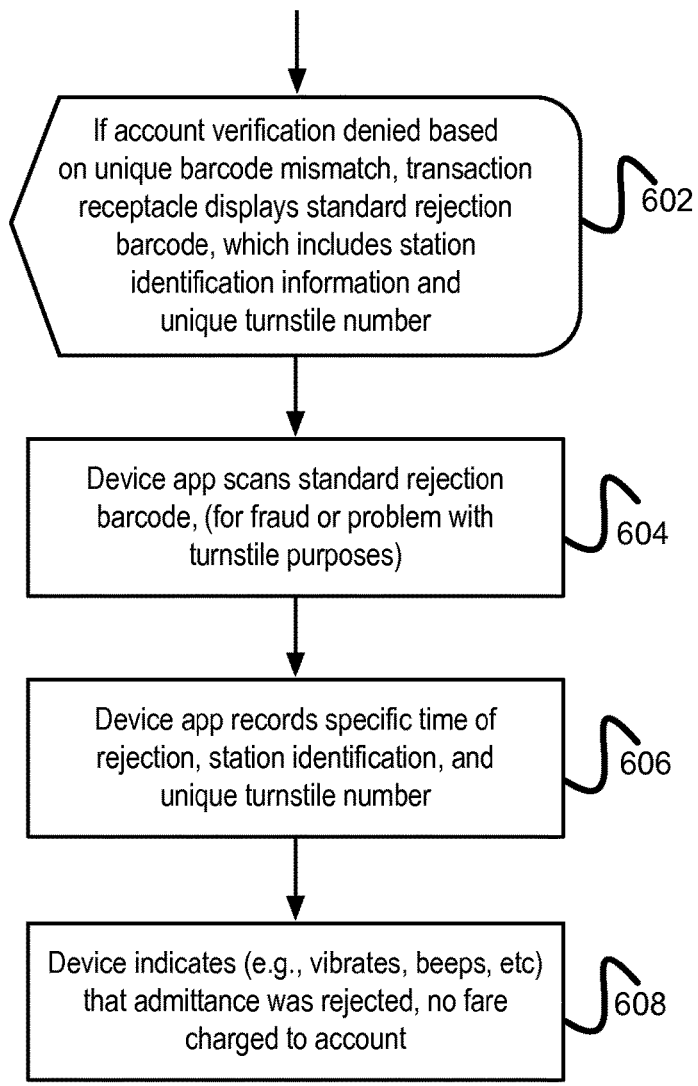
FIG. 6 illustrates the process flow during a denial of verification by a transaction receptacle associated, in one embodiment, of the interactive barcode communication system.

If account verification is successful, control proceeds to block 215 where transaction receptacle positions its barcode scanner and barcode display positions relative to make/model of device. At block 216, where the transaction receptacle displays, in one embodiment, a standard acceptance barcode, which includes the station identification code and an associated unique turnstile number. In one embodiment, at block 216, a session key can be provided to the mobile device to uniquely identify the transaction session, although a session key may also be provide by the mobile device 104 at block 208. At block 218, the application instructs mobile device 104 to, utilizing its capturing device (e.g., camera), scan/capture the standard acceptance barcode. At block 220, the device application records station identification and the unique turnstile number along with the specific time of acceptance of the standard acceptance barcode by mobile device 104. If the barcode displayed on the transaction receptacle is a standard rejection code, control shifts to the denial of payment verification process, as illustrated in FIG. 6.

However, if the barcode is a standard acceptance barcode, it is deemed valid and control shifts to block 222 where the device application displays a confirmation barcode. At block 224, in one embodiment, the transaction receptacle scans the standard confirmation barcode. In one embodiment, the standard confirmation barcode instructs the turnstile device to release the turnstile gate. The production of the standard confirmation barcode, at block 226, also results in the device application deducting the fare amount from the user's existing balance. In one embodiment, as shown at block 228, the user's account balance is current (after the deducted balance) locally within the device application only. Optionally, in another embodiment, block 228 is omitted, and once the standard confirmation barcode is generated, the account information is directly updated with central system 102.

Figure 3:
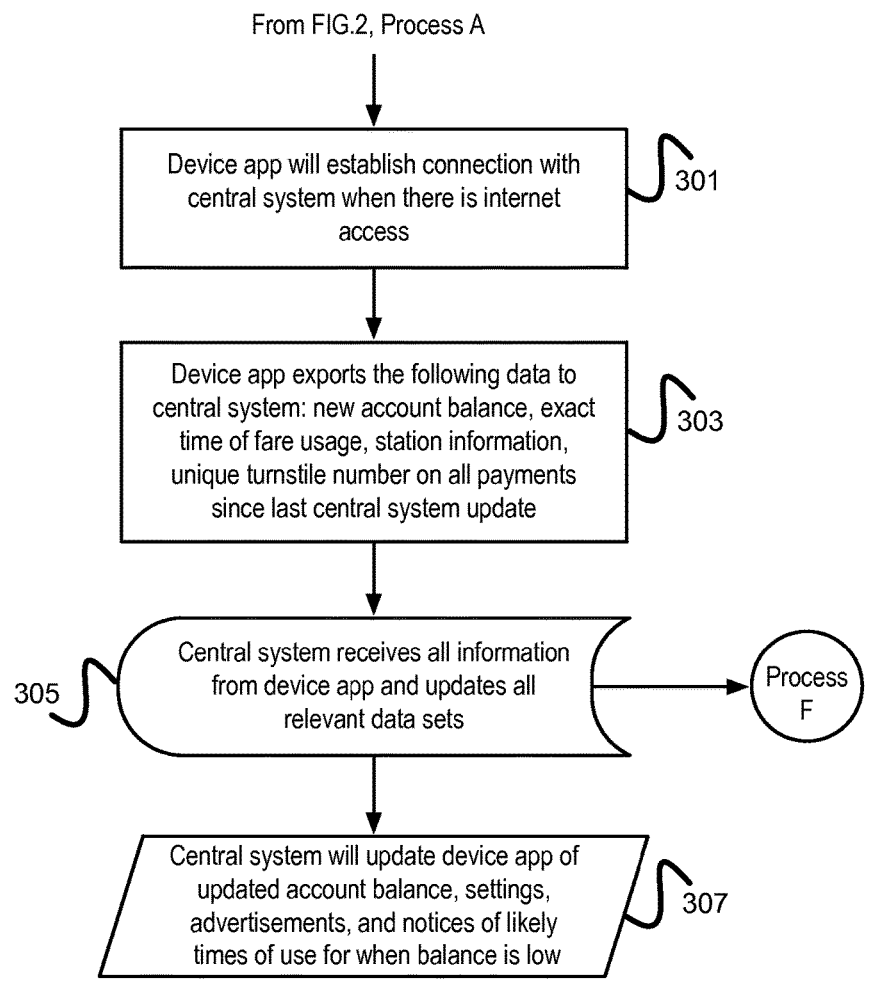
FIG. 3 illustrates, in one embodiment, updating a central payment database associated with the interactive barcode communication system.

FIG. 3 illustrates, in one embodiment, a process 300 (Process B) of updating a central payment database associated with central system 102 after the confirmation barcode is generated by mobile device 104. In this embodiment, at block 301, device application establishes a connection with central system 102 when there is Internet access. At block 303, device application exports the new account balance, exact time of fare usage, station information, unique turnstile information number on all payments or transactions that may have occurred since last time a connection between mobile device 104 and central system 102 was established. At block 305, central system 102 receives the information from the device application and updates its relevant data sets in the central payment database. Central system 102, at block 307, transmits the updated information to mobile device 104 from where device application processes the updated information.

The updated information, in one embodiment, includes an updated account balance and any relevant settings. In one embodiment, the updated information also includes advertisements or balance notifications. The advertisements may be targeted based on criteria pertaining to the user of mobile device 104 or the location of the turnstile device and/or train station, as will be discussed while describing FIG. 7. The pattern of use and predicted use data used for advertisement may also be used to provide low-balance notices to the user based on likely times of use.

Assigning Encryption Codes to Account Numbers

Figure 4:
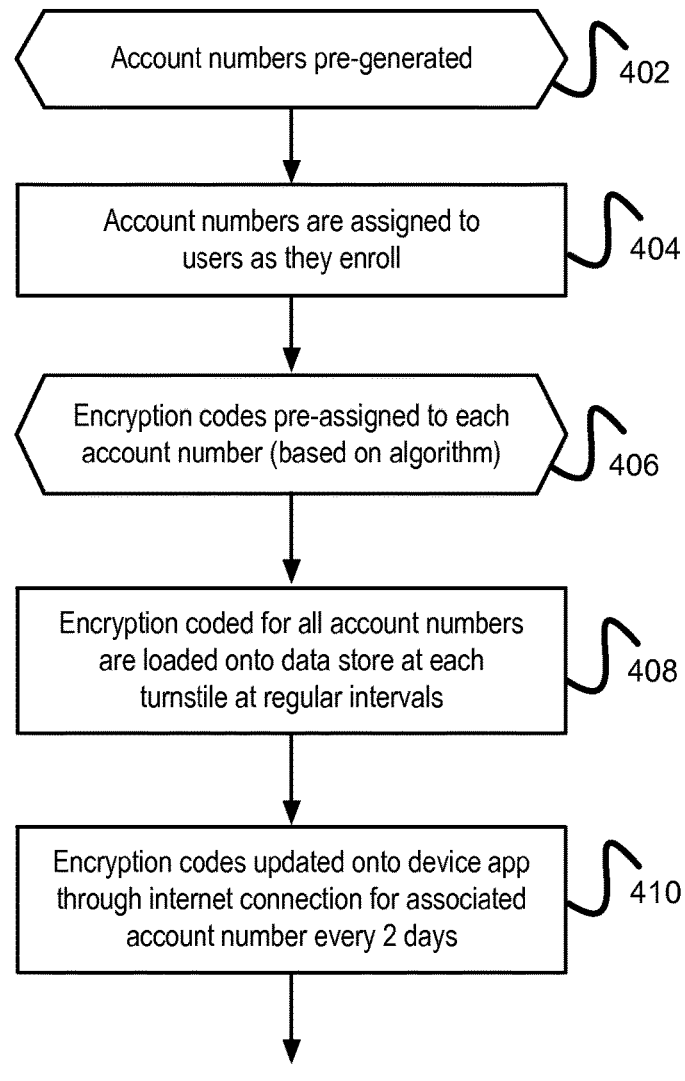
FIG. 4 describes assigning encryption codes for the interactive bar code communication system, according to an embodiment.

FIG. 4 describes, in one embodiment, a process 400 (Process C) of assigning the encryption codes, generated from encryption code generator 106, to account numbers by central system 102. At block 402, account numbers are pre-generated. In one embodiment, the account numbers are randomly generated using a random seed. At block 404, when the user first enrolls, the generated account number is assigned to the user. At block 406, the central system 102 pre-assigns the encryption codes (received from encryption code generator) to the account numbers. In one embodiment, the pre-assigning is performed based on an assignment algorithm that can assign the encryption codes to the enrolled accounts on central system 102. At block 408, the encryption codes and their corresponding account numbers are loaded onto a data store of a computing device associated with point of entry device 108. In one embodiment, the account numbers are loaded at a predetermined period (e.g., every quarter year).

The data store can be updated with the encryption codes and account numbers manually or via a communication network (e.g., the internet or an intranet). At block 410, the encryption codes associated with an account are updated onto mobile device 104, at predetermined periods (e.g., every 2 days). In another embodiment, central server 102 only transmits a subset of all the encryption codes (e.g., 50 codes) associated with an account to mobile device 104 during the predetermined periods. In another embodiment, mobile device 104 can request new codes (already assigned to the account), from central server 102 when the available encryption codes on mobile device falls below a threshold level (e.g., 5 encryption codes).

In one embodiment, the account numbers are associated with the code-time data, as described above. In such an embodiment, in addition to the encryption codes, a unique time stamp (and/or date stamp) is also associated with the account number. Such time/date value indicates the validity of a certain encryption code (e.g., 1 hour, between 9:15 am-10:30 am, etc.) used to generate the unique barcode by mobile device 104. In such an embodiment, the time and/or date information is also loaded onto the turnstile device, in addition to the code data. The code-time data aspect of the invention is further described in FIG. 8 and its corresponding disclosure.

Adding Funds to User Accounts

Figure 5:
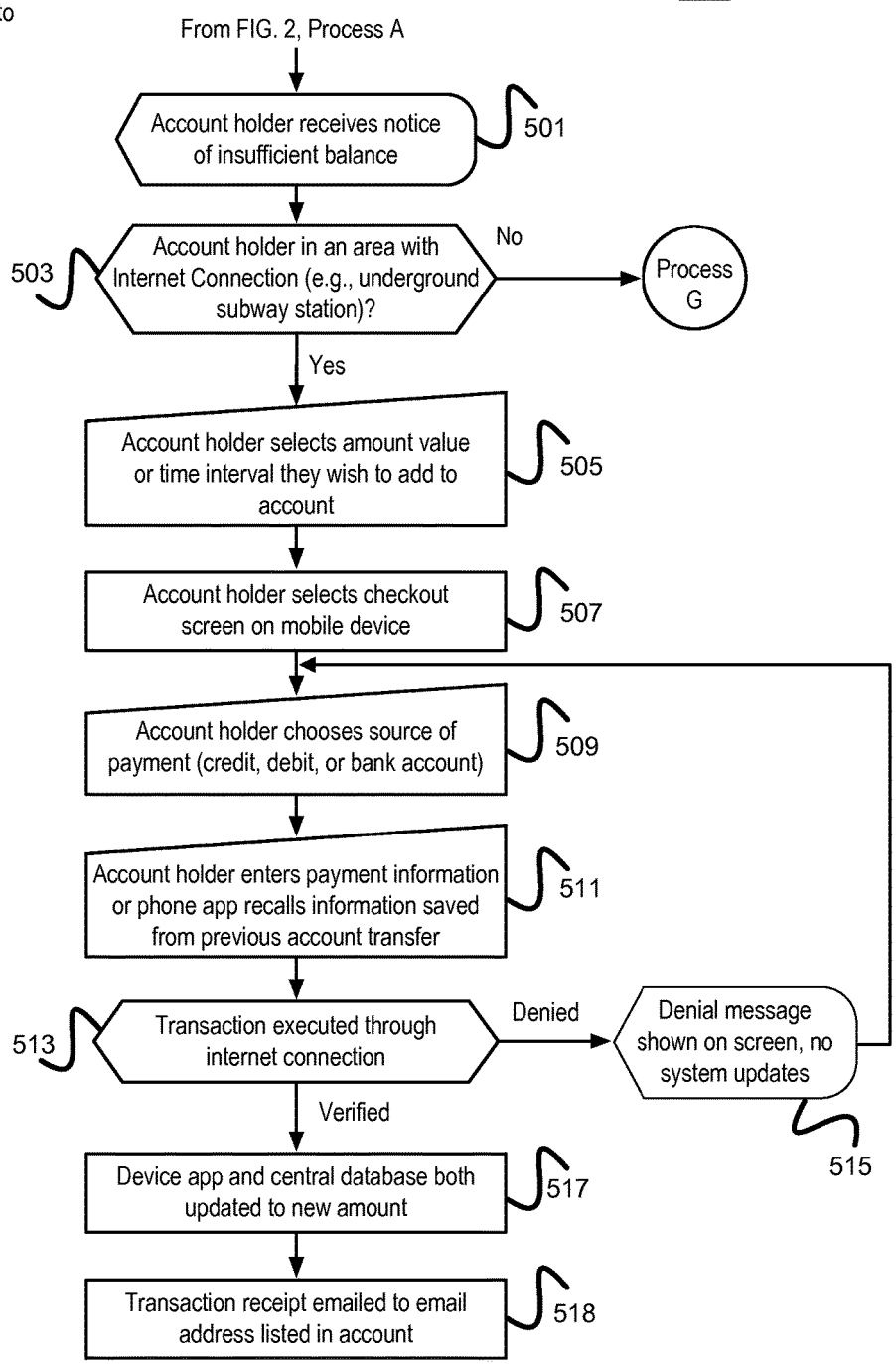
FIG. 5 illustrates an embodiment of the interactive barcode communication system in which funds are added to a user's account associated with a wireless device.
Figure 16:
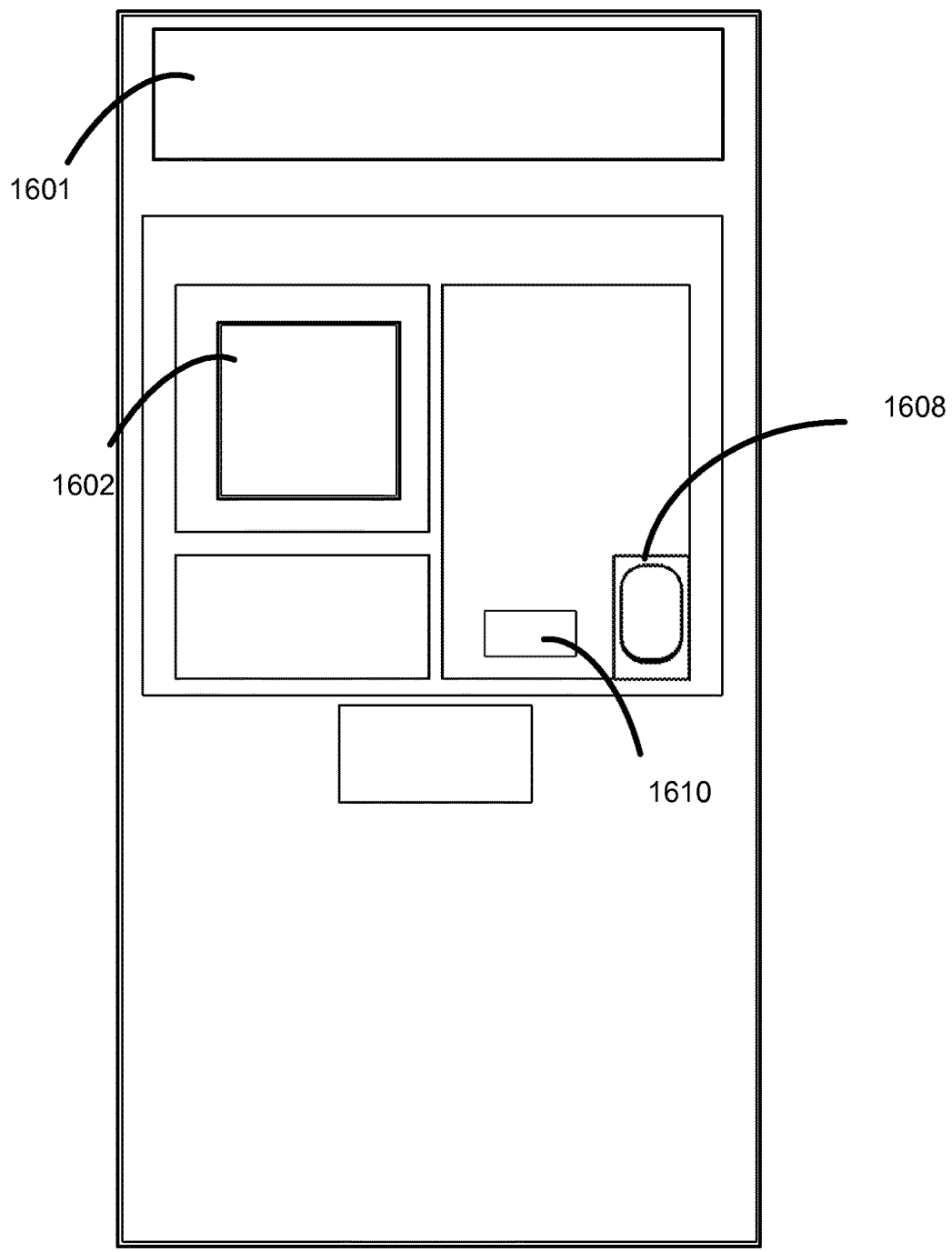
FIG. 16 illustrates an embodiment of a point of sale device of the interactive barcode communication system.
Figure 17:
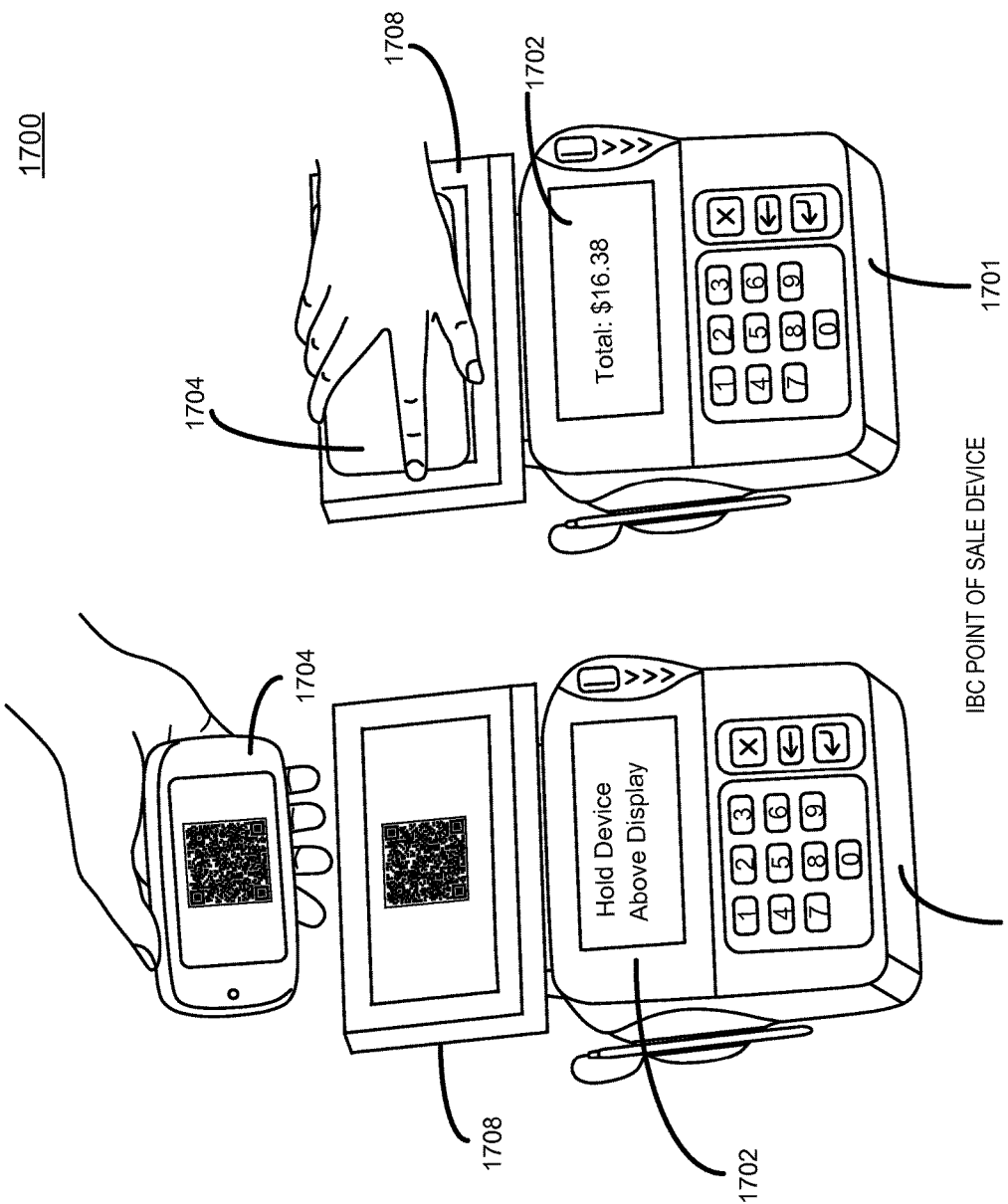
FIG. 17 illustrates another embodiment of a point of sale device of the interactive barcode communication system.
Figure 18:
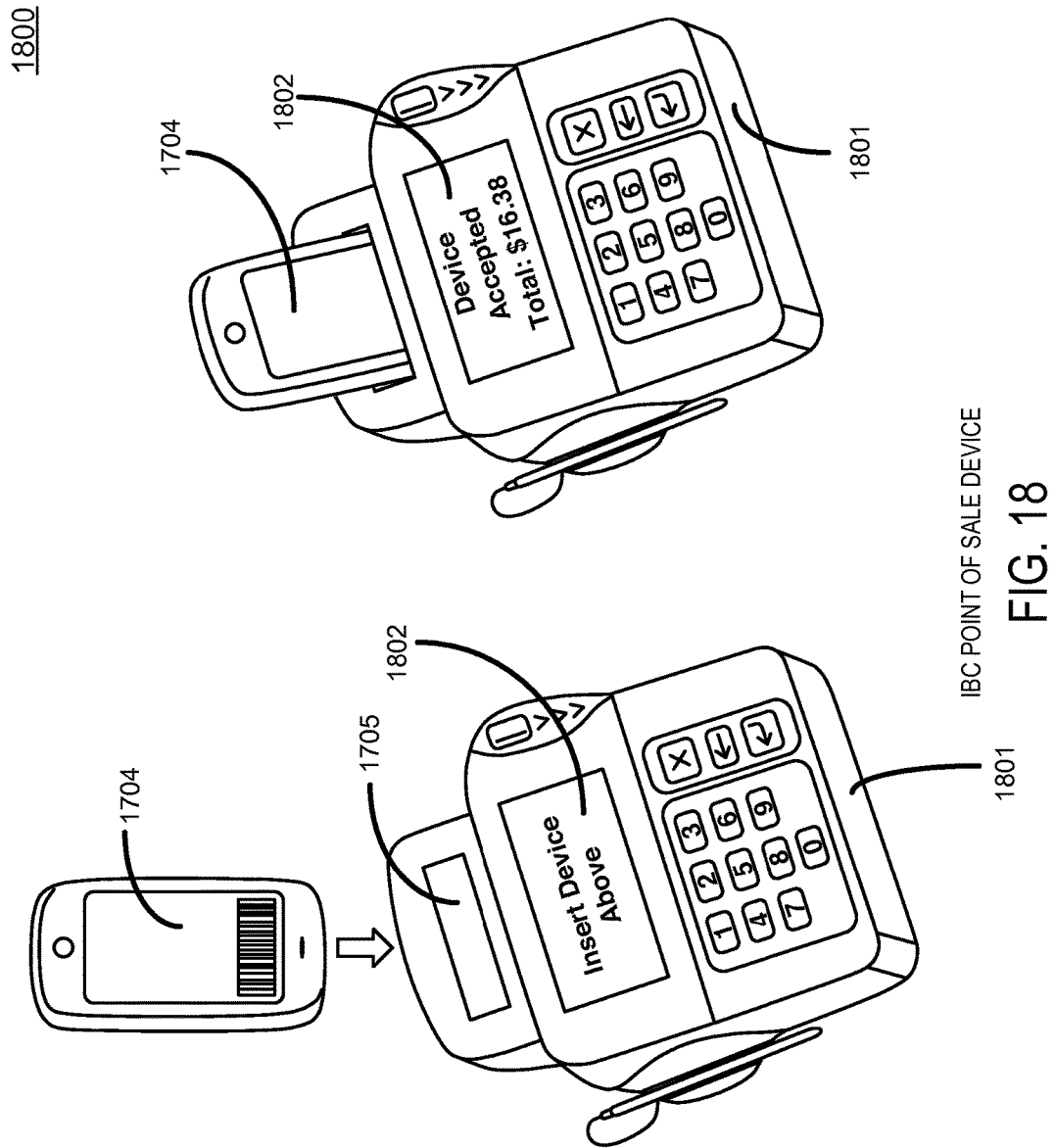
FIG. 18 illustrates yet another embodiment of a point of sale device of the interactive barcode communication system.

FIG. 5 illustrates an embodiment that provides for a process 500 (Process D) implemented by the interactive barcode communication system in which funds are added to a user's account associated with mobile device 104. After the user initially scans the unique barcode (at block 204 of FIG. 2) and it is determined that the user's account does not have the minimum required balance, at block 501, the account holder receives a notice of insufficient balance displayed on mobile device 104. As illustrated in block 503, to add funds to the account without the use of a point of sale device, the mobile device should be at an area where a connection with central system 102 can be established. In an underground subway station with no network connection, the app may notify the use to make use of a point of sale device as illustrated in FIGS. 16-18. If an Internet, or other connection to the central system 102 can be established, the user may proceed to block 505.

At block 505, the account holder selects the amount value they wish to add to the account. In another embodiment, the user may request a time value to be added to the account (e.g., one day pass, weekly pass, etc.), and central system 102 may present the user with an appropriate amount value for the user's authorization. At block 507, the account holder authorizes the amount or transaction at a check out screen on the device application. At block 509, the account holder can be provided with an option to choose a source of payment (e.g., credit, debit, or bank account).

At block 511, the account holder enters the required payment information or the device application automatically populates the payment information that may have been previously saved. The account holder is then asked to confirm the transaction and at block 513 the transaction is executed through an internet or network connection. If the transaction is declined, control shifts to block 515 where a denial notification is displayed on mobile device 104. In one embodiment, control then shifts back to block 509 where the user is requested to select a source of payment. If the transaction is authorized, at block 517, both the device application and central database are updated to reflect the recently authorized amount credited to the user's account balance. In one embodiment, at block 518, a transaction receipt is emailed to the account holder at the email address listed on their account.

Denial of Verification by Transaction Receptacle

FIG. 6 is a flow diagram of a process 600 (Process E) for a denial of verification by a transaction receptacle associated with point of entry device 108, in one embodiment. If at either block 214 or 220 of FIG. 2, where either account verification is denied based on barcode mismatch, transaction receptacle displays a standard rejection barcode and control is passed to block 602. At block 602, the standard rejection code is displayed at the transaction receptacle. In one embodiment, the standard rejection code includes station identification information and the unique turnstile number from where the standard rejection code was displayed. At block 604, device application scans the standard rejection barcode. In one embodiment, the standard rejection barcode information can be decoded and used to detect fraud or problem with the associated turnstile device. At block 606, the device application records the specific time when the rejection was issued, station identification code, along with the unique turnstile number or code. As shown at block 608, the device can, in one embodiment, indicate (e.g., vibrate, beep, etc.), that admittance was rejected. Here, the device ensures that the transaction is canceled and that no fare was charged to the user's account.

Advertisement and Insufficient Balance Notification Generation

Figure 7:
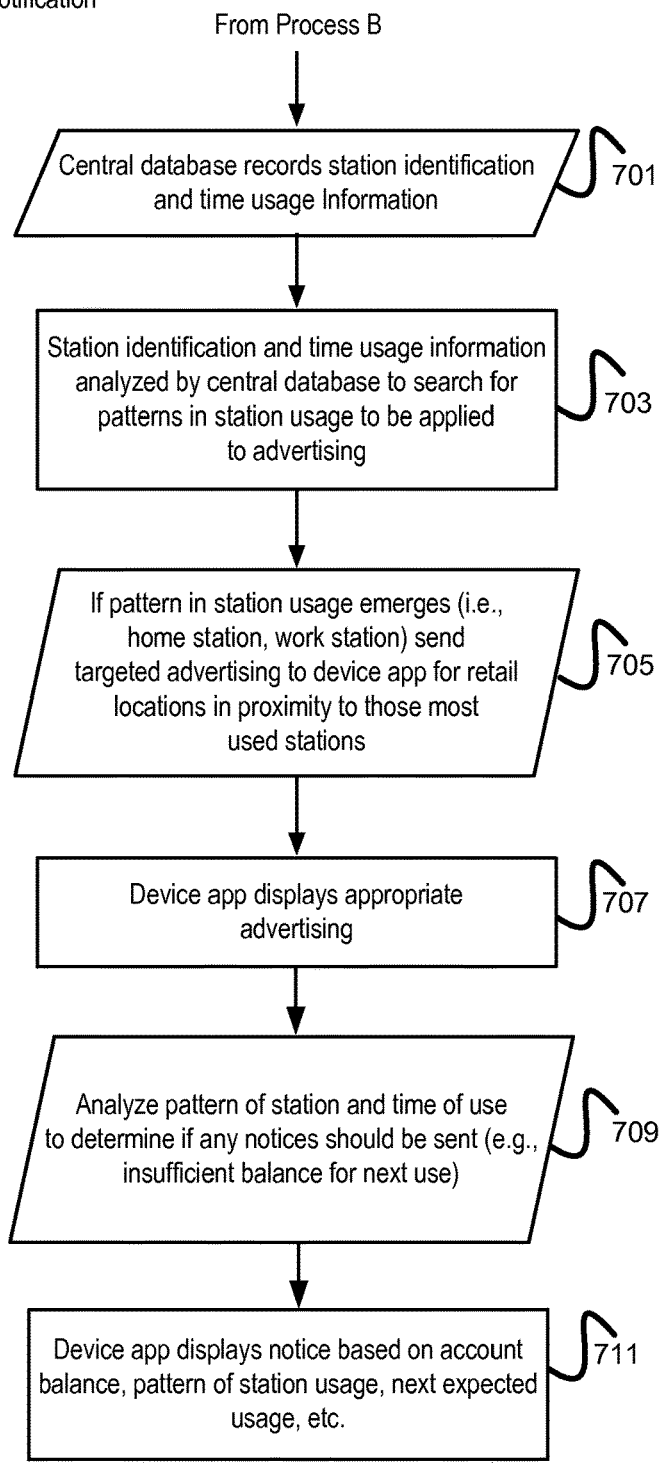
FIG. 7 illustrates an embodiment of the interactive barcode communication system in which advertisements and balance notifications are displayed on a wireless device.

FIG. 7 illustrates an embodiment which provides for a process 700 (Process F) performed by the interactive barcode communication system in which advertisements are displayed on to mobile device 104. During updating the central payment database central system 102 about a recently completed transaction, central system 102 receives all information from device application and updated all relevant data sets, as described herein at block 305 of FIG. 3. In one embodiment, the central database records the station information where the transaction occurred, as shown at block 701. At block 703, the station identification information is analyzed by the ventral database to search for patterns in station usage to be applied to advertising. At block 705, is a pattern in station usage emerges (that is, home station, work station, etc.), central system 102 transmits to mobile device 104 targeted advertisements related to retail locations in proximity to those stations. In another embodiment, advertisement may be based on the location of the station and presenting marketing information or advertisements that pertain to the location, if a pattern is not found. At block 707, mobile device 104 receives the transmitted advertisement and displays it on to the screen. In one embodiment, the advertisement is linkable to a website or other electronic resource (that is, a user may click or touch the advertisement to be forwarded to another electronic resource or server). In another embodiment, the user is presented discount coupons related to businesses in the vicinity of the user's current location. In yet another embodiment, such advertisements may be associated with user surveys, and optionally presenting the user an incentive to complete the surveys. In general, any advertisement strategy can be applied to generate an additional revenue stream, in lieu to the ones described herein.

In one embodiment, as shown at block 709, the advertisement notification logic is supplemented with an algorithm to analyze the patterns of stations used and time of use for a user to determine if and when certain notices should be sent to the user, such as a notice of insufficient balance for next predicted use. As shown at block 711, the device app can display a notice based on an account balance (e.g., current/predicted), pattern of station usage, next expected usage, etc. For example, if a use's account balance indicates an insufficient balance to complete the day's predicted usage, or to complete the immediate next predicted use, a notice can be displayed to the user. In one embodiment, other notifications can be displayed to the user based on pattern of use, such as delays at stations used by the user.

Code-Time Data Generation

As described above, in one embodiment, central system 102 transmits multiple encryption codes along with time period information (code-time data), instructing mobile device 104 to use a certain encryption code during a specified time period.

Figure 8:
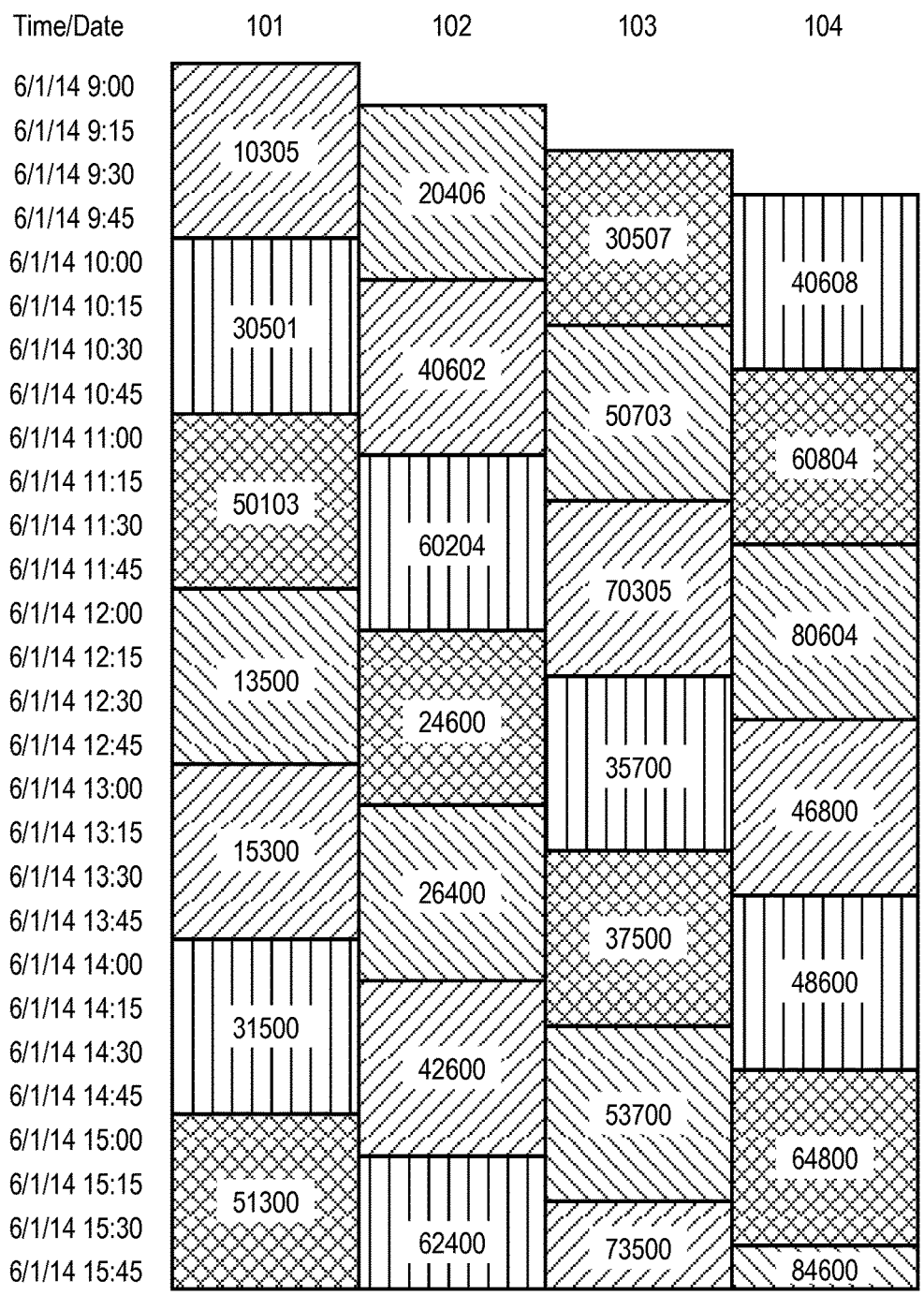
FIG. 8 illustrates an exemplary table of code-time data generated by central system.

FIG. 8 illustrates an exemplary table 800 of code-time data generated by the encryption code generator 106. In addition to having this information at the turnstile device, mobile device 104 can use the code-time data to generate the unique barcodes, responsive to which point of entry device can permit access across a path. Such a process can be used to prevent misuse of the barcodes at point of entry devices 108 by providing additional flexibility to manipulate the validity of a particular barcode only during a certain period of time. In one embodiment, each unique barcode based on the code-time data is valid for a single use (by embedding a date along with the time data). In another embodiment, the code-time data is reusable during certain hours, based on the time of use.

Referring back to FIG. 8, in one embodiment, data table 800 comprises multiple account numbers (e.g., 101, 102, 103, etc.) assigned different unique encryption codes using which unique barcodes are generated by mobile device 104. Further table 800 shows numerous time/date-stamps during which each of the assigned encryption code is expected to be used by mobile device 104 to successfully gain access across point of entry device 108. For example, on Jun. 1, 2014, between 9:00 am and 9:45 am, for a user with account number 101, point of entry device 108 can expect the unique barcode to be generated using encryption code 10305. Similarly, during 12:00 pm and 12:45 pm, point of entry device 108 can expect mobile device 104 of account holder 101 to use encryption code 13500 to generate the unique bar code. During the above specified times, when the unique barcode is scanned, the data store of point of entry device 108 verifies that the correct encryption code is used in the data value of the unique barcode. If the correct barcode is used, in one embodiment, the standard acceptance code is generated and displayed by point of entry device, as discussed above. Similarly, if the correct barcode is not used, a standard rejection barcode is displayed by point of entry device 108. In one embodiment, different (random) timestamps are associated with different account numbers (that is, not all account numbers would be expected to generate a new barcode at a given time to date stamp). For example, as shown account number 102 expects a new encryption code (thus, new unique barcode) to be used between 9:05 am and 10:00 am on Jun. 1, 2014. As can be noted, this time stamp is different (although overlapping) than the one used for account number 101. Such randomness increases the security in issuing new random and unique barcodes and assists in preventing fraud or misuse of the system.

General Interaction of a Mobile Device and Information Receptacle

FIG. 9 illustrates the interaction between a mobile device and a transaction or information receptacle of the interactive barcode communication system, in one embodiment. As shown in this non-limiting exemplary illustration, mobile device 104 is represented by smartphone 904. The smartphone 904 displays a first barcode, which is scanned or captured by information receptacle 908, which is associated with a point of entry device 108. The first barcode can comprise any information that may be required to identify the mobile device and/or account holder (subscriber ID, account number, etc.). Once information receptacle 908 processes the information from the first barcode, information receptacle 908 displays a second barcode. The second barcode is captured by mobile device 904 using a barcode scanning mechanism. Information from the second barcode is processed by mobile device 904. The second barcode can comprise an acceptance code, a rejection code, along with other pertinent information like a timestamp. In one embodiment, the second information also comprises a unique turnstile device ID. In yet another embodiment, the second information further includes a unique station ID.

After the second information is processed, optionally, mobile device 904 displays a third barcode. In one embodiment, the third barcode represents a confirmation code or message using which the information receptacle performs a certain action required to complete a transaction (e.g., instructing a system to permit the user across a turnstile). In one embodiment, the third barcode is displayed only if the second barcode information comprised a signal indicating successful processing of the information first barcode (e.g., an acceptance code). The third barcode is scanned by information receptacle 908, and after processing, the information receptacle can implement steps that are required after a successful completion of a transaction or occurrence, like permitting access across a turnstile device (based on the turnstile device ID previously received by mobile device 904 from the second barcode).

The techniques described herein are not limited to traditional barcodes or barcode readers, and can be used with various image-scanning devices, including camera devices. FIG. 10 illustrates an embodiment in which the interactive communication system is implemented using an image code (e.g., QR code, data matrix, digital watermark, etc.) scanned using a camera of a mobile device 104, such as smartphone 1104. Smartphone device 1004 displays a first image code, which is scanned by the information receptacle 1008 adapted to scan image codes. In one embodiment, information receptacle 1008 is also configured to display image codes. Once information receptacle 1008 processes the information displayed in the first image code, information receptacle 1008 displays a second image code that is captured by the smartphone 1004. The device processes the information from the second image code and displays a third image code that is captured by the information receptacle. Based on the information transmitted, information receptacle can be instructed to perform certain actions, based on the information communicated by smartphone device 1004 to information receptacle 1008. In this disclosure, any use of a barcode may be substituted with an image code. Additionally, smartphone 904 and 1004 are examples of a mobile device 104, and other mobile devices with a display and a barcode or image scanning device may be used.

The scanning and display distance for the barcode or image scanning techniques can vary. In one embodiment, a short distance is used for scanning barcodes and the mobile device 904 or smartphone 1004 is positioned at a short distance from the image scanner. In one embodiment, the mobile device 904 or smartphone 1004 is positioned at a larger distance (e.g., one or more meters) from the image scanner. In one embodiment, interactive barcode communication transactions can be conducted at a distance of a several meters away from the information receptacle 1008, enabling the display of digital advertising on the screen of the information receptacle 1008 while information is exchanged, for example, via image watermarking.

While some embodiments described herein display unique barcodes or unique image codes to transfer information, in one embodiment an ad hoc connection is used for interactive barcode communications. With reference to FIG. 10, in one embodiment, using the ad hoc connection, during Scan 1 the mobile device (e.g., smartphone 1004) displays a unique session key (SK1) that the information receptacle 1008 (e.g., of a point of entry, turnstile, etc.) repeats during Scan 2. The session key (SK1) is to identify which mobile device with which the point of entry intends to interact, as multiple mobile devices may be present and attempting to communicate with the information receptacle 1008. Therefore only the correct mobile device will proceed with Scan 3, for example, to deduct a transit fee from an account balance associated with the mobile device (e.g., when the point of entry is for a turnstile for a mass transit system). In one embodiment, during Scan 2, the information receptacle 1008 displays a second unique session key (SK2). The second unique session key (SK2), in one embodiment, is the primary security element used during the transaction, and the mobile device repeats SK2 during Scan 3 to be given access. SK2 is unique to the transaction and the point of entry and is valid for a limited period of time. In such embodiment, SK1 is used for identification purposes, while SK2 is to prevent the use of screen shots or other manipulation for fraudulent access.

Figure 11:
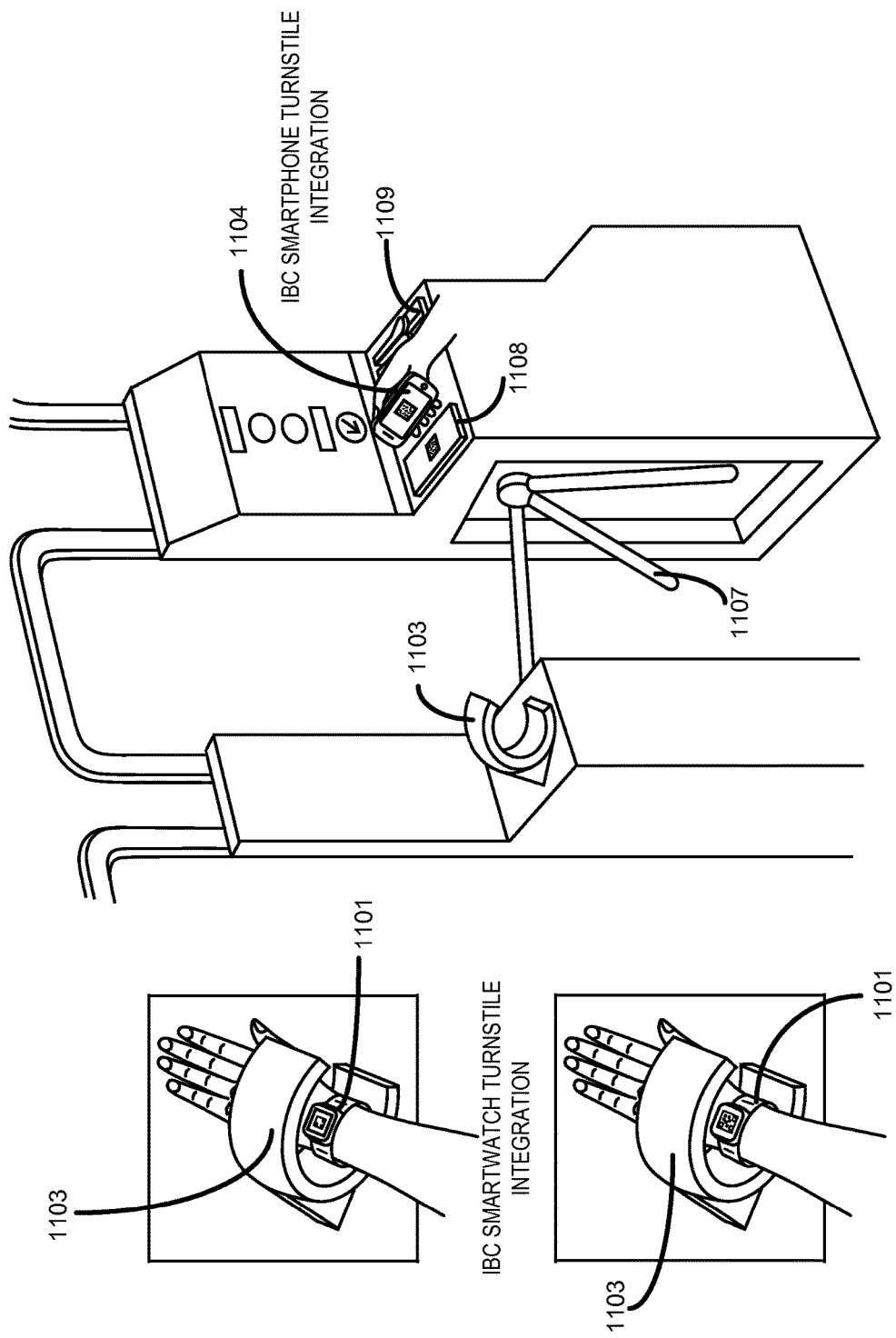
FIG. 11 illustrates an embodiment where the wireless device is a smart watch, as used in the interactive barcode communication system.
Figure 12:
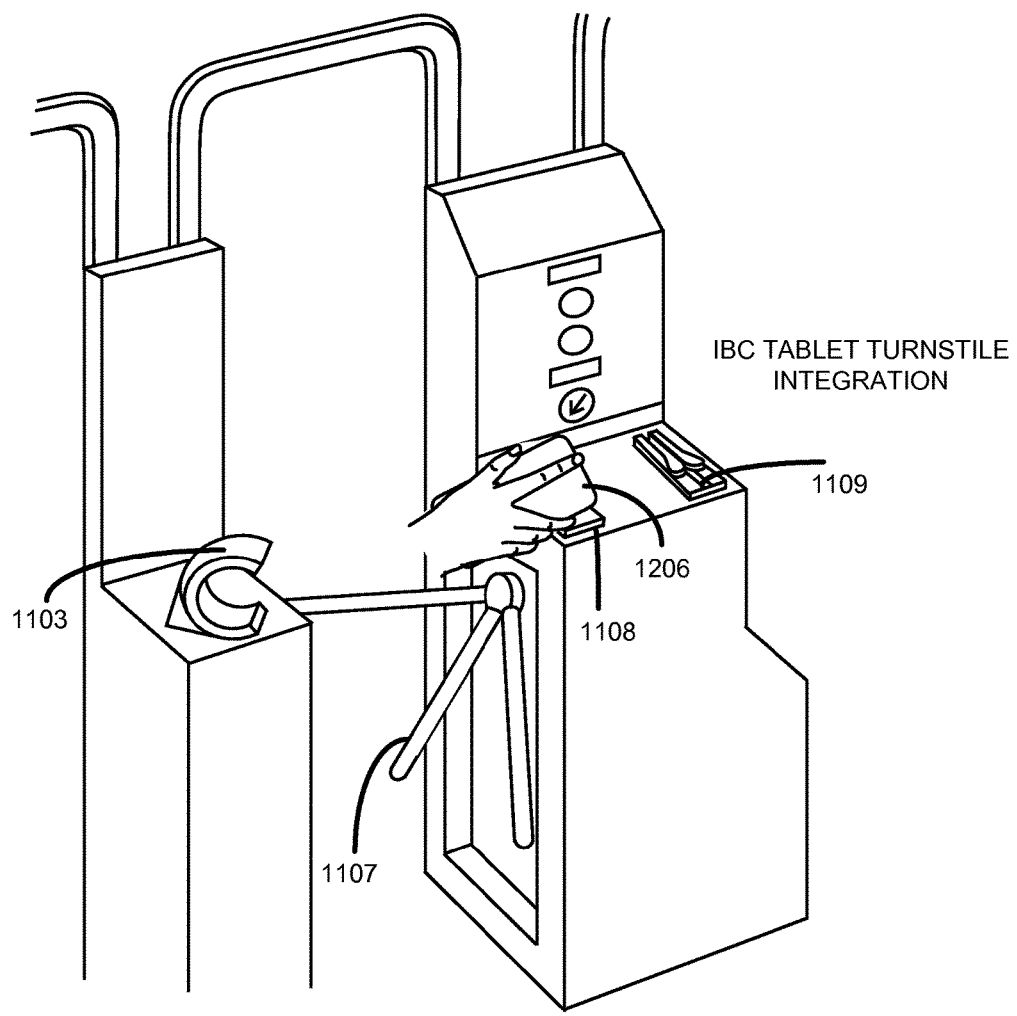
FIG. 12 describes an embodiment where the wireless device is a tablet device, as used in the interactive barcode communication system.

Integration of an Interactive Barcode Communication System with a Turnstile Device FIGS. 11-15, generally describe embodiments of integrating the interactive barcode system with a turnstile device. FIG. 11 illustrates an embodiment where mobile device 104 is a smartwatch 1101. The user can position smartwatch 1101, displaying a barcode or image code under smartwatch receptacle 1103 to interact with the interactive barcode communication system, as described in various embodiments herein. Once the information is successfully exchanged, the user of smartwatch 1101 is permitted to traverse turnstile 1107. In another embodiment, the mobile device 104 can be smartphone 1104 that can be scanned an information receptacle 1108. In one embodiment, the turnstile device, in addition to be integrated with the interactive barcode interactive system, can also have a traditional ticket scanning device 1109. FIG. 12 describes an embodiment where the mobile device 104 is a tablet device 1206. In another embodiment, information receptacle 1108 is capable of interacting with a smartphone device and a tablet device. In another embodiment, different receptacles can be used for smartphones and tablets. FIG. 13 illustrates a close up of information receptacle 1108 (as used with a point of entry device), in one embodiment. In one embodiment, the mobile device 104 can be a smartphone 1104 or a tablet device 1206. In one embodiment, the information receptacle 1108 integration includes one or more raised edges 1302 or display guides to assist the user in placement of the smartphone 1104 or tablet 1206 device.

Figure 14:
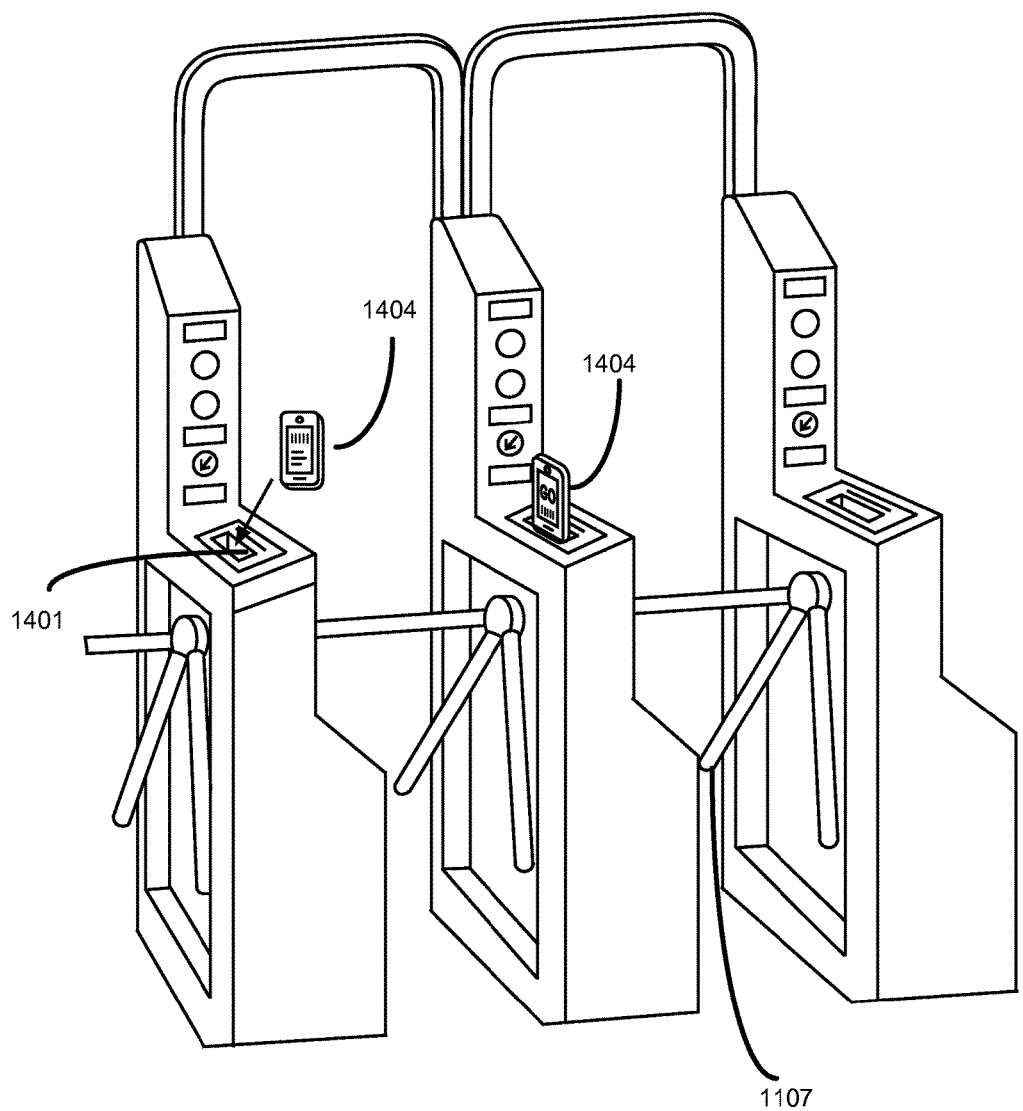
FIG. 14 illustrates an information receptacle as a slot that can be embedded into the turnstile device of integrating the interactive barcode communication system.
Figure 15:
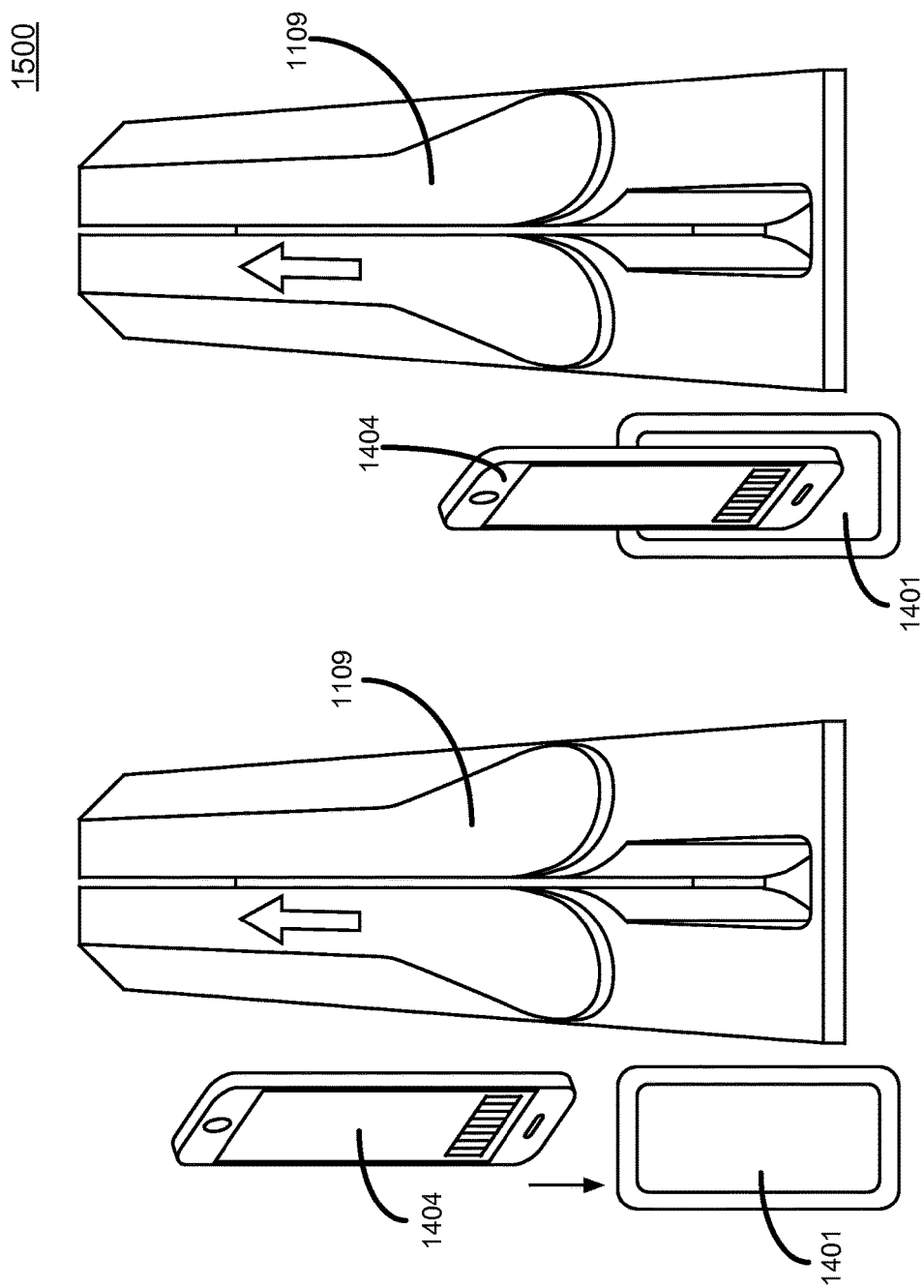
FIG. 15 illustrates a close up, of an embodiment, of an interactive barcode communication system integrated with a turnstile device as a slot with an information receptacle with a traditional ticket scanning mechanism.

In yet another embodiment, information receptacle can be embedded into the turnstile device as illustrated in FIG. 14. As shown, a slot comprising the information receptacle 1401 is configured to accept mobile device 1404. Once the system successfully exchanges the required information, as described in various embodiments herein, turnstile 1107 is permitted to let the user of mobile device 1404 across the turnstile. FIG. 15 illustrates a close up of an embodiment of the interactive barcode communication system integrated with a turnstile device with information receptacle 1401 with a traditional ticket scanning mechanism 1109. In one embodiment, any of the illustrations represented by FIGS. 11-15 can be implemented at a train station where the turnstile device illustrated replaces (or augments) a traditional turnstile device.

FIG. 16 illustrates an embodiment of a point of sale device 1600 of the interactive barcode communication system that is used to add additional funds to an account holder's account. Device 1600 may be a transit ticket vending machine as known in the art with modifications to include information receptacle 1608, which is a version of the information receptacle 1108 used in the associated turnstile integration shown in FIGS. 11-13. Information receptacle 1608 may also be configured as in a recessed configuration as illustrated in FIGS. 14-15. In one embodiment, as shown in FIG. 16, the point of sale device 1600 includes a first informational display 1601, such as a scrolling LED display, to display information or announcements of general use, and a second informational display 1602 to provide usage information to a user of the machine. The user positions a mobile device over a display/scanner of the information receptacle to transmit and receive information. The second informational display 1602 can display an account holder's balance after the transaction is successfully completed. In one embodiment, the account holder's balance is displayed also if the transaction fails. In one embodiment, the information screen 1602 displays the cost associated with the transaction.

FIG. 17 illustrates another embodiment of a point of sale device 1700 of the interactive barcode communication system that may be used to add additional funds to a user's account. In one embodiment, information receptacle 1701 displays a message on information screen 1702, instructing the user to hold mobile device 1704 on a display/scanner 1708. Once the user positions mobile device 1704 over display/scanner 1708, the information screen 1702 can display an account holder's balance after the transaction is successfully completed. In one embodiment, the account holder's balance is displayed also if the transaction fails. In one embodiment, the information screen 1702 displays the cost associated with the transaction.

FIG. 18 illustrates yet another embodiment of a point of sale system of the interactive barcode communication system. In this embodiment, information receptacle 1801 comprises slot 1705 configured to accept mobile device 1704. Information receptacle 1801 displays a message on information screen 1802 to insert device into slot 1705. Once the user places mobile device 1704 into slot 1705, information screen 1802 can display a message indicating that mobile device 1704 has been accepted. In addition, the information screen 1802 can display the account holder's current balance, after the transaction is successful or after the transaction fails, or display the cost associated with the transaction.

Adding Funds to User Accounts Using Point of Sale Devices

Figure 19:
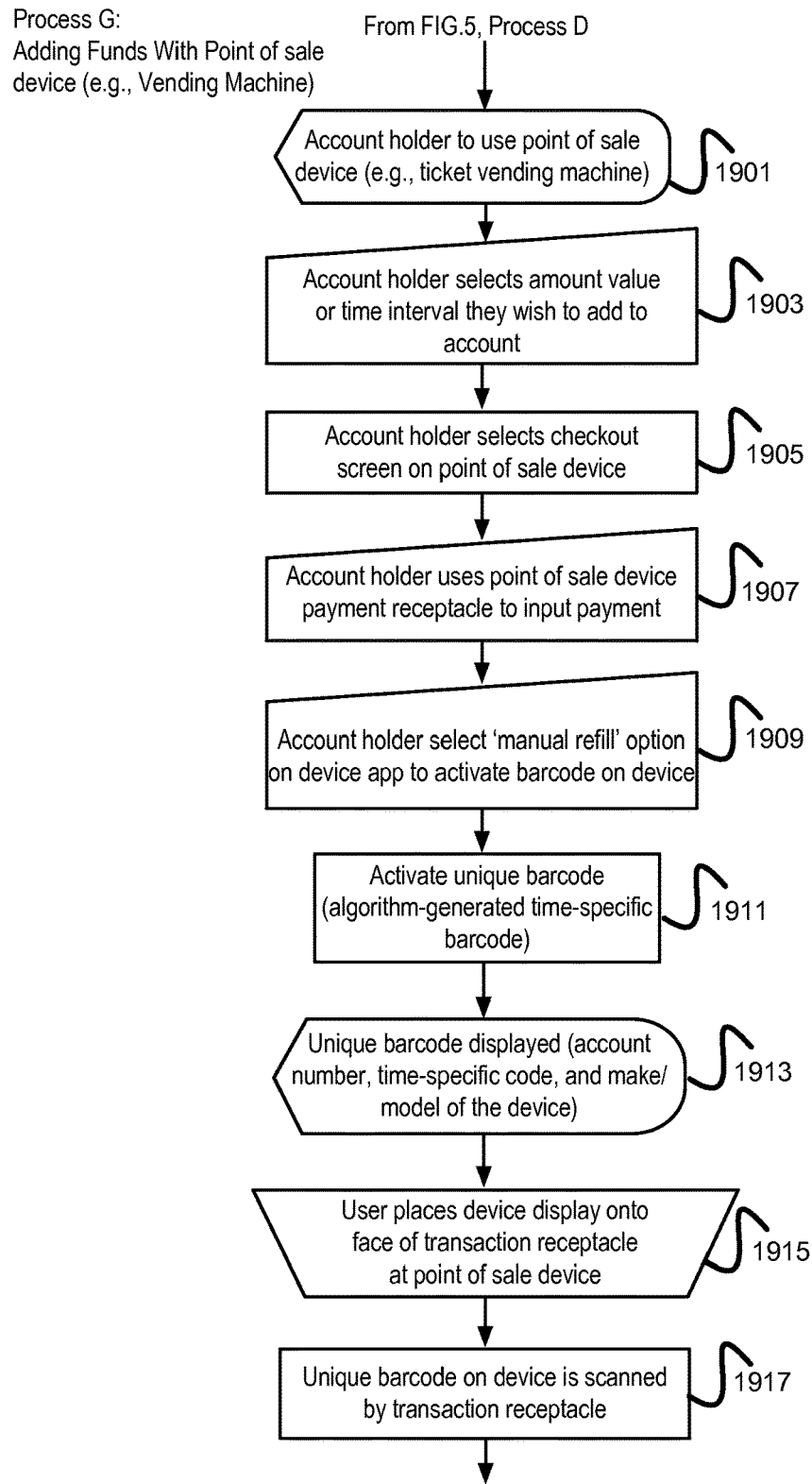
FIG. 19 illustrates an embodiment of the interactive barcode communication system in which funds are added to a user's account using a point of sale device.
Figure 19:
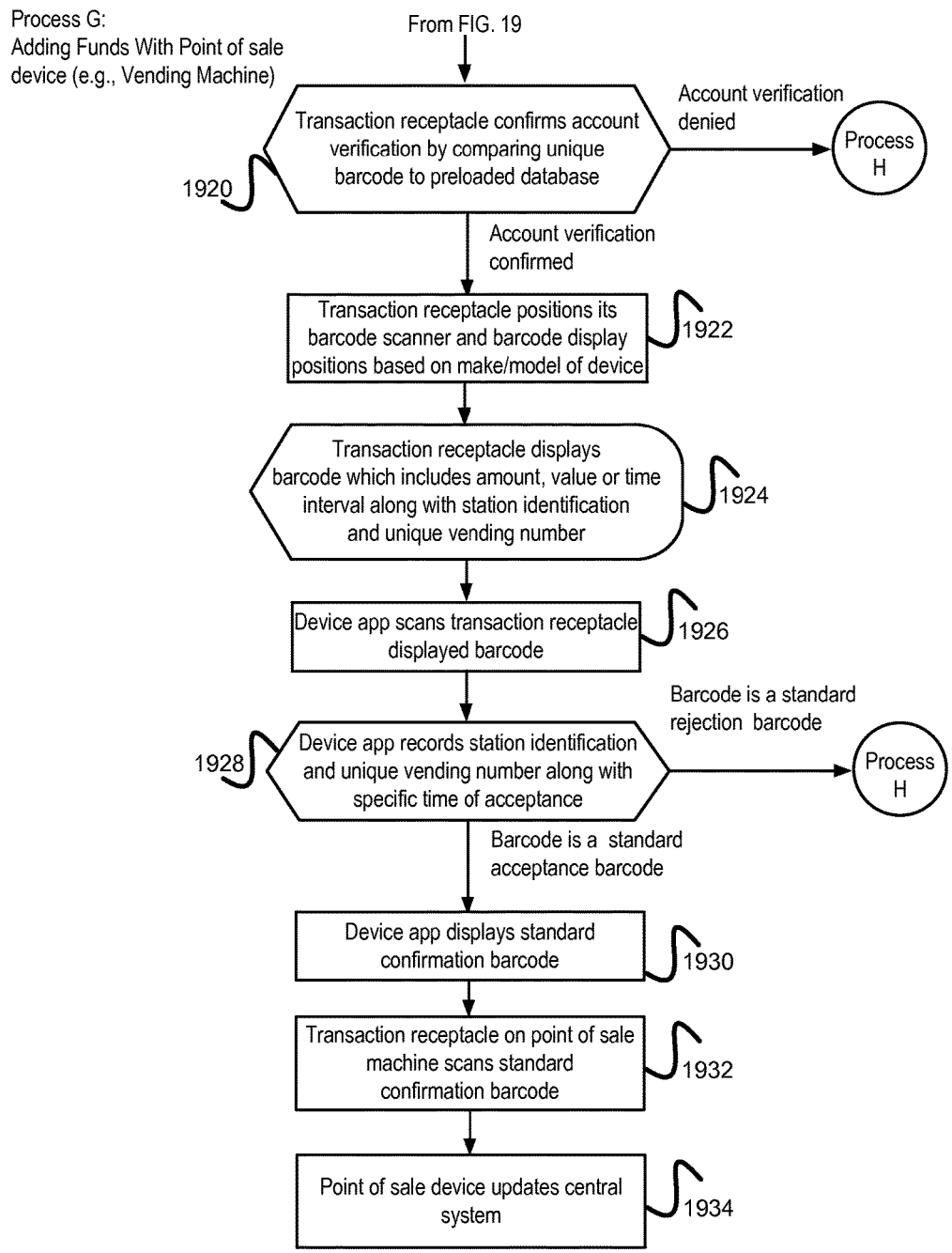

FIG. 19 illustrates an embodiment of the interactive barcode communication system in which funds are added to a user's account associated with mobile device 104 using, for example, one of the point of sale devices of FIGS. 16-18. As shown in block 503 of FIG. 5, a user may be directed to use a point of sale device to add funds to the user's account if the user is at an area where a wireless network connection with central system 102 cannot be established, such as in an underground subway station without effective wireless network coverage. In such case, the process begins as shown in block 1901. At block 1903, the account holder selects the amount value they wish to add to the account. In another embodiment, the user may request a time value to be added to the account (e.g., one day pass, weekly pass, etc.), and central system 102 may present the user with an appropriate amount value for the user's authorization. At block 1905, the account holder selects the option to checkout on the point of sale device. At block 1907 the account holders uses the payment receptacle at the point of sale device to input payment. At block 1909 the user select a 'manual input' option on the mobile device application.

As shown at block 1911 the mobile device activates a unique barcode based on the account holder and device specific information. As shown at block 1913, the unique barcode is displayed on mobile device 104. At block 1915, the user places or positions mobile device 104 onto a face of a transaction receptacle at the turnstile. In another embodiment, the user positions the device so that a barcode reader associated with the turnstile can scan or capture the unique barcode displayed on mobile device 104. At block 1917, the unique barcode is scanned by the transaction receptacle.

The transaction receptacle processes the information, and at block 1920 the receptacle confirms the account verification by comparing the encryption code embedded in the unique bar code to a preloaded database, loaded on a computing device associated with the transaction receptacle of the turnstile. If account verification is unsuccessful, the operation shifts to a denial of payment verification, as further illustrated in FIG. 20. If account verification is successful, control proceeds to block 1922 where transaction receptacle positions its barcode scanner and barcode display positions relative to make/model of device. At block 1924, where the transaction receptacle displays, in one embodiment, a standard acceptance barcode, which includes the station identification code and a unique vending number associated with the point of sale device. At block 1926, the application instructs mobile device 104 to, utilizing its capturing device (e.g., camera), scan/capture the standard acceptance barcode. At block 1928, the device application records station identification and the unique turnstile number along with the specific time of acceptance of the standard acceptance barcode by mobile device 104. If the barcode displayed on the transaction receptacle is a standard rejection code, control shifts to the denial of payment verification process, as illustrated in FIG. 20.

However, if the barcode is a standard acceptance barcode it is deemed valid and control shifts to block 1930 where the device application displays a confirmation barcode. At block 1932, in one embodiment, the transaction receptacle scans the standard confirmation barcode. The production of the standard confirmation barcode displayed at block 1930 results in the device application adding the indicated amount to the user's existing balance stored on the device. The point of sale device, as shown at block 1934, then updates the central system.

Denial of Verification by Payment Receptacle/Point of Sale Device

Figure 20:
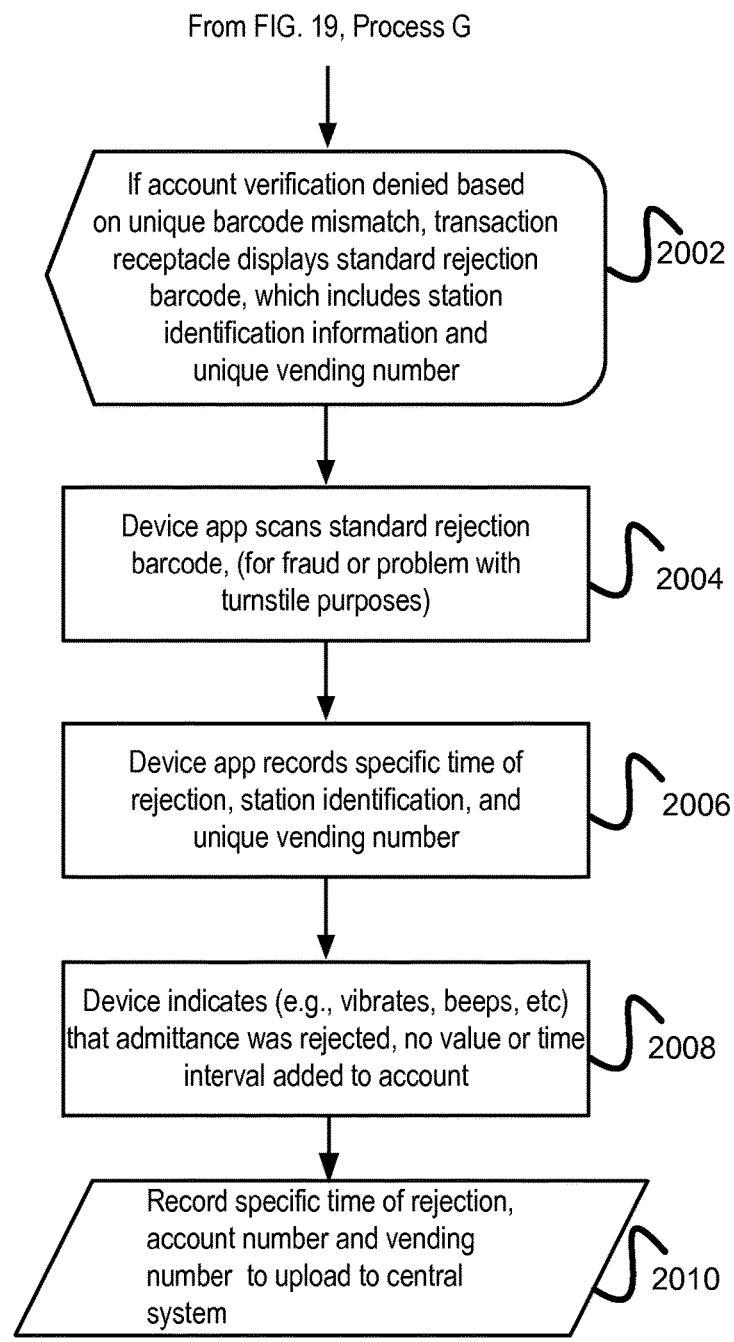
FIG. 20 illustrates the process flow during a denial of verification by a payment receptacle associated with point of sale device, according to an embodiment.

FIG. 20 illustrates the process flow during a denial of verification by a payment receptacle associated with point of sale device, according to an embodiment. If at either block 1920 or 1928 of FIG. 19, where either account verification is denied based on barcode mismatch, transaction receptacle displays a standard rejection barcode, control is passed to block 2002. At block 2002, the standard rejection code is displayed at the transaction receptacle. In one embodiment, the standard rejection code includes station identification information and the unique vending number from the point of sale device. At block 2004 the device application scans the standard rejection barcode. In one embodiment, the standard rejection barcode information can be decoded and used to detect fraud or problem with the associated point of sale device. In one embodiment the standard rejection barcode can contain at least partially encrypted information. At block 2006, the device application records the specific time when the rejection was issued, station identification code, along with the unique vendor number or code. As shown at block 2008, the device can, in one embodiment, indicate (e.g., vibrate, beep, etc.), that admittance was rejected. As shown at block 2010, the point of sale device can record the specific time of rejection, account number and vending number to upload to central system.

The techniques shown in the figures can be implemented using computer program instructions (computer code) and data stored and executed on one or more electronic systems (e.g., computer systems, etc.). Such electronic systems store and communicate (internally and/or with other electronic systems over a network) code and data using machine-readable media, such as machine-readable non-transitory storage media (e.g., magnetic disks; optical disks; random access memory; dynamic random access memory; read only memory; flash memory devices; phase-change memory). In addition, such electronic systems typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

It should be apparent from this description that aspects of the present invention may be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

Figure 21:
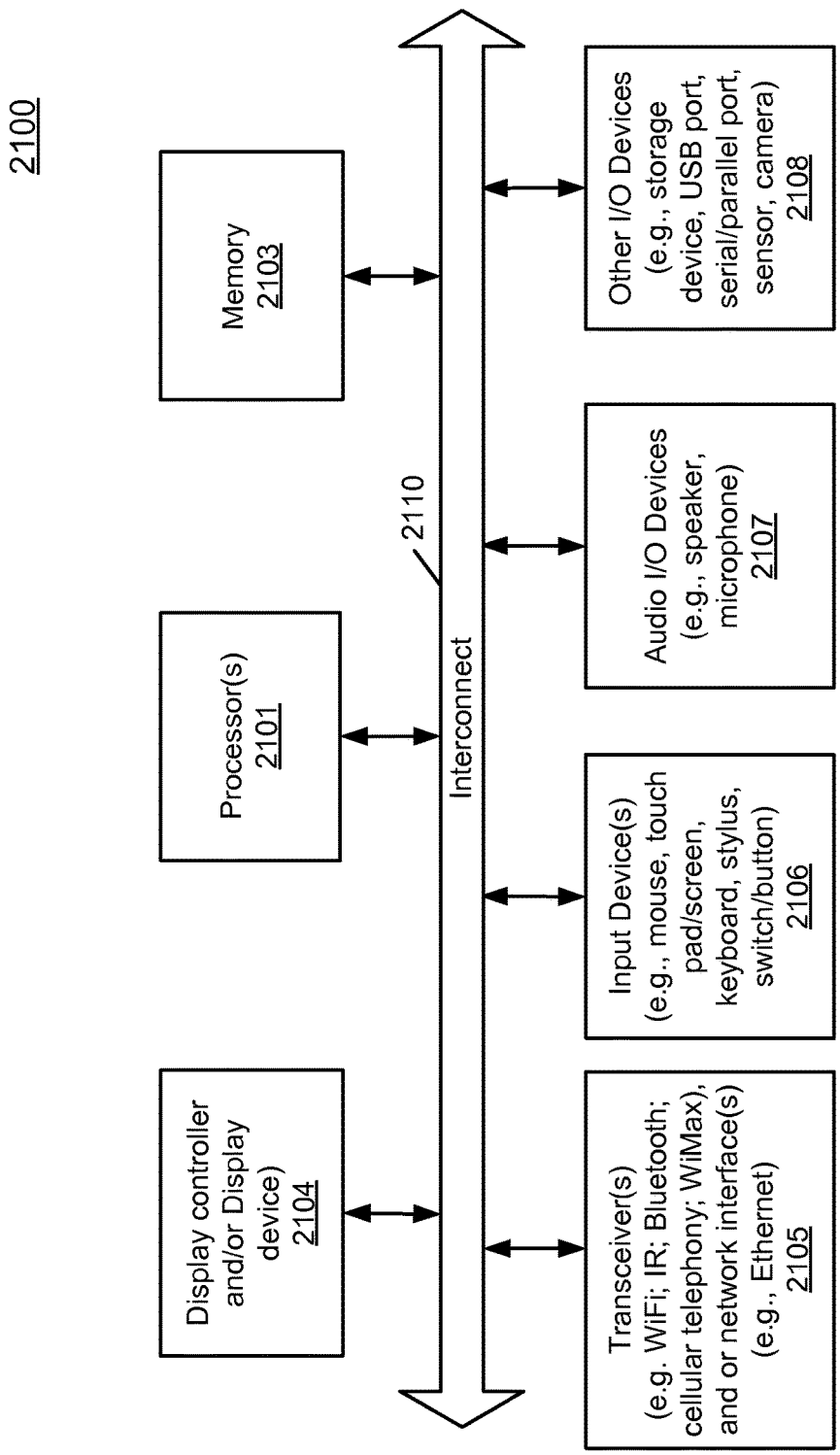
FIG. 21 is a block diagram illustrating a data processing system such as a computing system that may be used with an embodiment.

FIG. 21 is a block diagram illustrating a data processing system such as a computing system 2100 that may be used with one embodiment of the invention. In one embodiment, system 2100 may represent a computing machine associated with any of the devices described in system 100 (e.g., central system 102, mobile device 104, encryption code generator 106, point of entry device 108, etc.). System 2100 may also represent a desktop, a laptop, a tablet, a server, a mobile phone, a programmable logic controller, a personal digital assistant (PDA), a personal communicator, a network router or hub, a wireless access point (AP) or repeater, a wearable device (e.g., smartwatch), or a combination thereof.

System 2100 may have a distributed architecture having dispersed units coupled through a network, or all of its components may be integrated into a single unit. Computing system 2100 may be implemented as part of a diverse range of products implemented using any embodiment of the interactive barcode system described herein. Computing system 2100 may represent any of data processing systems described above performing any of the processes or methods described above. System 2100 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 2100 is intended to show a high level view of many components of the computer system. However, it is to be understood that additional or fewer components may be present in certain implementations and furthermore, different arrangement of the components shown may occur in other implementations.

In one embodiment, system 2100 includes processor 2101, memory 2103, and devices 2105-2108 via a bus or an interconnect 2110. Processor 2101 may represent a single processor or multiple processors with a single processor core or multiple processor cores included therein. Processor 2101 may represent one or more general-purpose processors such as a microprocessor, a central processing unit (CPU), or the like. More particularly, processor 2101 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 2101 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 2101, which may be a low power multi-core processor socket such as an ultra-low voltage processor, may act as a main processing unit and central hub for communication with the various components of the system. Such processor can be implemented as a system on chip (SoC). In one embodiment, processor 2101 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments.

Processor 2101 is configured to execute instructions for performing the operations and methods discussed herein. System 2100 further includes a graphics interface that communicates with graphics subsystem 2104, which may include a display controller and/or a display device.

Processor 2101 may communicate with memory 2103, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the LPDDR2 or LPDDR3 standard. As examples, 2/4/8 gigabytes (GB) of system memory may be present and can be coupled to processor 2101 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 2103 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1803 may store information including sequences of executable program instructions that are executed by processor 2101, or any other device. For example, executable code and/or data of a variety of operating systems, device drivers, firmware (e.g., input output basic system or BIOS), and/or applications can be loaded in memory 2103 and executed by processor 2101. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 2100 may further include IO devices such as devices 2105-2108, including wireless transceiver(s) 2105, input device(s) 2106, audio IO device(s) 2107, and other IO devices 2108. Wireless transceiver 2105 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof.

Input device(s) 2106 may include a mouse, a touch pad, a touch sensitive screen (which may be integrated with display device 2104), a pointer device such as a stylus, and/or a keyboard (e.g., physical keyboard or a virtual keyboard displayed as part of a touch sensitive screen). For example, input device 2106 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO device 2107 may include a speaker and/or a microphone to facilitate voice-enabled functions, such as voice recognition, voice replication, digital recording, and/or telephony functions. Other optional devices 2108 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 2108 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 2110 via a sensor hub (not shown), while other devices such as a keyboard or thermal sensor may be controlled by an embedded controller (not shown), dependent upon the specific configuration or design of system 2100.

To provide for persistent storage of information such as data, applications, one or more operating systems and so forth, a mass storage (not shown) may also couple to processor 2101. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 2101, e.g., via a serial peripheral interface (SPI). This flash device may provide for non-volatile storage of system software.

Note that while system 2100 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems that have fewer or additional components may also be used with various embodiments.

Passenger Self-Authentication Using Barcode Communication

While embodiments of the interactive barcode communication system described above are of use when conducting offline, non-networked machine-to-machine communication, such as in an underground subway station, embodiments have uses in a variety of circumstances. In one embodiment, the interactive barcode communication system is extended to enable passenger self-authentication and ticket purchasing on above ground, network enabled commuter rail systems.

System Overview

The interactive barcode communication system passenger self-authentication system 2200 utilizes a central system 2202 in communication with a conductor mobile device 2204 (e.g., tablet device) and a passenger mobile device 2206 (e.g., smartphone device or tablet device). The central system 2202 includes train data storage and transaction data. The conductor device 2204 executes a conductor application. The conductor application shows a diagram of the train cars on a commuter train including real-time seat occupancy information.

In one embodiment the conductor mobile device 2204 has a secure communication to the central system 2202. The secure communication enables the transmission of manual ticket entries by the conductor to the central system 2202 and the receipt of digital tickets from the central system 2202 to the conductor device 2204. The digital ticket information is used to update the conductor application seat layout shown by the conductor application.

Passenger ticket purchase and self-authentication of previously purchased tickets can be conducted via the passenger mobile device 2206 by scanning a seat barcode 2208 which is displayed on the back of the seat immediately in front of the seated passenger, on a wall or bulkhead in front of a front-row seat, or another conveniently located position. In one embodiment, each seat is uniquely paired with a code that corresponds with the seat position and the train car in which the seat is located. In one embodiment, standing passengers (e.g., standees) in over-capacity trains can scan a barcode positioned in a location near the passenger standing position to authenticate a purchased ticket or purchase an additional one.

Figure 23:
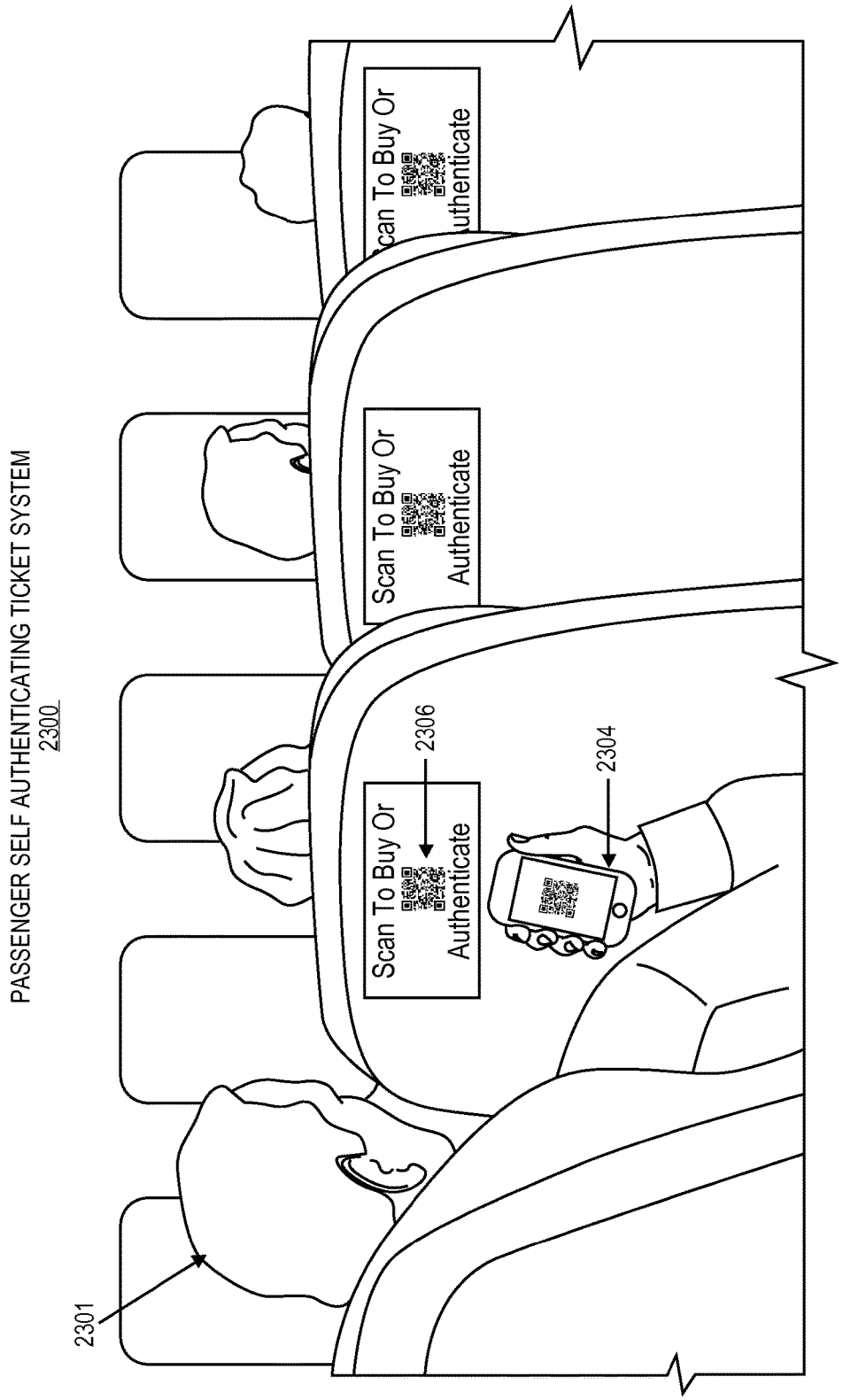
FIG. 23 is a block diagram of a passenger self-authentication system in use, according to an embodiment.

FIG. 23 is an exemplary illustration of the passenger self-authentication system in use. In one embodiment, a passenger 2301 in a seat 2302 can use a mobile device 2304, such as a smart phone, to scan a bar code 2306, such as a 2D image code displayed on the back of a seat in front of the passenger 2301. The image code can be statically displayed or affixed or can be displayed on a display device positioned on the rear of the seat, such as via any scanner/display (e.g., 908, 1008) as described herein.

Exemplary Processes

Figure 24:
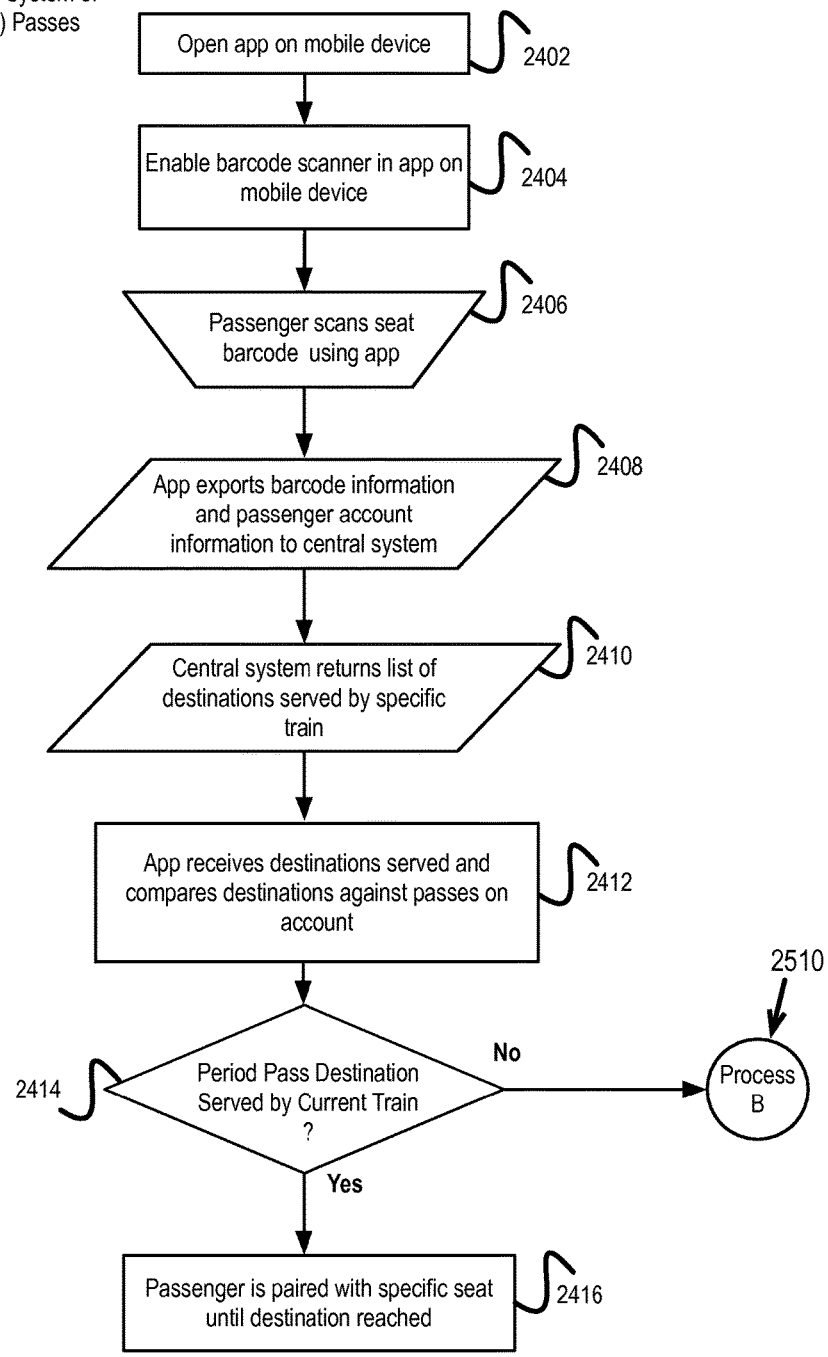
FIG. 24 illustrates an exemplary flow diagram of passenger self-authentication of periodic passes.

FIG. 24 illustrates a flow diagram of an exemplary process 2400 (Process I) for passenger self-authentication of periodic passes. In the exemplary process 2400, a passenger having a periodic pass, such as a monthly pass, can self-authenticate after selecting a seat on a commuter train. The logic flow begins when the passenger opens the passenger self-authentication application on a mobile device, as shown at block 2402, and enables the application's barcode scanner, as shown at block 2404. As shown at block 2406, the passenger can scan a barcode, for example, on the back of the seat in front of the passenger. For front row seats the passenger can scan a barcode located on a wall or other location visible to the passenger. In one embodiment the barcode, which may be an image code, is encoded with a unique number associated with a specific seat, train car, and train.

Figure 22:
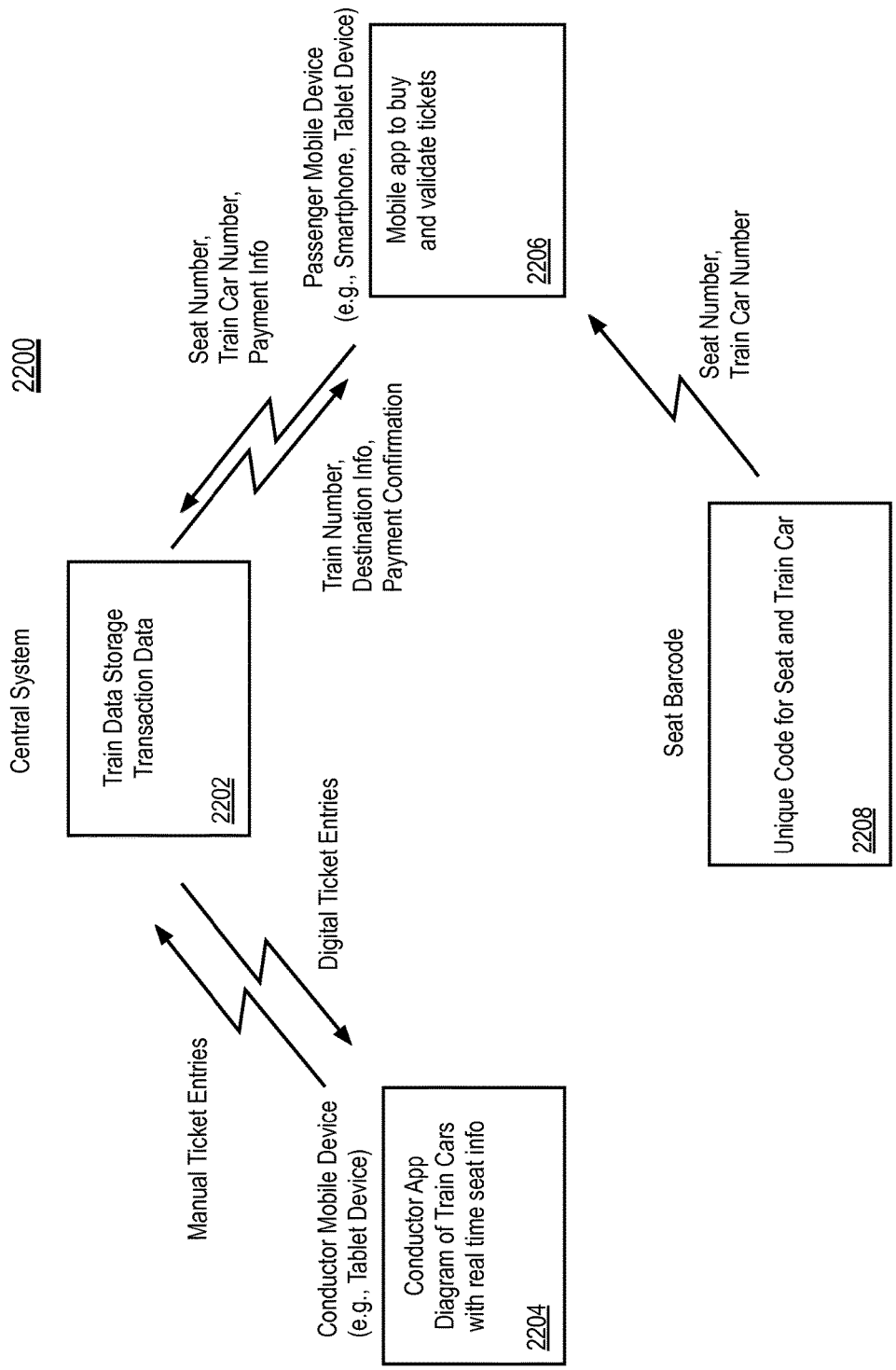
FIG. 22 is a block diagram an embodiment of a passenger self-authentication system.

As shown at block 2408, in one embodiment the application exports barcode information and passenger account information to the central system (e.g., central system 2202 in FIG. 22) via a wireless network connection, which can be a train-based wireless network (e.g., Wi-Fi) or a cellular radio wireless data connection such as an LTE, GSM, CDMA, or other wireless radio technology. As shown at block 2410, the central system can return a list of destinations served by the specific train or vehicle on which the passenger is located. The list is received by the mobile device application, as shown at block 2412, and the device compares the destinations against any passes that are associated with the account (e.g., weekly pass, monthly pass, or other periodic passes). At block 2414, the application determines if the pass applies to a destination served by the train on which the passenger is located. If the passenger's current train serves a destination for which the pass is applicable, the passenger is paired with the specific seat associated with the barcode that was scanned with the application, as shown at block 2416. In one embodiment, the passenger is paired with the seat until the destination is reached. If the passenger's current train does not serve the pass destination, the logic flow proceeds to block 2510 of exemplary Process J, shown in FIG. 25.

Figure 25:
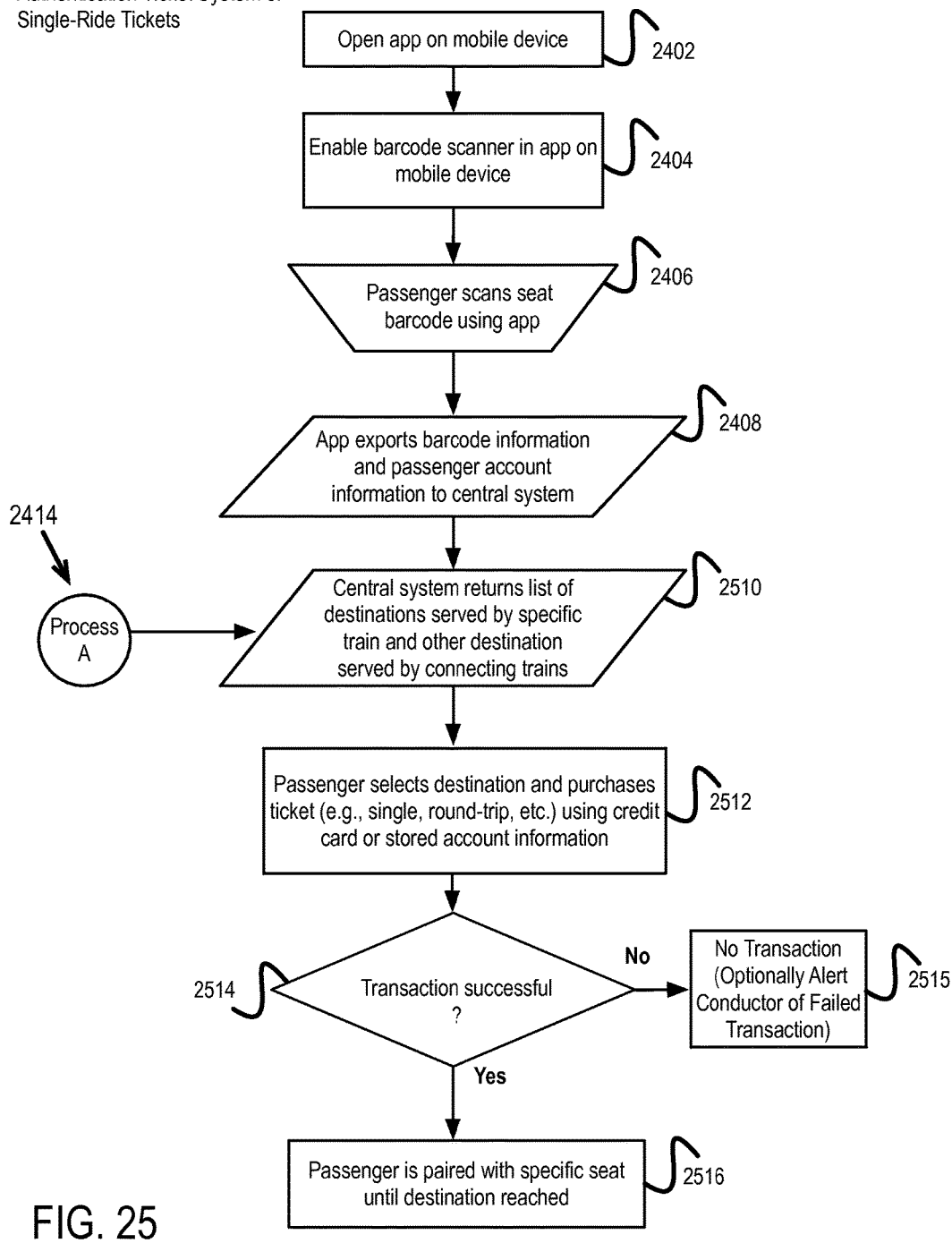
FIG. 25 illustrates an exemplary flow diagram of passenger self-authentication of single-ride tickets.

FIG. 25 illustrates a flow diagram of an exemplary process 2500 (Process J) of passenger self-authentication when purchasing a single-ride ticket. In the exemplary process 2500, a passenger having a periodic pass, such as a monthly pass, can purchase additional tickets for destinations not served by the pass and self-authenticate the purchased ticket. For periodic pass holders, the process begins at block 2510 after transitioning from block 2414 of the process 2400 (Process I), as shown in FIG. 24. Alternatively, a non-pass holding passenger can purchase a single ride ticket using a process beginning at block 2402 and proceeding to block 2408, as previously described in FIG. 24.

In one embodiment, as shown at block 2510, the central system returns the list of destinations served by the passenger's specific train, as well other destinations served by a connecting train or transit line that can be reached from the current. As shown at block 2512, the passenger can select a destination and purchase single-ride or round trip ticket using credit card information that can be entered into the application, or that has been previously stored within the application. A transaction can occur via the application to purchase the ticket and, as shown at block 2514, if the transaction is successful the passenger is paired with the specific seat associated with the barcode, as shown at block 2516. If the transaction is denied, no transaction occurs, as shown at block 2515. In one embodiment, after one or more failed transactions a train conductor receives alert that passenger in a specific seat and train car is un-ticketed and that one or more transactions to purchase a ticket failed or were denied.

Figure 26:
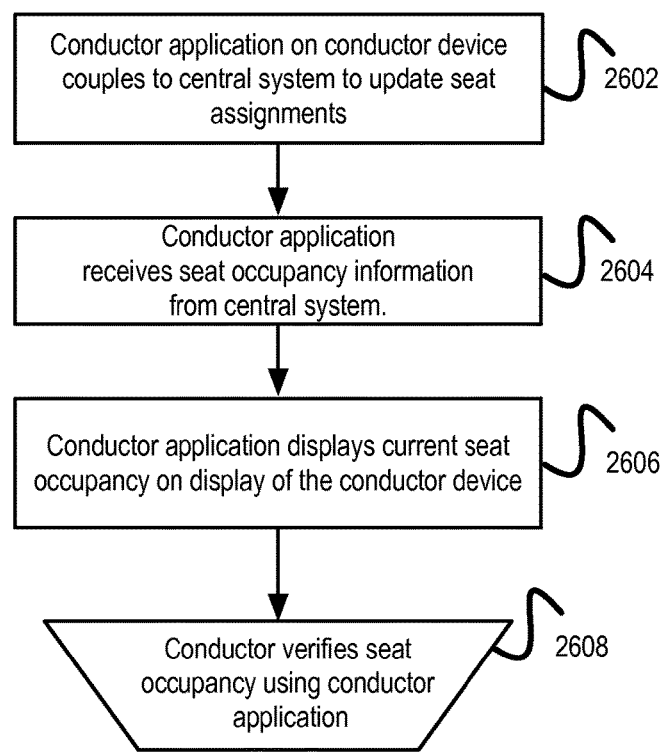
FIG. 26 illustrates an exemplary flow diagram of a conductor ticket verification process using a conductor application.

FIG. 26 illustrates a flow diagram of exemplary process 2600 (Process K) for conductor ticket verification process using a conductor application. In the exemplary process 2600, a train conductor has a tablet device, or another mobile device, which executes an application to display a seat diagram of empty and occupied seats within the train. As shown at block 2602, the conductor application can connect to the central system (e.g., 2202 of FIG. 22) to receive an update to seat assignment information on the train. As shown at block 2604, the central system can update the conductor application with information regarding seat occupancy on the conductor's train over a wireless network. In one embodiment, the conductor application can also receive information from one or more passenger self-authentication applications on the train, for example, on trains having internal WI-FI.

As shown at block 2606, when the conductor application is updated, via the central system or a local connection, the conductor's display is updated with information as to which passenger is paired with which seats. The conductor's tablet diagram can also be updated to reflect newly occupied or vacated seat. In one embodiment, the occupancy information can be displayed in an anonymized fashion, such that the conductor can quickly ascertain which seats should be occupied or should be empty. Using this information, as shown at block 2608, the conductor can verify seat occupancy within each train car. The conductor can manually authenticate passengers having paper tickets or passengers who have not authenticated a digital monthly pass or single-ride ticket via the passenger self-authentication system.

Figure 27:
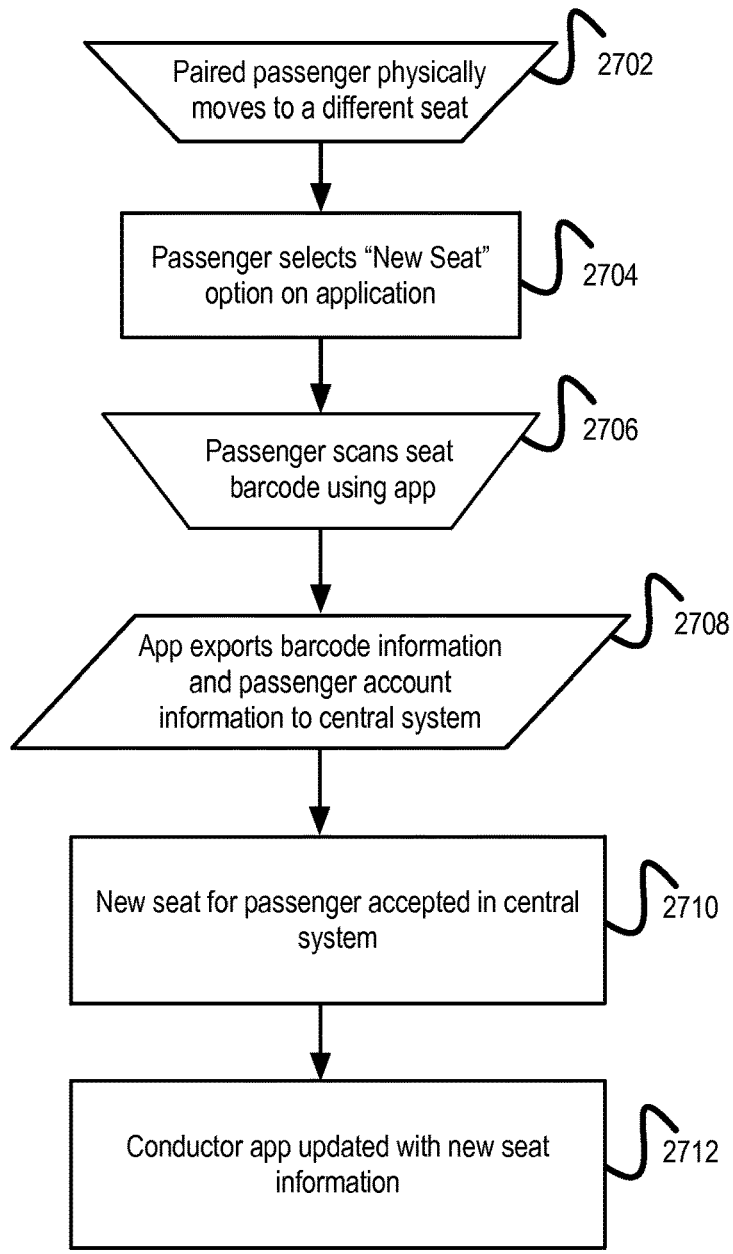
FIG. 27 illustrates an exemplary flow diagram of a process to enable a mid-journey passenger seat change.

FIG. 27 illustrates a flow diagram of an exemplary process 2700 (Process K) to enable a mid-journey passenger seat change. In the exemplary process 2700, a passenger can re-locate to a different seat during a journey and re-pair with the new seat. After the passenger physically moves to a new seat, as shown at block 2702, the passenger can open the self-authentication mobile device application on a mobile device and select an option for a "New Seat," as shown at block 2704. In one embodiment, this option is only available after the passenger has registered and authenticated a seat on the train. After selecting the New Seat option, the passenger can scan the barcode associated with the new seat, as shown at block 2706. As shown at block 2708, the mobile device application then exports the information encoded in the barcode and the account information of the passenger to the central system via a wireless network (e.g., Wi-Fi, GSM, LTE, CDMA). Once the new seat pairing is accepted into the central system, as shown at block 2710, the display of the conductor application is updated to reflect the new information regarding empty and occupied seats, as shown at block 2712.

Figure 28:
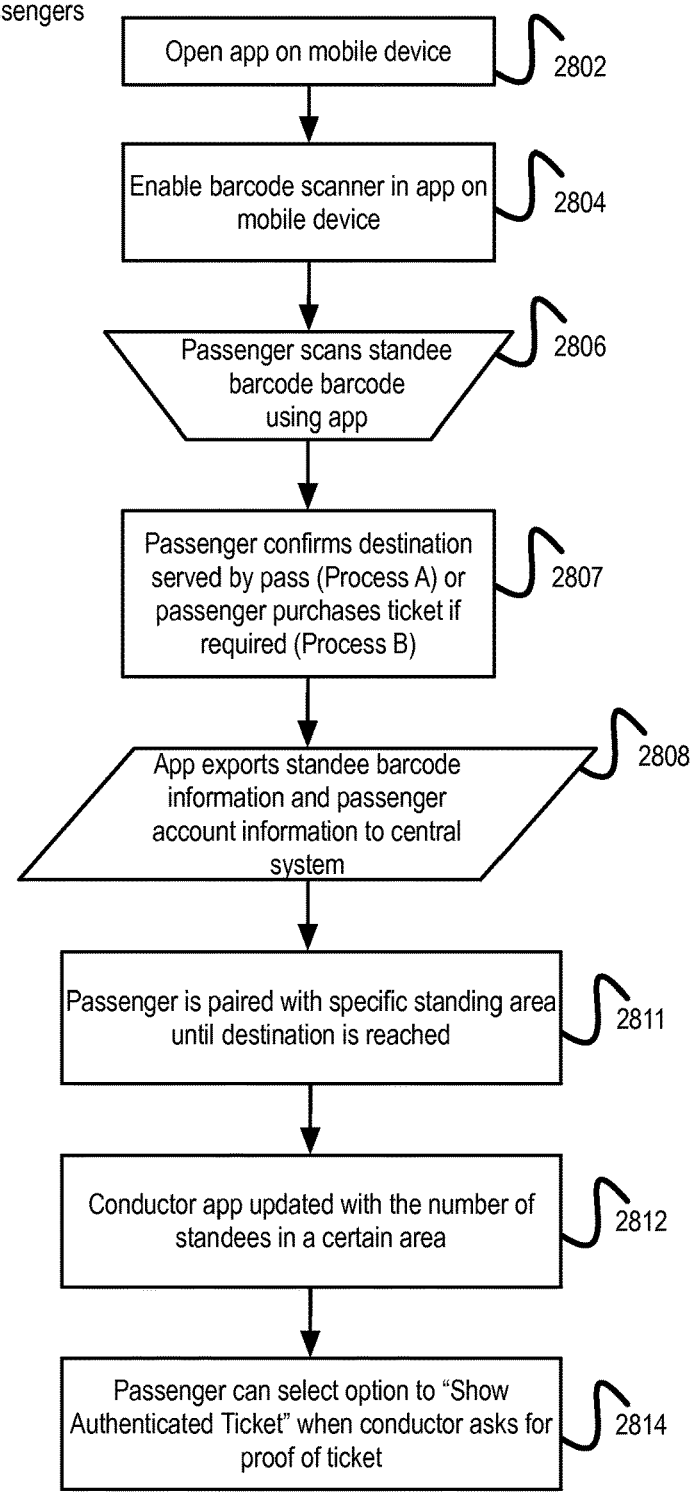
FIG. 28 illustrates an exemplary flow diagram of passenger self-authentication of standee passengers.

FIG. 28 illustrates an exemplary flow diagram of a process 2700 (Process M) of passenger self-authentication for standee passengers. In the exemplary process 2700, the logic flow begins when a standing passenger (e.g., standee) opens the passenger self-authentication application on a mobile device, as shown at block 2802, and enables the application's barcode scanner, as shown at block 2804. When no seats are available a passenger can stand at various positions throughout aisles of a train car. Unique barcodes can be placed throughout the train car for scanning by standees. The standee barcodes are not limited to one passenger and can be scanned by multiple passengers to authenticate tickets. Accordingly, as shown at block 2806, a passenger in a standee area can scan a standee barcode to begin one of either Process A of FIG. 24 or Process B of FIG. 25. Once a periodic pass is validated (e.g., Process A) or a single ride-ticket is purchased (e.g., Process B), the application can export barcode information and passenger account information to central system via a wireless network, as shown at block 2808. Once the information is exported, the passenger is then paired with a specific standing area until the destination is reached, as shown at block 2811.

Subsequently, as shown at block 2812, the conductor's mobile device, via the conductor application, is updated with the number of standees in a certain area. In one embodiment the standee passenger can select an option on the passenger self-authentication application to "Show Authenticated Ticket" if a conductor requests a proof of an authenticated ticket. The Authenticated Ticket can show information such as the origin, destination, and real time count of the time since ticket was authenticated.

Figure 29:
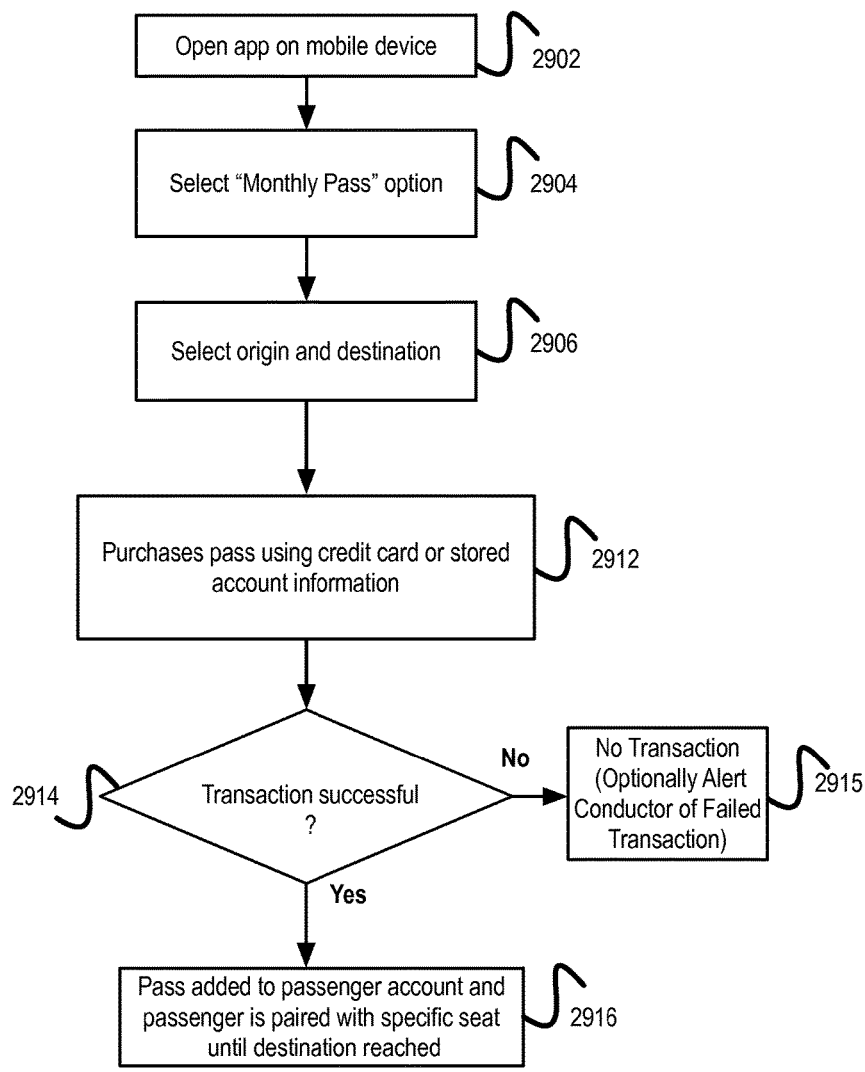
FIG. 29 illustrates an exemplary flow diagram of a process to enable passenger purchase of a periodic pass using an image code system.

FIG. 29 illustrates an exemplary flow diagram of a process 2900 (Process N) to enable passenger purchase of a periodic pass using an image code system. In the exemplary process 2900, a passenger begins by opening a self-authentication application on a mobile device, as shown at block 2902. The passenger can then select an application option labeled "Monthly Pass," as shown at block 2904. The passenger can then select an origin and a destination, as shown at block 2906. The passenger can then purchase a pass using entered payment information or payment information stored within the application, as shown at block 2912. As shown at block 2914, if the transaction is successful, the pass is added to the passenger's account and the passenger is paired with the specific seat associated with the barcode, as shown at block 2916. If the transaction is denied at block 2914, no transaction occurs, as shown at block 2915. In one embodiment, after one or more failed transactions a train conductor receives alert that passenger in a specific seat and train car is un-ticketed and one or more transactions to purchase a ticket was denied.

The processes shown in FIG. 24 through FIG. 29 can be performed using a data processing system such as shown in FIG. 21.

Conductor Mobile Device and Seat Map Application

Figure 30:
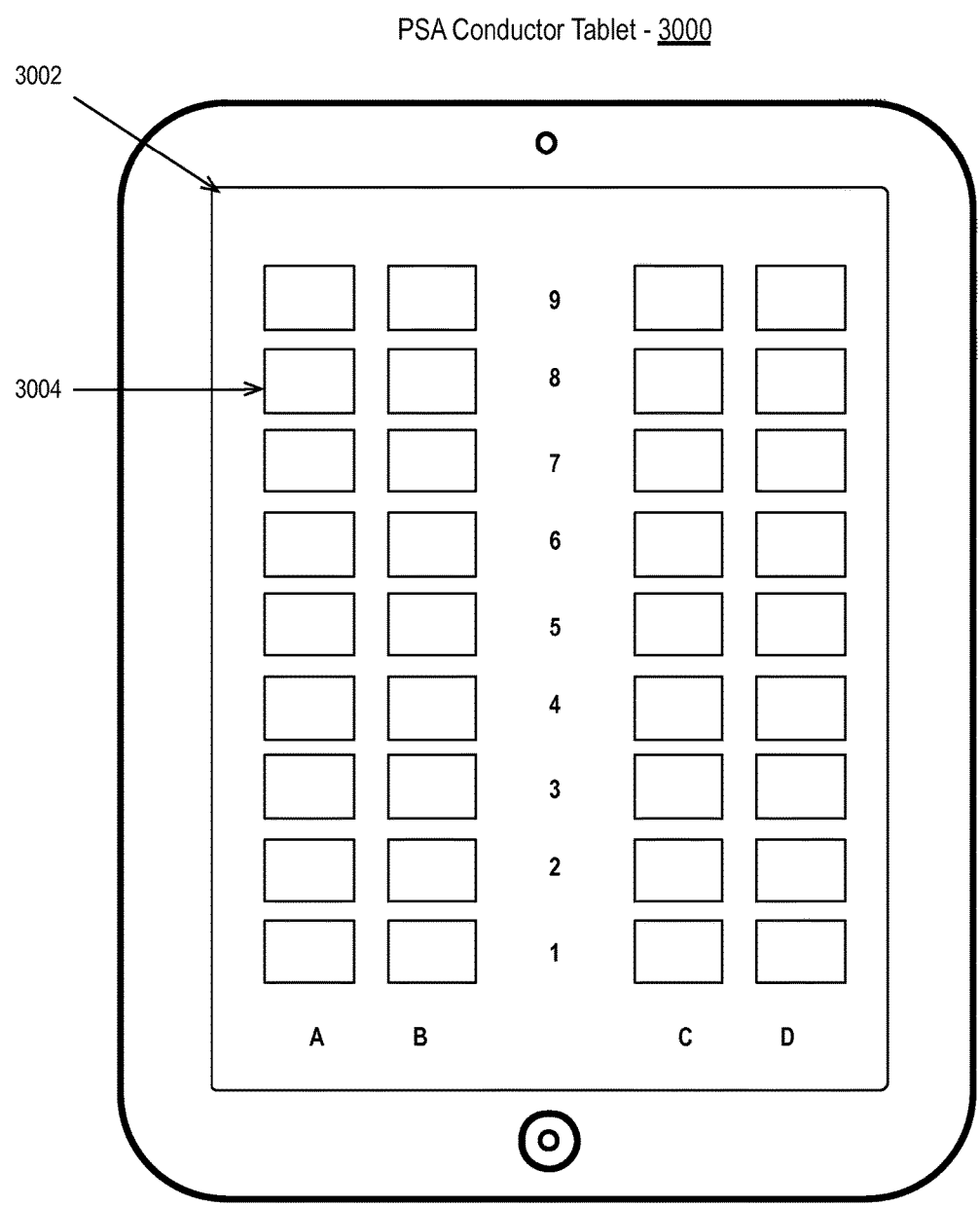
FIG. 30 is an exemplary illustration of a conductor seat application for use with the passenger self-authentication system.

FIG. 30 is an exemplary illustration of a conductor seat application for use with the passenger self-authentication system. In one embodiment a conductor tablet device 3000 for the passenger self-authentication system. The conductor tablet device 3000 executes a conductor application having a conductor display 3002. The conductor display 3002 shows a seat layout for train cars, which can display which seats within a train car are occupied or empty. FIG. 30 shows an exemplary display in which all seats in a train car are empty. The conductor can then validate the empty seats on the display against the physically occupied seats on the train and validate passengers seated in seats that are listed as unoccupied.

Figure 31:
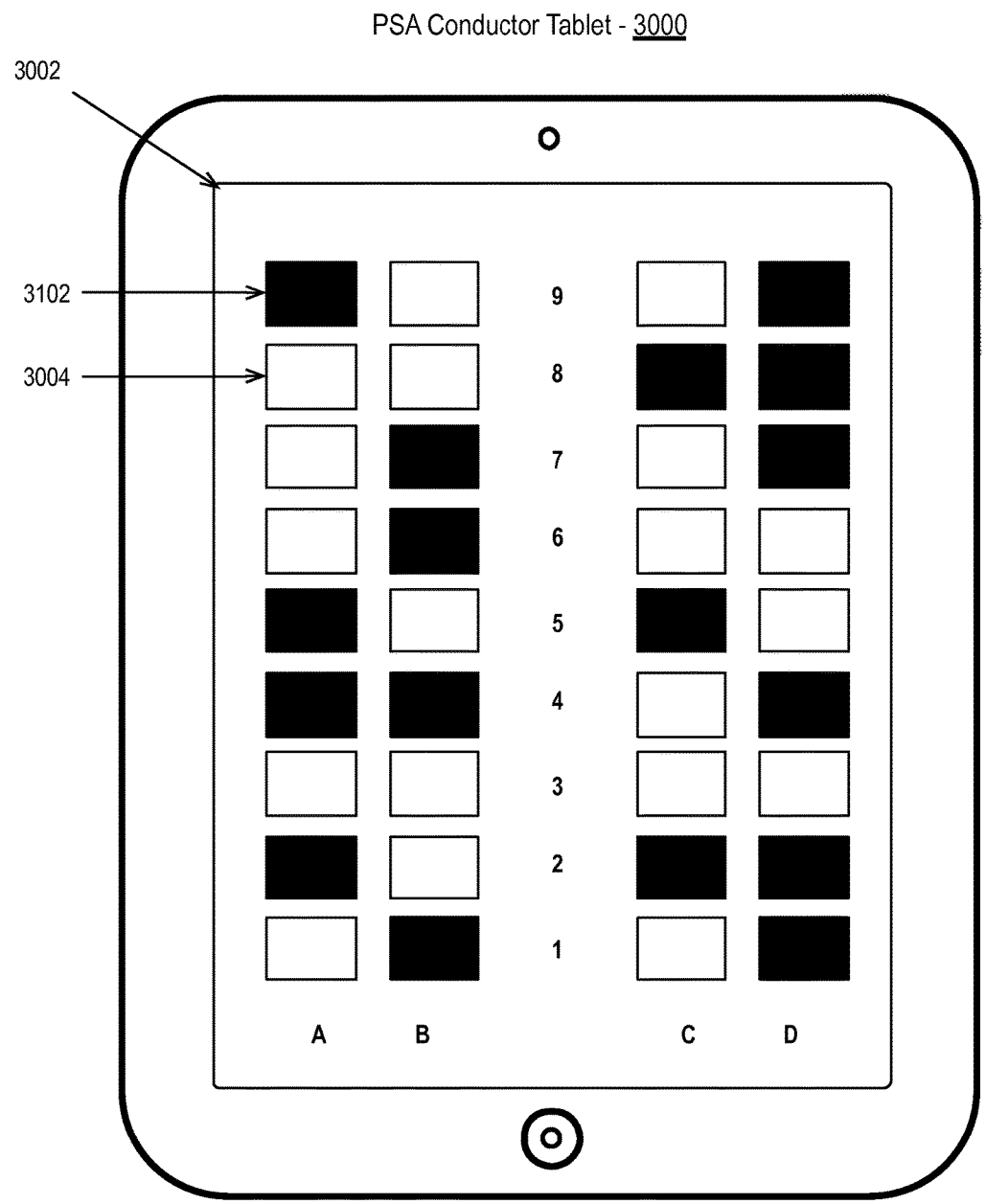
FIG. 31 is an additional exemplary illustration of a conductor seat application for use with the passenger self-authentication system.

FIG. 31 is an additional exemplary illustration of a conductor seat application for use with the passenger self-authentication system. As illustrated, empty seats 3004 and occupied seats 3102. The occupied seats 3102 are seats that are either self-authenticated by the passengers or manually validated by the conductor after verifying that the seated passenger has a ticket.

Delivering Data from an Unconnected Device to the Central System

One embodiment provides for a process of reconciling data to a central system from a remote device with no or limited data network connectivity through any traditional source, such as a cellular wireless wide area networks (WWAN) (e.g., GSM, LTE, CDMA, etc.) or wireless local area networks (WLAN) (e.g., Wi-Fi, Bluetooth, etc.) or any other source that could provide connection to the central system database, (e.g., an Internet connection). In one embodiment the remote device is a turnstile receptacle that conducts transactions with individual mobile devices and grants or denies entry based on certain factors and processes previously discussed herein. This process may be used to synchronize the data set of transactions performed by the turnstile since a previous update to the central system, or the data set of transactions performed within a specific time window (e.g., all transactions within a pre-determined period of time).

Embodiments of the Interactive Barcode Communication system described herein include the capability of passing large amounts of data from a turnstile receptacle to the mobile device with which the turnstile is transacting. For example during scan 2 shown in FIGS. 9-10, a session key and turnstile identification number may be transmitted to the mobile device. In addition to the session key and turnstile identification, part of all of the data for previous transactions conducted by a turnstile can be divided and transmitted to the central system via the mobile devices used for of subsequent transactions. Using such process the turnstile data can be more quickly reconciled with the central system than scenarios in which the turnstile receptacle is provided a periodic network data connection, or in which the turnstile data is manually downloaded for upload to the central system.

Figure 32:
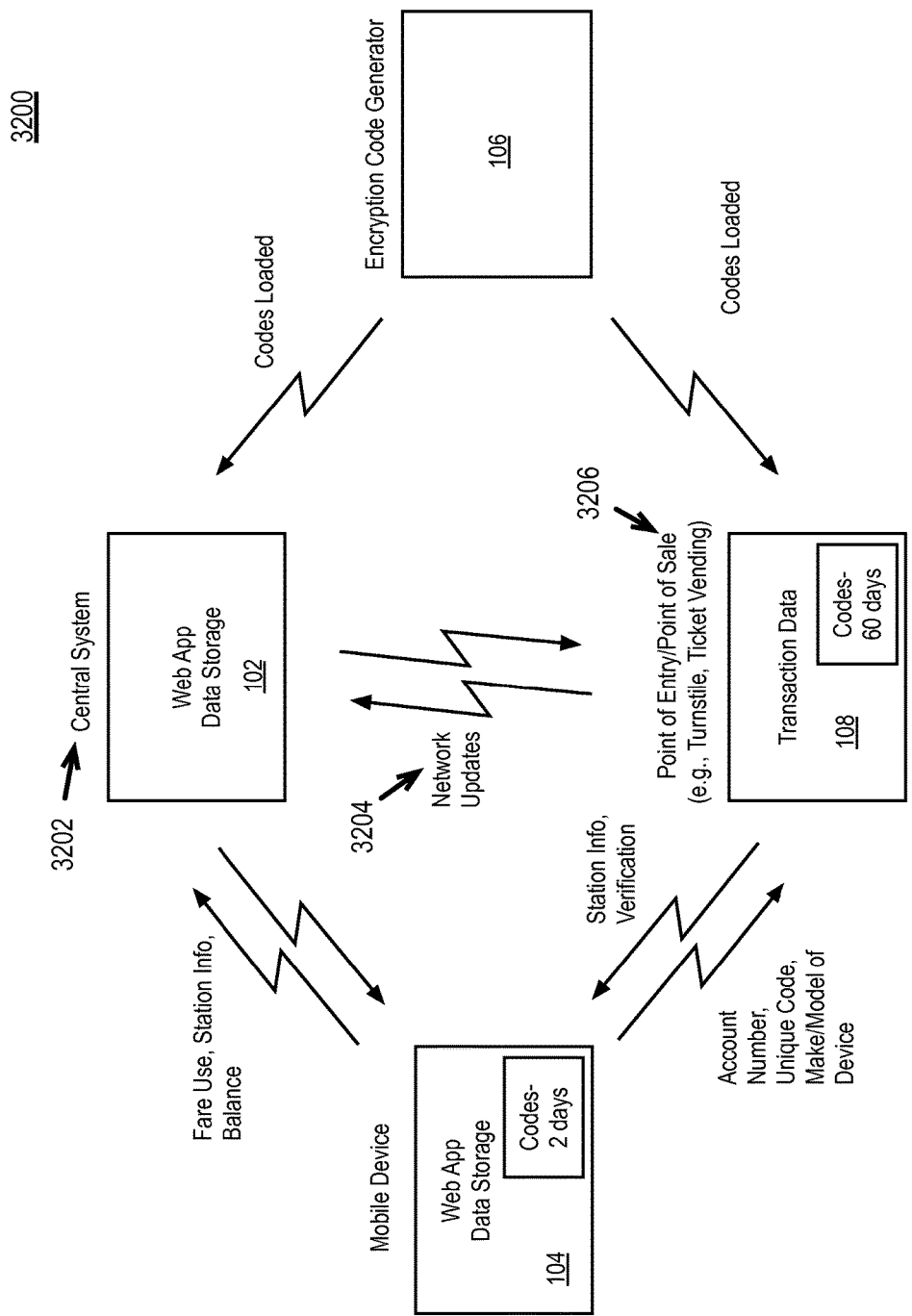
FIG. 32 is a block diagram of a further embodiment of an interactive barcode communication system.

FIG. 32 is a block diagram of a further embodiment of an interactive barcode communication system 3200. In one embodiment the interactive barcode communication system 3200 is a variant of the interactive barcode communication system 100 shown in FIG. 1, where network updates 3204 are implemented between the central system 3202 and a point of entry/sale 3206. In one embodiment, the point of entry/sale 3206 is a turnstile for a mass transit system that is positioned in a region without a data connection to the central system 3202, such as a subterranean region without access to above ground wireless networks. The point of entry/sale 3206 may also be a point of entry to a building, room, or region of a building to which controlled, per-user access is provided.

To implement the network updates 3204, stored point of access (e.g., turnstile) data can be divided into multiple segments and the individual segments can be encrypted. The encrypted data segments can then be transmitted to one or more mobile devices (e.g., mobile device 104) that conduct subsequent entry transactions at the turnstile device. Once the mobile devices reach an area in which a wireless data connection may be established, the turnstile data temporarily stored on the mobile devices may be transmitted to the central system via the wireless data connection of the mobile device. The network updates 3204 may be provided from the central system 3202 to the point of entry/sale 3206, or may be provided from the point of entry/sale 3206 to the central system 3202. The network updates 3204 may be provided periodically by the point of entry/sale 3206 for a timed period of transaction updates or may be provided at the request of the central system 3202, in which the central system 3202 may indicate, via a mobile device, that a specific point of entry/sale 3206 should send one or more network updates 3204.

Figure 33:
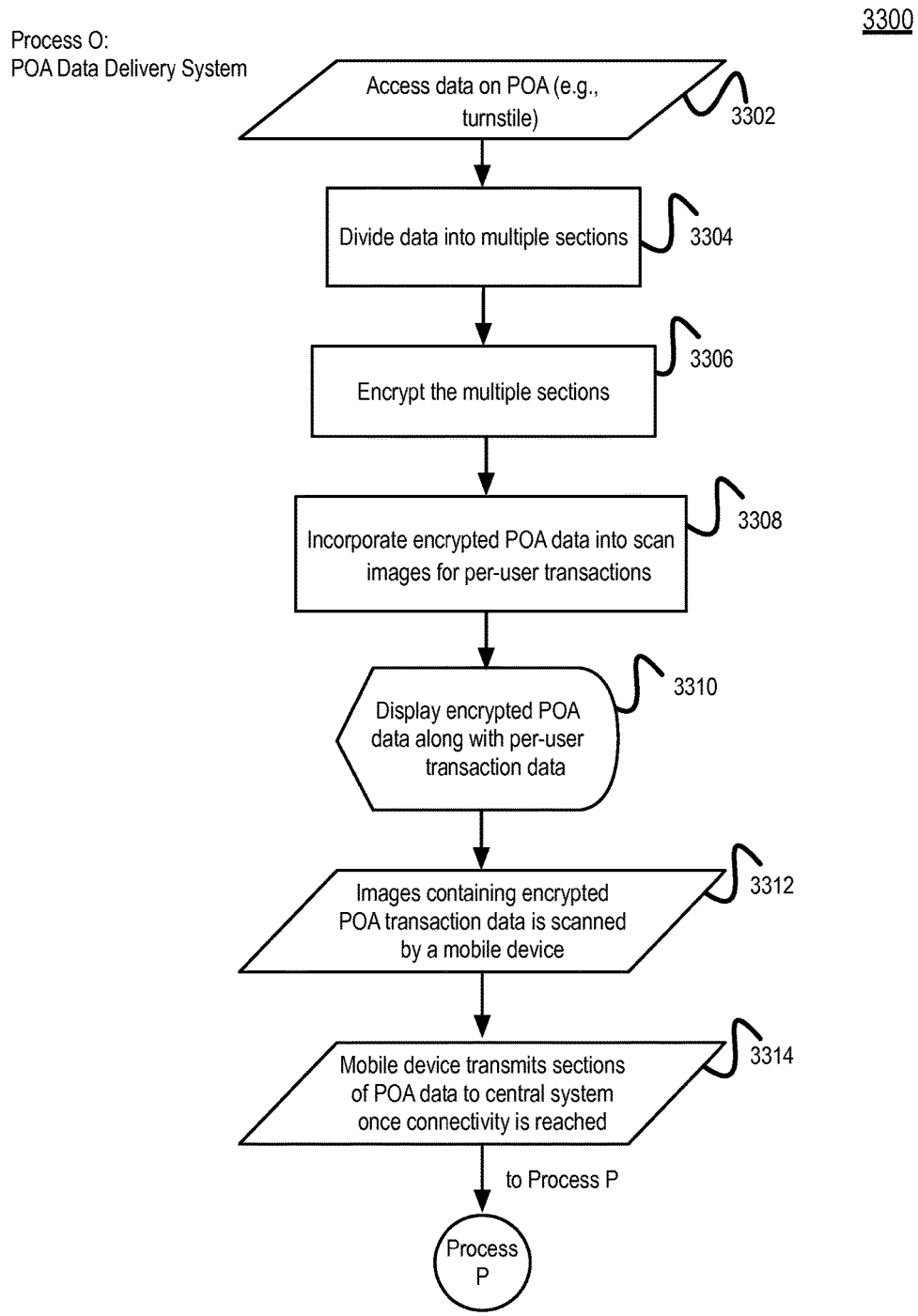
FIG. 33 is a flow diagram of a process for a point of access data delivery system, according to an embodiment.

FIG. 33 is a flow diagram of a process 3300 (Process O) for a point of access (POA) data delivery system, according to an embodiment. In one embodiment, the process 3300 includes to access transactions or other data on the POA (e.g., a building entry turnstile, a mass transit turnstile, etc.) as shown at block 3302. In one embodiment the point of access (POA) data can be transaction data or metadata regarding the transactions performed over a period. In one embodiment the operations of Process O are conducted at least in part during the operations shown at block 216 of FIG. 2.

As shown at block 3304, the process 3300 additionally includes to divide the accessed data into multiple sections. The number of the multiple sections can be determined to be sufficiently large to limit the size of each of the individual sections to be below a determined threshold. The process 3300 can further include to incorporate encrypted POA data into scan images used for per-user transactions, as shown at block 3308. For example, the images generated for use during scan 2 shown in FIGS. 9-10 can include one or more of the multiple sections of encrypted POA data. The process 3300 further includes to display the encrypted POA transaction data along with per-user transaction data (e.g., during scan 2) as shown at block 3310. Subsequently, a mobile device can scan the displayed images containing the encrypted POA transaction data during a subsequent transaction, as shown at block 3312. As shown at block 3314, once the mobile device reaches a location having wireless data connectivity, the mobile device can transmit sections of the POA data to the central system. Once the mobile device transmits sections of the POA data to the central system at block 3314, Process O can proceeded to Process P for reconstruction of the POA data, as shown in FIG. 34.

Figure 34:
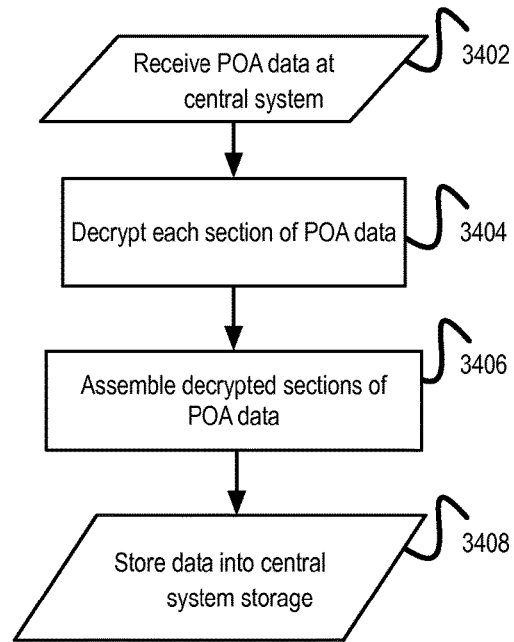
FIG. 34 is a flow diagram of a process to perform the reconstruction of the POA data, according to an embodiment.

FIG. 34 is a flow diagram of a process 3400 (Process P) to perform the reconstruction of the POA data, according to an embodiment. In one embodiment, the process 3400 includes to receive the POA data at the central system, as shown at block 3402. The process 3400 additionally includes to decrypt each section of the POA data at block 3404, and to assemble the decrypted sections of the POA data at block 3406. Once the POA data is assembled at block 3406, the process 3400 additionally includes to store the data into the central system storage, as shown at block 3408. The central system storage can be a transaction log, a transaction database, or a device information database storing data or metadata on the point of access device.

Figure 35:
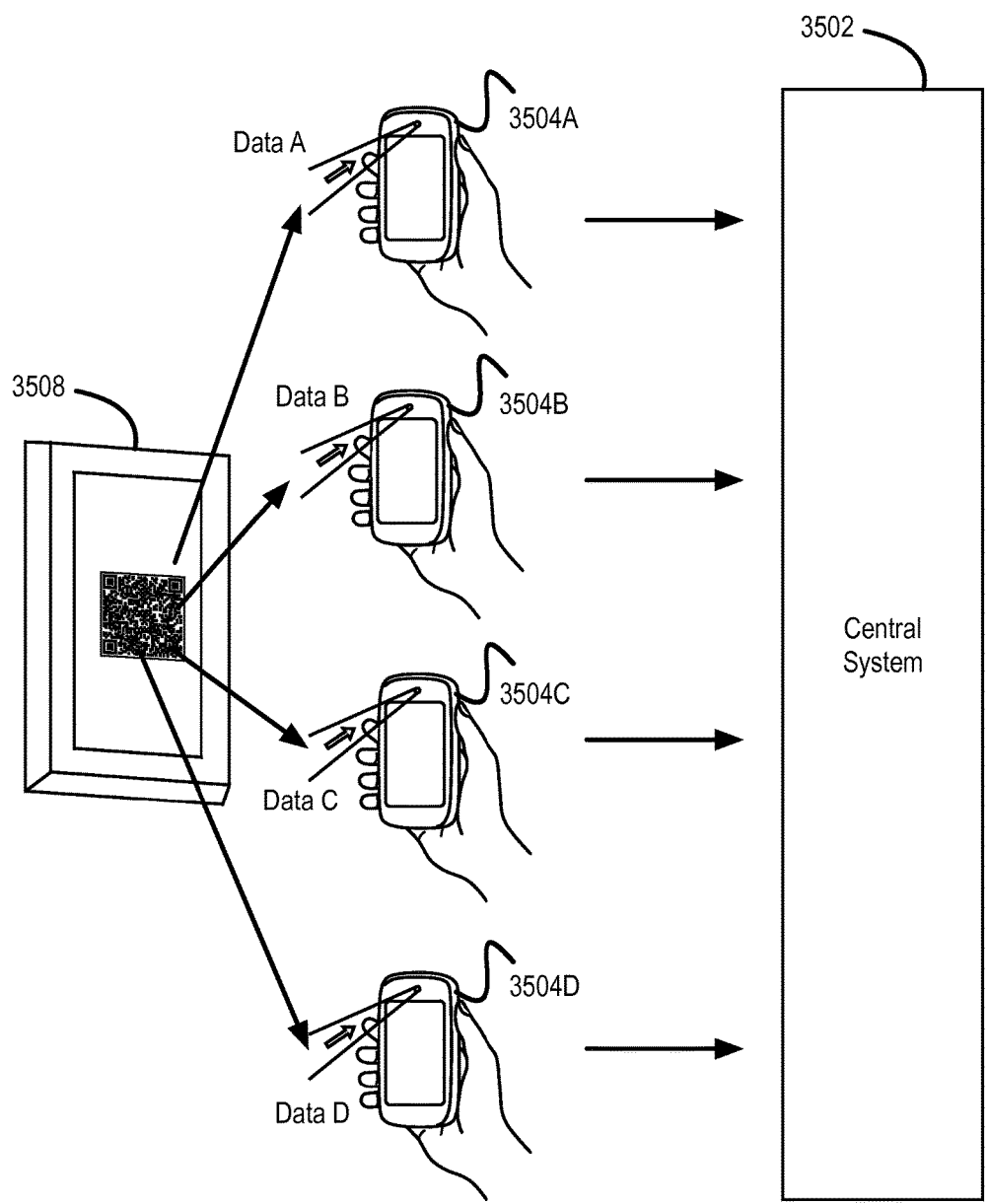
FIG. 35 is an illustration of the distribution of point of access data, according to an embodiment.

FIG. 35 is an illustration of the distribution of point of access data 3500, according to an embodiment. As illustrated, a central system 3502 can receive updated transaction data from an information receptacle 3508 at a point of access. The information receptacle 3508 can be a variant of the image code enable information receptacle 1008 of FIG. 10. As described by Process O (3300) and Process P (3400) of FIGS. 34-35, data for the point of access (e.g., turnstile, entryway) can be divided into multiple segments and encrypted. The segmented and encrypted data (Data A-D) can be transmitted to multiple mobile devices 3504A-D during subsequent data transactions with the information receptacle 3508. In one embodiment it may be assumed that if the information receptacle 3508 lacks a data connection, the mobile devices 3504A-D are also temporarily in a location that lacks a data connection (e.g., a wireless data connection). However, it may also be assumed that one or more of the mobile devices 3504A-D will reach a location in which a wireless data connection may be accessed. Though the wireless data connection, the updated data (Data A-B) from the information receptacle 3508 may be transmitted to the central system 3502. In one embodiment the data from the information receptacle may be divided into a large number of segments (e.g., significantly larger than the 4 segments illustrated), such that the amount of data transmitted by any one of the individual devices is beneath a specified threshold. By maintaining the amount of data to be transmitted beneath a threshold, the additional data communication overhead imposed on any one mobile device can be kept to a minimum to avoid disruption to other communication tasks on the device and to avoid negatively impacting any wireless data transmission quotas that may be present on any of the mobile devices 3504A-D.

Data Image Variation Matrix

Figure 36:
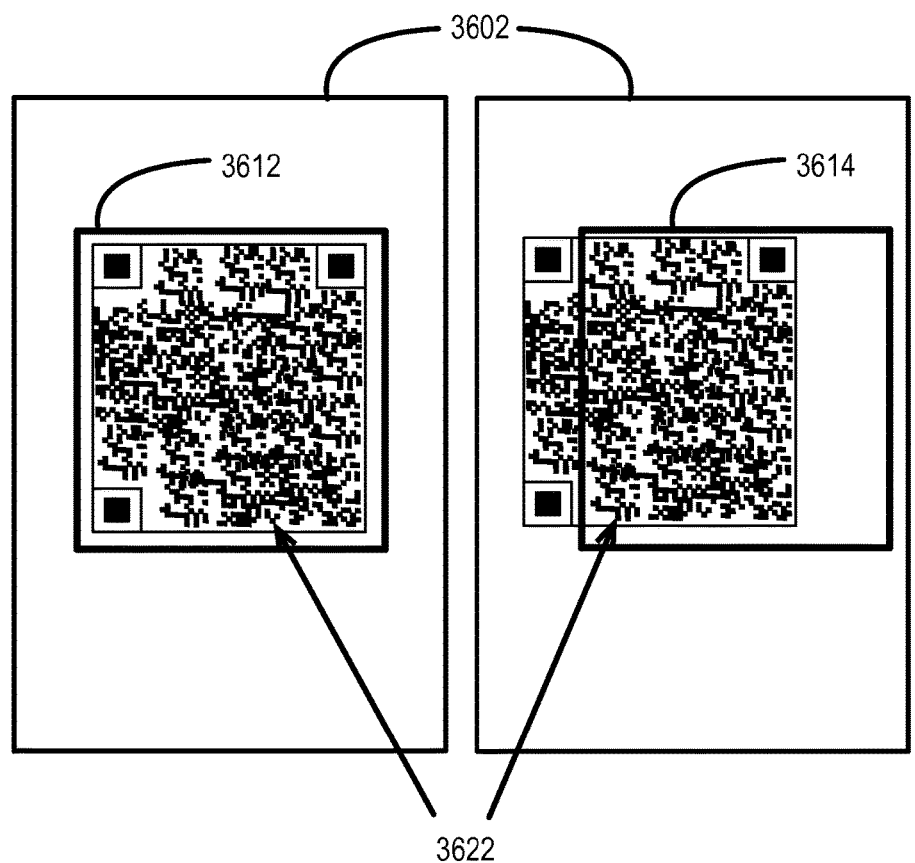
FIG. 36 is a block diagram shown an exemplary distribution of visual elements on a display.

A further embodiment provides for a method to enable placement of visual data elements within an image code in a way that can be overlapped to create multiple points of transmission on the screen of a device. A typical data image on the screen is shown in FIG. 36, which is a block diagram shown an exemplary distribution 3600 of visual elements on a display. In one embodiment a point of access or point of sale device utilizing a interactive barcode communication can transmit transactional data to a scanning device (e.g., a mobile phone, tablet device, etc.) via an image code 3622 displayed on a display 3602. A scanning device placed over an image code 3622 may be required to "see" the entire image code 3622 to read all of the data in the image code 3622, as indicated by the outline 3612 around the image code 3622. However, the scanning of the image is highly vulnerable to the image or camera angle being skewed, resulting in the scanning device not "seeing" the entire image, as represented by offset outline 3614. If the scanning device has an offset view (via offset outline 3614) it is likely that only part of the image will be read by the scanning device, along with an excess amount of blank area.

To increase the likelihood of an image scanning device capturing a usable amount of the image during the interactive barcode communication transaction, a data image variation matrix can be used that contains a series of repeating images to account for any horizontal and/or vertical image variations when scanning an image.

Figure 37:
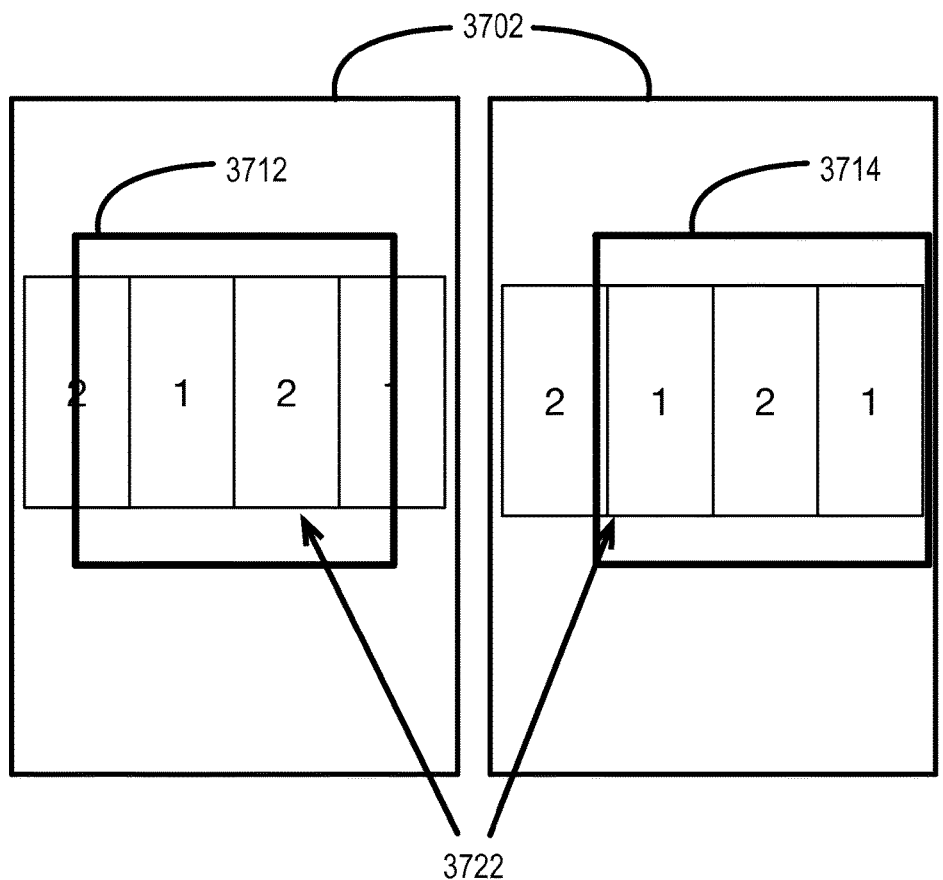
FIG. 37 illustrates a horizontally repeating distribution of visual elements, according to an embodiment.

FIG. 37 illustrates a horizontally repeating distribution 3700 of visual elements, according to an embodiment. The illustrated distribution 3700 shows an example of how an image can be divided horizontally and set in a series of left-to-right repeating images on a display 3702 of an image receptacle in order to account for any horizontal variations in the display of the image code 3722 or the scanner positioning when reading the image code 3722. Section 1 is the left side of the original image 3612 in FIG. 36. Section 2 is the right side of the image 3612. In FIG. 37, using either one of scan region 3712 or 3714 enables the scanning of region 1 and region 2. Accordingly, even with a horizontal variation, a scanning device can scan a full version of the image and all encoded data.

Figure 38:
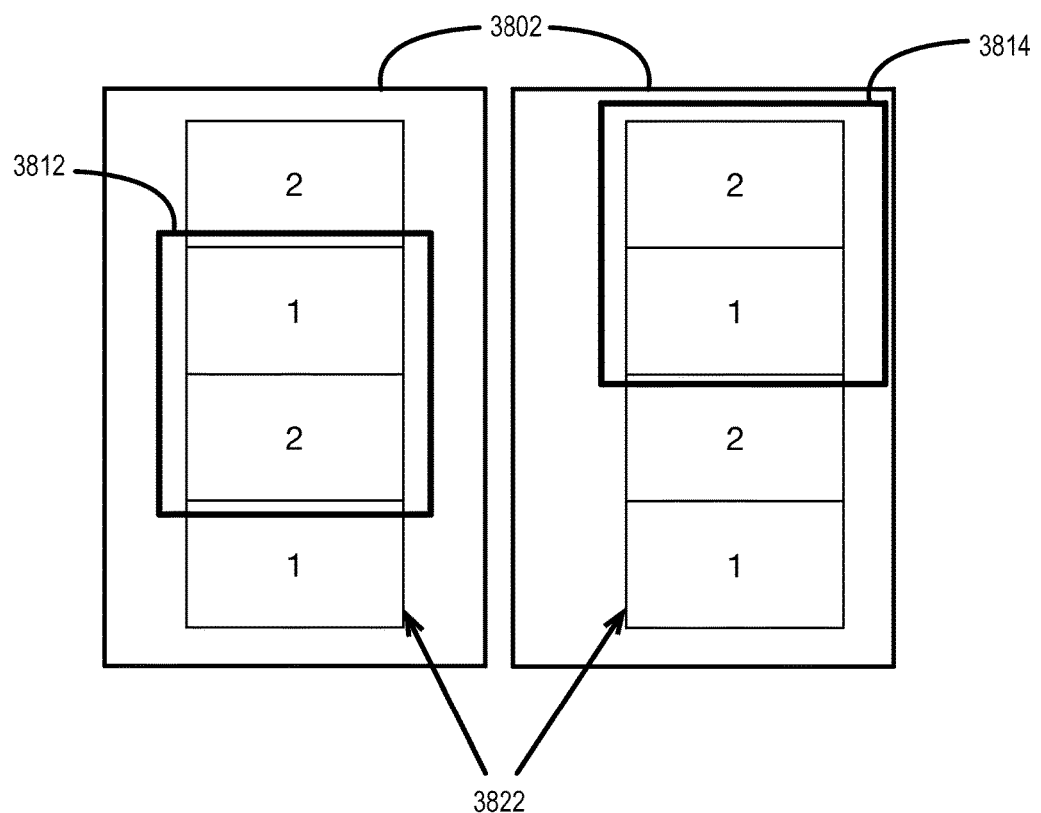
FIG. 38 illustrates a vertically repeating distribution of visual elements, according to an embodiment.

FIG. 38 illustrates a vertically repeating distribution 3800 of visual elements, according to an embodiment. The vertically repeating distribution 3800 operates in a similar manner as show in in FIG. 37, except the illustrated distribution provides for adaptation for any vertical variation that may be present in the display or scan of an image code 3822 by dividing the sections horizontally and creating an up-to-down series of repeating images on the display 3802 of the image receptacle. In FIG. 38, using either one of scan region 3812 or 3814 enables the scanning of region 1 and region 2. Accordingly, even with a vertical variation, a scanning device can scan a full version of the image code 3822 and all encoded data.

Figure 39:
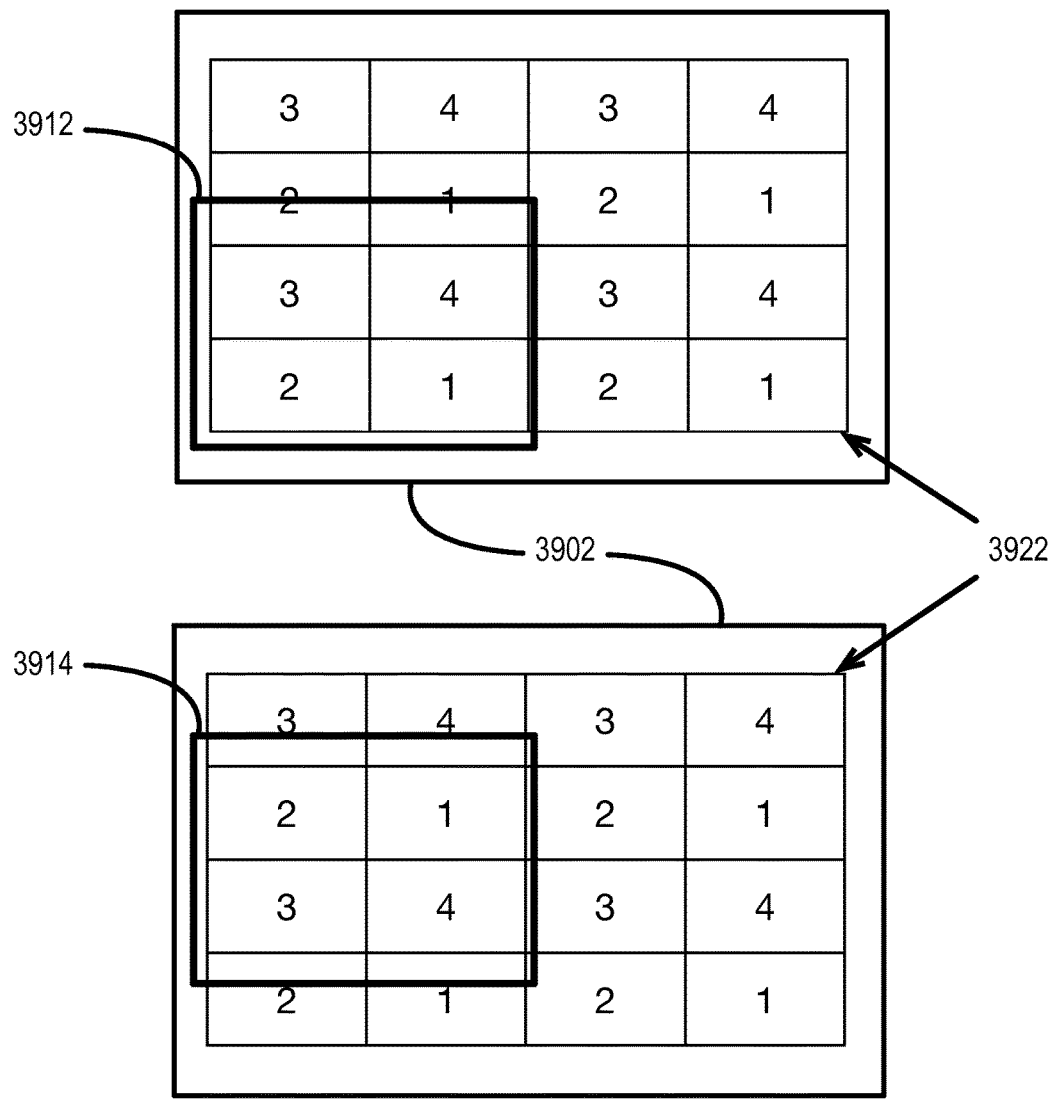
FIG. 39 illustrates a repeating distribution matrix of visual elements, according to an embodiment.

FIG. 39 illustrates a repeating distribution matrix 3900 of visual elements, according to an embodiment. In one embodiment, the distribution matrix 3900 combines the elements of FIG. 37 and FIG. 38 to allow for variation in two dimensions, which can double the amount of variation the image and scanner are able to withstand. Notwithstanding any skew in scanner positioning when imaging the display 3902 (e.g., on an image receptacle), or any variation in display positioning (e.g., on the display of a mobile device), at least one quadrant of image data 3922 is always within view of a scanning device during the interactive barcode communication transaction. For example, if a mobile device is only able to scan quadrant 3912 or quadrant 3914, a complete series of image data may be transmitted. In one embodiment, incremental data images may be displayed within a larger data image to allow for the increased image variation.

Figure 40:
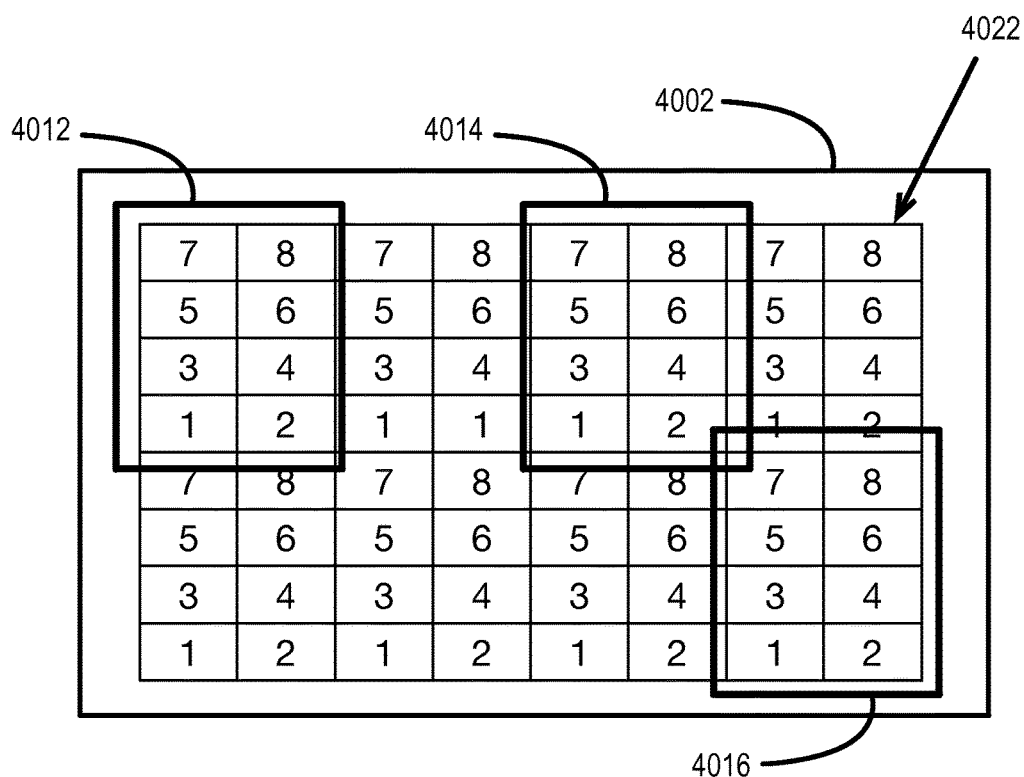
FIG. 40 illustrates an additional repeating distribution matrix of visual elements, according to an embodiment.

Increasing image segmentation from 16 blocks into 64 blocks can also increase the likelihood of completely transmitted image data. FIG. 40 illustrates an additional repeating distribution matrix 4000 of visual elements, according to an embodiment. The repeating distribution matrix 4000 includes 64 blocks of segmented image data 4022 for display on a display device 4002 of an image receptacle or a mobile device. If the mobile device, when scanning image data 4022 displayed on the image receptacle, or the image receptacle, when scanning image data 4022 displayed on a display of the mobile device, is able to scan any one of segment group 4012, group 4014, or group 4016, a sufficient amount of data can be transmitted to complete that stage of the image transaction when performing interactive barcode communication.

Additional Exemplary Implementations

Figure 41:
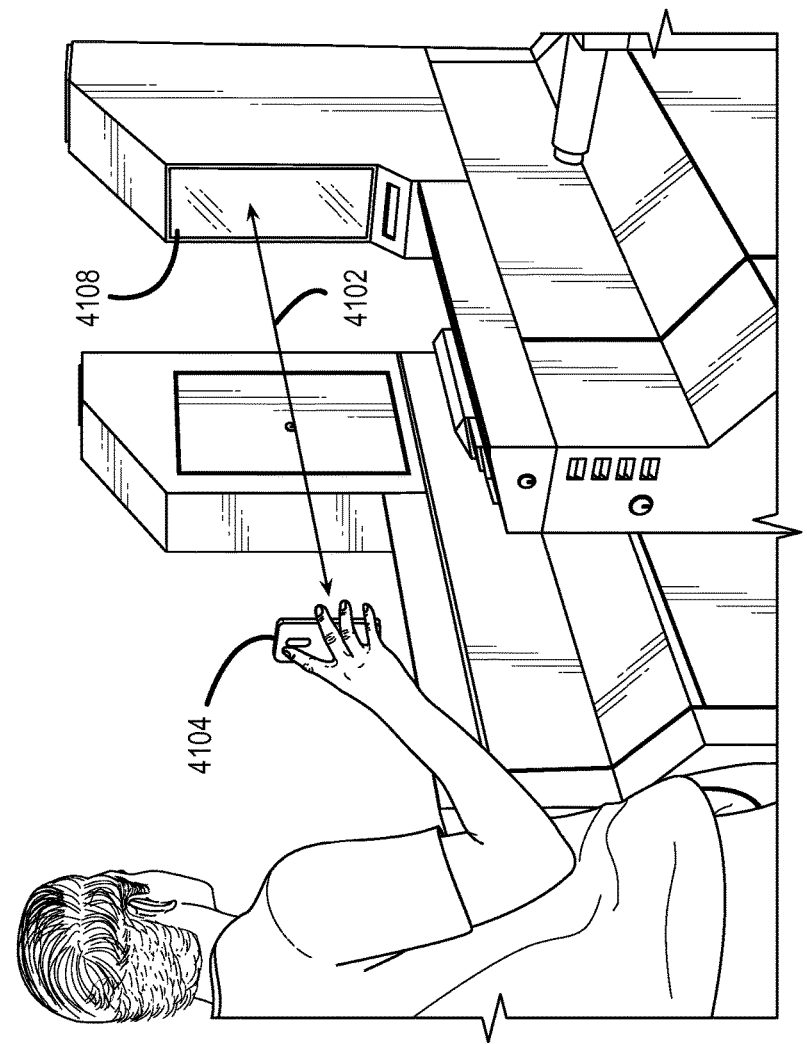
FIG. 41 is an illustration of a point of entry system that enables image code scanning and recognition at a distance.
Figure 42:
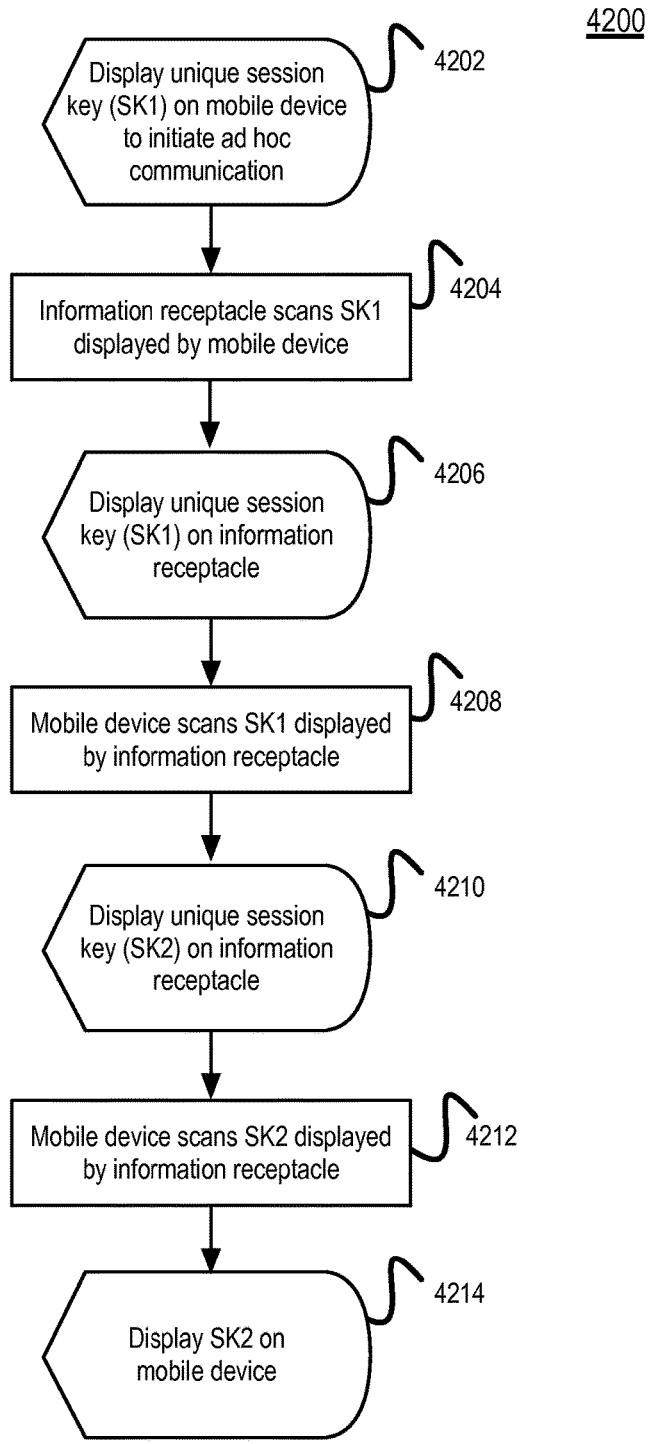
FIG. 42 illustrates a flow diagram of a process to perform ad hoc image code communication, according to an embodiment.
Figure 43:
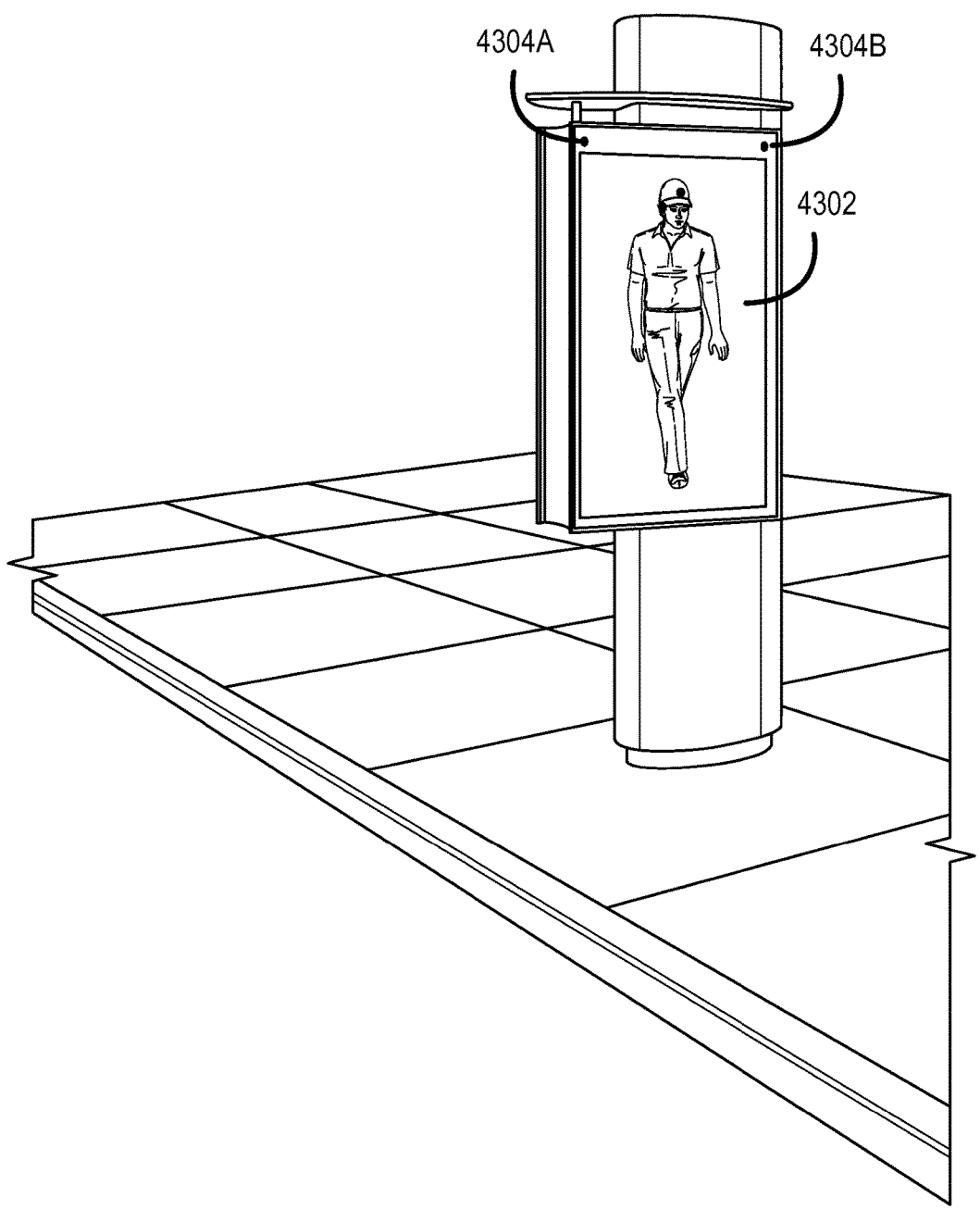
FIG. 43 is an additional illustration of a display and scanning device 4300, according to an embodiment.
Figure 44:
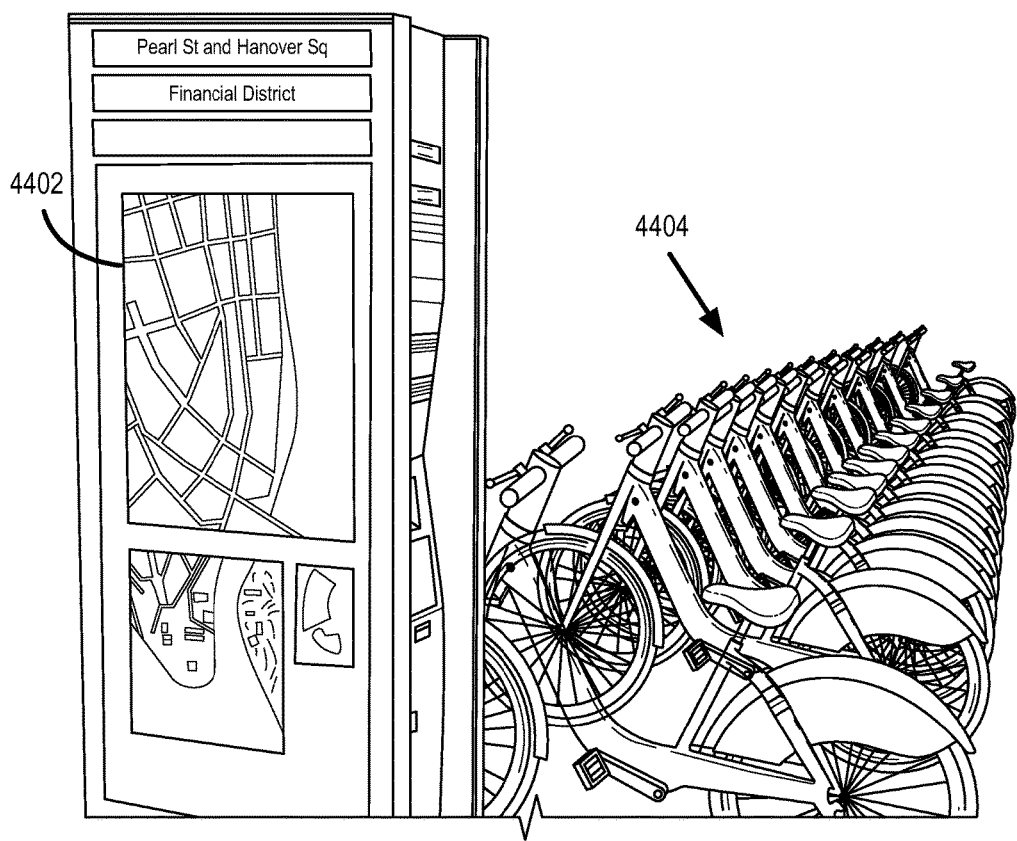
FIG. 44 is an additional illustration of an exemplary implementation of a system of interactive barcode communication for self-authentication.

FIGS. 41-44 illustrate of additional exemplary implementations of the interactive barcode system described herein. FIG. 41 is an illustration of a point of entry system that enables image code scanning and recognition at a distance in a manner analogous to the interactive image code communication illustrated with respect to FIGS. 10-11. FIG. 42 is a flow diagram illustrating an ad hoc interactive image code communication method that may be used with the point of entry system of FIG. 41. FIG. 43 is an illustration of a display and scanning device, for example, at a roadside bus stop that is configured to perform interactive barcode communication transactions via image watermarking. FIG. 44 is an additional illustration of the interactive barcode system for self-authentication, for example, for a bicycle sharing system, which may be implemented in a manner similar to the passenger self-authentication system described with respect to FIGS. 23-29.

As illustrated in FIG. 41, one embodiment provides for point of entry system 4100 including components to perform image code scanning and recognition at a distance. In such embodiment, an information receptacle 4108 can display an image including an image watermark. The image watermark can be scanned by a camera of a mobile device 4104 at a distance 4102 of several meters. In one embodiment, the image watermark can be unobtrusively embedded within an image, series of images, video, audio, or any noise tolerant signal. An application executing on the mobile device 4104 can capture the image displaying the watermark and decode the embedded information to perform the scan operations illustrated in FIGS. 9-10. In one embodiment, the image watermark scanning and display can be performed using an ad hoc communication mechanism.

FIG. 42 illustrates a flow diagram of a process 4200 (Process Q) to perform ad hoc image code communication, according to an embodiment. In one embodiment the process 4200 to perform an ad hoc communication session can be performed at least in part by an information receptacle, such as the information receptacle 4108 of FIG. 41, in communication with a mobile device, such as the mobile device 4104 of FIG. 41. The information receptacle can be associated with a point of entry, such as turnstile for a building or a mass-transit system. The mobile device can be any mobile device having a camera and a display, such as a smartphone or tablet device.

The process 4200 can begin when the smartphone displays a first unique session key (SK1) as shown at block 4202. SK1 is to identify which mobile device with which the point of entry intends to interact, as multiple mobile devices may be present and attempting to communicate with the information receptacle. The process 4200 can proceed to block 4204 in which the information receptacle scans the SK1 at block 4204. The process 4200 proceeds to block 4206 in which the information displays the scanned SK1 during a second stage display. The process 4200 can further proceed to block 4208 in which the mobile device scans SK1 displayed by the information receptacle. This ad hoc handshake allows multiple mobile devices to attempt to communicate with an information receptacle, as each mobile device can communicate with the information receptacle using a session key generated by the mobile device, enabling the correct mobile device to proceed with the communication session, for example, to deduct a transit fee from an account balance associated with the mobile device (e.g., when the point of entry is for a turnstile for a mass transit system).

In one embodiment, during Scan 2, as shown at block 4210, the process 4200 includes for the information receptacle to display a second unique session key (SK2). The second unique session key (SK2), in one embodiment, is the primary security element used during the transaction, and the mobile device scans SK2, as shown at block 4212, and repeats the display of SK2 during Scan 3 to be given access, as shown at block 4214. SK2 is unique to the transaction and the point of entry and is valid for a limited period of time. In such embodiment, SK1 is used for identification purposes, while SK2 is to prevent the use of screen shots or other manipulation for fraudulent access.

FIG. 43 is an additional illustration of a display and scanning device 4300, according to an embodiment. In one embodiment the display and scanning device 4300 may be deployed for example, at a roadside bus stop, for use with an interactive image code scanning system. In one embodiment the display and scanning device 4300 is configured to perform interactive barcode communication transactions via image watermarking. The display and scanning device 4300, in one embodiment includes a display element 4302, which can be an LCD display device, and LED display device, or any other display device suitable for use with image watermarking. In one embodiment the display and scanning device 4300 additionally includes one or more sensor devices 4304A-B, which may be image sensors, still cameras, video cameras, or other image capturing devices configured to capture an image displayed on a mobile electronic device during a transaction using the interactive barcode communication system, and variants thereof.

In one embodiment, the display and scanning device 4300 is configured only as a display device. For example, where the display and scanning device 4300 is positioned in an above-ground location or other location in which wireless network connectivity is available, the transaction can proceed in a manner similar to passenger self-authentication as in illustrated and described with respect to FIGS. 23-29. In such embodiment, the barcode 2306 of FIG. 23 can be information encoded as a digital watermark in an image displayed on the display element 4302, and the sensor devices 4304A-B may be eliminated, removed, or disabled.

FIG. 44 is an additional illustration of an exemplary implementation of a system of interactive barcode communication for self-authentication 4400. The exemplary system of interactive barcode communication for self-authentication can be used for example, for self-authentication with a bicycle sharing system 4404. A display element 4402 can display a watermarked image, for example, of a map of the local region that can be used for self-authentication in a manner similar to the passenger self-authentication illustrated and described with respect to FIGS. 23-29. In this instance, however, a mobile device application configured for self-authentication can provide a code that may be used at an individual bicycle docking station. When the correct code is entered after self-authentication, the bicycle dick can be configured to release the bicycle.

Methods, techniques, systems, and computer readable medium describing an interactive barcode communication system extended to enable passenger self-authentication. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method comprising:

causing, via a processor, a first image code to be presented on a display of a mobile device, wherein the first image code comprising first information comprising account information, wherein the mobile device includes the processor, wherein the processor is in communication with the display and generates the first image code based on an encryption code of a plurality of encryption codes received from a data source along with a set of time period information instructing the processor to use the encryption code during a time period of a plurality of time periods, wherein the encryption code is associated with the account information during the time period, wherein the set of time period information is associated with the plurality of time periods;

causing, via the processor, a second image code to be captured via a camera from an information receptacle, wherein the second image code comprising second information formed responsive to the account information, wherein the second image code is presented via the information receptacle based on the information receptacle reading the first information from the display, wherein the mobile device includes the camera, wherein the processor is in communication with the camera;

decoding, via the processor, the second information from the second image code locally;

processing, via the processor, the second information locally such that a third image code is generated locally, wherein the third image code comprising third information; and causing, via the processor, the third image code to be presented on the display such that the information receptacle can read the third information and enable a point of entry device to grant or deny an access based on the third information, wherein the information receptacle is in communication with the point of entry device, wherein the first information, the second information, and the third information are different from each other in content.

2. The method of claim 1, wherein the first information comprises at least one of a unique account number of a subscriber, a time-specific code, or a unique session key.

3. The method of claim 1, wherein the second information comprises at least one of a standard acceptance code or a standard rejection code, wherein the third information is displayed based on the second information including the standard acceptance code.

4. The method of claim 3, wherein the third information comprises a standard confirmation code, wherein at least one of the display or the information receptacle presents a message of success based on the standard confirmation code.

5. The method of claim 3, wherein at least one of the display or the information receptacle presents a message of failure based on the second information including the standard rejection code.

6. The method of claim 3, further comprising:

causing, via the processor, a targeted message to be presented on the display after capturing the second image code, wherein the targeted message is related to a location of the point of entry device including the information receptacle.

7. The method of claim 3, wherein the second information includes a unique turnstile identification code.

8. The method of claim 1, wherein at least one of the first image code, the second image code, or the third image code includes a two-dimensional barcode.

9. The method of claim 1, wherein at least one of the first image code, the second image code, or the third image code includes a watermark encoded in an advertisement image.

10. The method of claim 1, wherein at least one of the first image code, the second image code, or the third image code includes a QR code.

11. The method of claim 1, wherein the information receptacle comprises the point of entry device.

12. The method of claim 1, wherein the information receptacle is physically coupled to the point of entry device.

13. The method of claim 1, wherein the second information is formed based on the account information.

14. A method comprising:

causing, via a processor, a first image code presented on a first display of a mobile device to be captured via a first camera, wherein the first image code comprising first information comprising account information, wherein the processor is in communication with the first camera, wherein the mobile device includes a second camera and generates the first image code based on an encryption code of a plurality of encryption codes received from a data source along with a set of time period information instructing the mobile device to use the encryption code during a time period of a plurality of time periods, wherein the encryption code is associated with the account information during the time period, wherein the set of time period information is associated with the plurality of time periods;

processing, via the processor, the first information such that a second image code is generated, wherein the second image code comprising second information formed responsive to the account information;

causing, via the processor, the second image code to be presented on a second display such that the second camera captures the second information, wherein the processor is in communication with the second display;

causing, via the processor, a third image code presented on the first display to be captured via the first camera, wherein the third image code comprising third information, wherein the third image code is generated locally at the mobile device; and processing, via the processor, the third information such that a point of entry device grants or denies an access based on the third information, wherein the processor is in communication with the point of entry device, wherein the first information, the second information, and the third information are different from each other in content.

15. The method of claim 14, wherein the first information comprises at least one of a unique account number, a time-specific code, or a unique session key.

16. The method of claim 14, wherein the second information comprises at least one of a standard acceptance code or a standard rejection code, wherein the third information is received based on the second information including the standard acceptance code.

17. The method of claim 14, wherein the processor, the first camera, the second display, and the point of entry device form a single integrated unit.

18. The method of claim 14, wherein at least one of the first camera or the second display is physically coupled to the point of entry device.

19. The method of claim 14, wherein the second information is formed based on the account information.

20. A system comprising:
a point of entry device including a gate, a first camera, and a first display;
a mobile device including a processor, a second camera, and a second display, wherein the processor runs a logic that causes:
the second display to present a first image code comprising first information such that the first camera captures the first information, wherein the first information comprises account information, wherein the processor generates the first image code based on an encryption code of a plurality of encryption codes received from a data source along with a set of time period information instructing the processor to use the encryption code during a time period of a plurality of time periods, wherein the encryption code is associated with the account information during the time period, wherein the set of time period information is associated with the plurality of time periods;
the second camera to capture a second image code from the first display, wherein the second image code comprising second information, wherein the second information is generated based on the first information inclusive of the account information;
the processor to decode the second information from second image code locally;
the processor to process the second information locally such that a third image code is generated locally, wherein the third image code comprising third information and the second display to present the third image code comprising the third information such that the first camera captures the third information and the gate grants or denies an access based on the third information, wherein the first information, the second information, and the third information are different from each other in content.

21. The system of claim 20, wherein the point of entry device is located at a mass transit station.

22. The system of claim 21, wherein the gate grants the access based on the third information.

23. The system of claim 21, wherein at least one of the first image code, the second image code, or the third image code includes a barcode.

24. The system of claim 23, wherein the barcode includes a QR code.

25. The system of claim 20, wherein the first information comprises at least one of a unique account number of a subscriber, a time-specific code, or a unique session key.

26. The system of claim 20, wherein the second information is formed based on the account information.

* * * * *